(12) United States Patent
Zhao et al.

(10) Patent No.: US 11,818,370 B2
(45) Date of Patent: Nov. 14, 2023

(54) LUMA MAPPING-BASED VIDEO OR IMAGE CODING

(71) Applicant: LG ELECTRONICS INC., Seoul (KR)

(72) Inventors: Jie Zhao, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/846,692

(22) Filed: Jun. 22, 2022

(65) Prior Publication Data

US 2022/0329830 A1 Oct. 13, 2022

Related U.S. Application Data

(63) Continuation of application No. 17/559,130, filed on Dec. 22, 2021, now Pat. No. 11,412,239, which is a continuation of application No. PCT/KR2020/008144, filed on Jun. 24, 2020.

(60) Provisional application No. 62/865,922, filed on Jun. 24, 2019.

(51) Int. Cl.
*H04N 19/186* (2014.01)
*H04N 19/132* (2014.01)
*H04N 19/136* (2014.01)
*H04N 19/176* (2014.01)
*H04N 19/70* (2014.01)

(52) U.S. Cl.
CPC ......... *H04N 19/186* (2014.11); *H04N 19/132* (2014.11); *H04N 19/136* (2014.11); *H04N 19/176* (2014.11); *H04N 19/70* (2014.11)

(58) Field of Classification Search
CPC .. H04N 19/136; H04N 19/593; H04N 19/117; H04N 19/11; H04N 19/186; H04N 19/132; H04N 19/176
See application file for complete search history.

(56) References Cited

U.S. PATENT DOCUMENTS

| 2017/0105014 A1 | 4/2017 | Lee | H04N 19/85 |
| 2019/0222866 A1 | 7/2019 | Song | H04N 19/105 |
| 2020/0221092 A1 | 7/2020 | Francois | H04N 19/126 |

(Continued)

FOREIGN PATENT DOCUMENTS

| JP | 2021-002780 A | 1/2021 |
| KR | 10-2018-0084813 A | 7/2018 |
| KR | 10-2019-0046852 A | 5/2019 |

(Continued)

OTHER PUBLICATIONS

JVET-N0117-v1: Wang et a;/. Joint Video Experts Team (JVET) of ITU-T SG 16 WP 3 and ISO/IEC JTC/SC 29/WG 11; 14th Meeting: Geneva, CH, Mar. 19-27, 2019, "AHG17: Signaling of reshaper parameters in APS," Huawei Technologies Co., Ltd., Dolby Laboratories, Inc. (8 Pages).

(Continued)

*Primary Examiner* — Neil R Mikeska
(74) *Attorney, Agent, or Firm* — Bryan Cave Leighton Paisner LLP

(57) ABSTRACT

According to the disclosure of the present document, an ID value of an LMCS APS may be within a predetermined range. Thus, an LMCS procedure can be efficiently performed, and the complexity of LMCS is reduced. Since the performance of LMCS is improved, efficiency of video/image coding may increase.

20 Claims, 22 Drawing Sheets

(56) References Cited

U.S. PATENT DOCUMENTS

2020/0389655 A1    12/2020    Seregin et al.
2022/0078427 A1    3/2022    Zhu ..................... H04N 19/124

FOREIGN PATENT DOCUMENTS

| WO | 2020156529 A1 | 8/2020 |
| WO | 2020176636 A1 | 9/2020 |
| WO | 2020224525 A1 | 11/2020 |

OTHER PUBLICATIONS

JVET-O0428-v2: Lu et al., Joint Video Experts Team (JVET) of ITU-T SG 16 WP 3 and ISO/IEC JTC 1 /SC29/WG 11; 15th Meeting: Gothenburg, SE, Jul. 3-12, 2019, "AHG16/AHG17: Lmcs related clean-ups," Dolby Laboratories, Inc. (5 Pages).

JVET-O0561: Paluri et al., Joint Video Experts Team (JVET) of ITU-T SG 16 WP 3 and ISO/IEC JTC 1 /SC29/WG 11, 15th Meeting: Gothenburg, SE, Jul. 3-12, 2019, "AHG17: APS ID Control Mechanism," LG Electronics USA (6 Pages).

Lu, Taoran et al. CE12: Mapping functions (test CE12-1 and CE12-2). JVET-M0427-v2. Joint Video Experts Team (JVET) of ITU-T SG 16 WP 3 and ISO/IEC JTC 1/SC 29/WG 11 13th Meeting: Marrakech. Jan. 15, 2019, [Retrieved on Sep. 14, 2020], Retrieved from <URL: http://phenix.it-sudparis.eu/jvet/doc_end_user/current_document.php? id=5236>. See pp. 2, 4-5, 13-14 and 16; and figure 4.

Bross, Benjamin et al. Versatile Video Coding (Draft 5). JVET-N1001-v8. Joint Video Experts Team (JVET) of ITU-T SG . 16 WP 3 and ISO/IEC JTC. I/SC 29/WG 11 14th Meeting: Geneva. Jun. 11, 2019, [Retrieved on Sep. 14, 2020], Retrieved from <URL: http://phenix.it-sudparis.eu/jvet/doc_end_user/current_document.php?id=6640> See sections 7.3.2.5, 7.3.5.1, 7.4.3.5, 7.4.6.1, 7.4.6.4 and 8.7.5.3.

Ye, Yan et al. On luma mapping with chroma scaling. JVET-N0477-v3. Joint Video Experts Team (JVET) of ITU-T SG 16 WP 3 and ISO/LEC JTC 1/SC 29/WG II . 14th Meeting: Geneva. Mar. 21, 2019, [Retrieved on Sep. 14, 2020], Retrieved from <URL: http://phenix.it-sudparis.eu/jvet/doc_end_user/current_document.php?id=6199> See pp. 1-5.

U.S. Appl. No. 17/559,130, filed Dec. 22, 2021.

FIG. 21

[Table 16]

| adaptation_parameter_set_id provides an identifier for the APS for reference by other syntax elements. NOTE – APSs can be shared across pictures and can be different in different slices within a picture. aps_params_type specifies the type of APS parameters carried in the APS as specified in Table 3.2. |
| --- |

Table 3.2 – APS parameters type codes and types of APS parameters

| aps_params_type | Name of aps_params_type | Type of APS parameters |
| --- | --- | --- |
| 0 | ALF_APS | ALF parameters |
| 1 | LMCS_APS | LMCS parameters |
| 2..7 | Reserved | Reserved |

FIG. 22

[Table 58]

adaptation_parameter_set_id provides an identifier for the APS for reference by other syntax elements.
  NOTE – APSs can be shared across pictures and can be different in different slices within a picture. For LMCS APS, different slices within a picture shall have the same LMCS APS. The maximum number of LMCS APS shall be 4.
aps_params_type specifies the type of APS parameters carried in the APS as specified in Table 3.2.

Table 3.2 – APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2..7 | Reserved | Reserved |

LUMA MAPPING-BASED VIDEO OR IMAGE CODING

BACKGROUND OF THE DISCLOSURE

Field of the Disclosure

This application is a Continuation Application of U.S. patent application Ser. No. 17/559,130, filed on Dec. 22, 2021, now allowed, which is the Continuation Bypass of International Application No. PCT/KR2020/008144, filed on Jun. 24, 2020, which claims the benefit of U.S. Provisional Application No. 62/865,922, filed on Jun. 24, 2019, the contents of which are all hereby incorporated by reference herein in their entirety.

RELATED ART

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

In addition, a luma mapping with chroma scaling (LMCS) process is performed to improve compression efficiency and to increase subjective/objective visual quality, and there is a discussion on how to efficiently apply the LMCS procedure.

SUMMARY

According to an embodiment of the present document, a method and an apparatus for increasing image coding efficiency are provided.

According to an embodiment of the present document, efficient filtering application method and apparatus are provided.

According to an embodiment of the present document, efficient LMCS application method and apparatus are provided.

According to an embodiment of the present document, the LMCS codewords (or a range thereof) may be constrained.

According to an embodiment of the present document, a single chroma residual scaling factor directly signaled in chroma scaling of LMCS may be used.

According to an embodiment of the present document, linear mapping (linear LMCS) may be used.

According to an embodiment of the present document, information on pivot points required for linear mapping may be explicitly signaled.

According to an embodiment of the present document, a flexible number of bins may be used for luma mapping.

According to an embodiment of the present document, an index derivation process for inverse luma mapping and/or chroma residual scaling may be simplified.

According to an embodiment of the present document, an LMCS procedure may be applied even in case that luma and chroma blocks in one coding tree unit (CTU) have individual block tree structures (dual-tree structures).

According to an embodiment of the present document, the number of LMCS APSs may be limited.

According to an embodiment of the present document, an ID value of an LMCS APS may be within a specific range.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing the decoding apparatus to perform the video/image decoding method disclosed in at least one of the embodiments of the present document, is stored.

According to an embodiment of the present document, overall image/video compression efficiency may be improved.

According to an embodiment of the present document, subjective/objective visual quality may be improved through efficient filtering.

According to an embodiment of the present document, the LMCS process for image/video coding may be efficiently performed.

According to an embodiment of the present document, it is possible to minimize resources/costs (of software or hardware) required for the LMCS process.

According to an embodiment of the present document, hardware implementation for the LMCS process may be facilitated.

According to an embodiment of the present document, a division operation required for derivation of LMCS codewords in mapping (reshaping) can be removed or minimized by constraint of the LMCS codewords (or range thereof).

According to an embodiment of the present document, latency according to piecewise index identification may be removed by using a single chroma residual scaling factor.

According to an embodiment of the present document, a chroma residual scaling process can be performed without depending on (reconstruction of) a luma block by using the linear mapping in LMCS, and thus latency in scaling can be removed.

According to an embodiment of the present document, mapping efficiency in LMCS may be increased.

According to an embodiment of the present document, the complexity of the LMCS may be reduced through the simplification of an index derivation process for inverse luma mapping and/or chroma residual scaling, and thus video/image coding efficiency may be increased.

According to an embodiment of the present document, an LMCS procedure can be performed even with respect to a block having a dual-tree structure, and thus LMCS efficiency can be increased. Further, coding performance (e.g., objective/subjective picture quality) for the block having the dual-tree structure can be improved.

According to an embodiment of the present document, since the number of LMCS APSs is limited, LMCS complexity can be reduced, and thus fewer resources (e.g., memory) can be consumed (used) in the LMCS.

According to an embodiment of the present document, because of the LMCS APS ID value that is within a specific range, the LMCS procedure can be efficiently performed, and thus the LMCS complexity can be reduced.

BRIEF DESCRIPTION OF THE DRAWINGS

FIG. 21 shows Table 16 representing syntax and semantics of an exemplary APS according to an embodiment of the present document.

FIG. 22 shows Table 58 representing semantics related to an APS according to an embodiment of the present embodiment.

DESCRIPTION OF EXEMPLARY EMBODIMENTS

Figure 1:
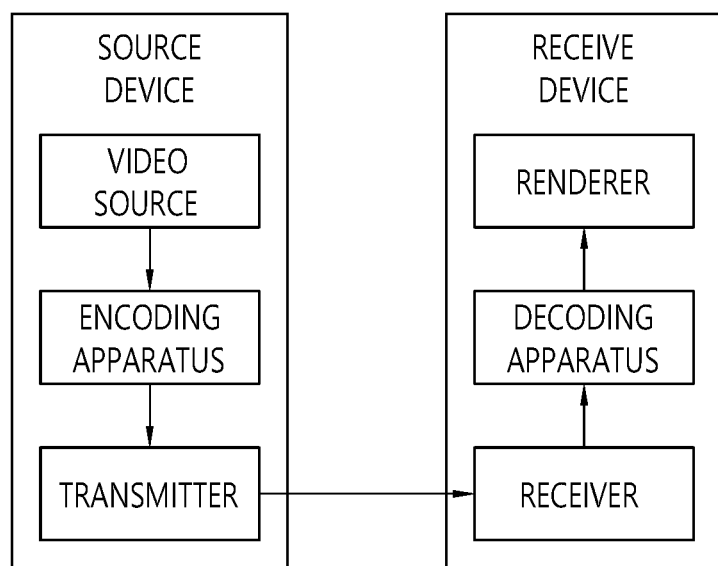
FIG. 1 illustrates an example of a video/image coding system to which the embodiments of the present document may be applied.

The present document may be modified in various forms, and specific embodiments thereof will be described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. Embodiments in which each component is integrated and/or separated are also included in the scope of the document of the present document.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, a tile group and a slice may be used in place of each other. For example, in the present document, a tile group/tile group header may be referred to as a slice/slice header.

Meanwhile, one picture may be divided into two or more subpictures. A subpicture may be a rectangular region of one or more slices within a picture.

A pixel or a pa may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

Figure 2:
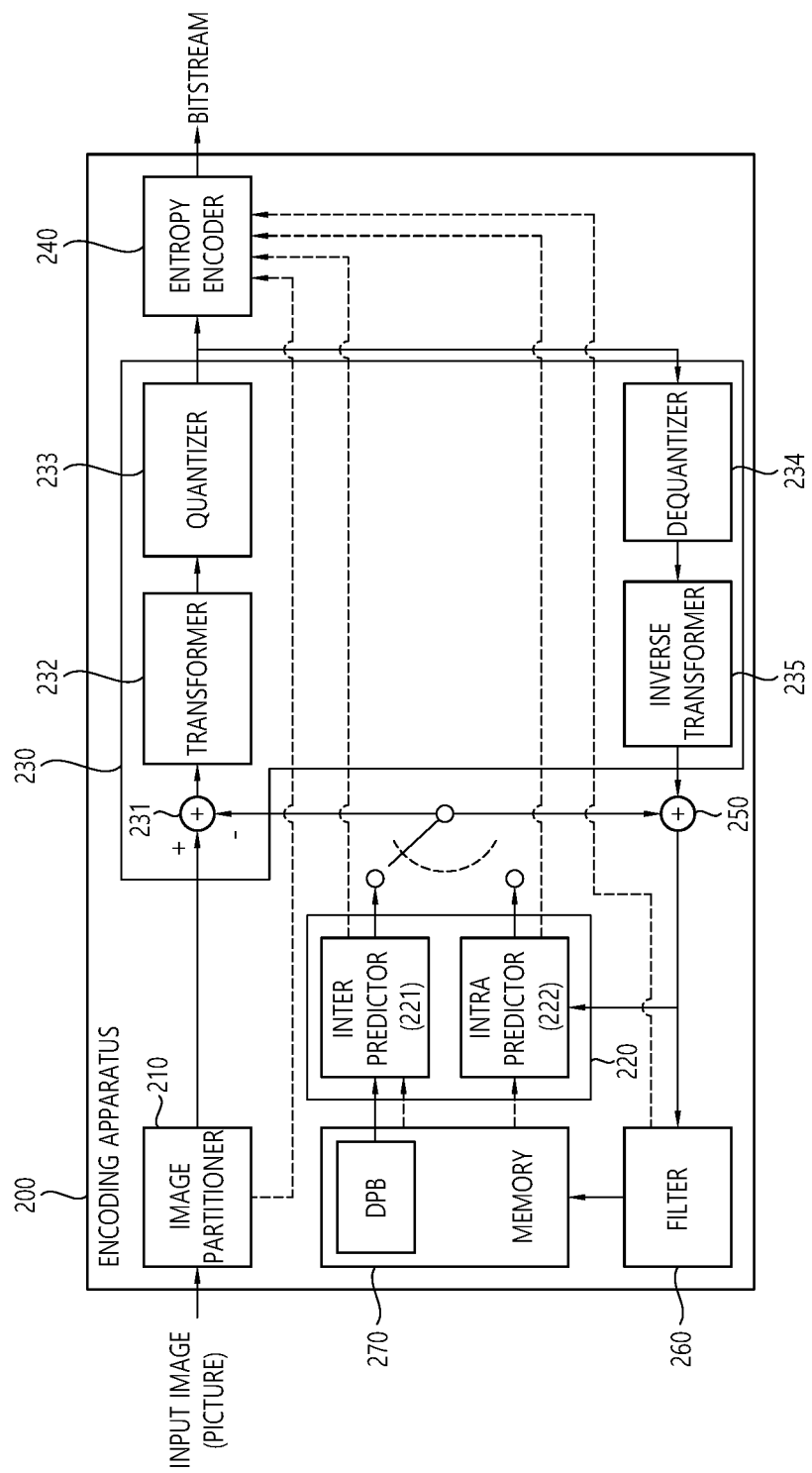
FIG. 2 is a diagram schematically illustrating a configuration of a video/image encoding apparatus to which the embodiments of the present document may be applied.

FIG. 2 is a diagram schematically illustrating a configuration of a video/image encoding apparatus to which the embodiments of the present document may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
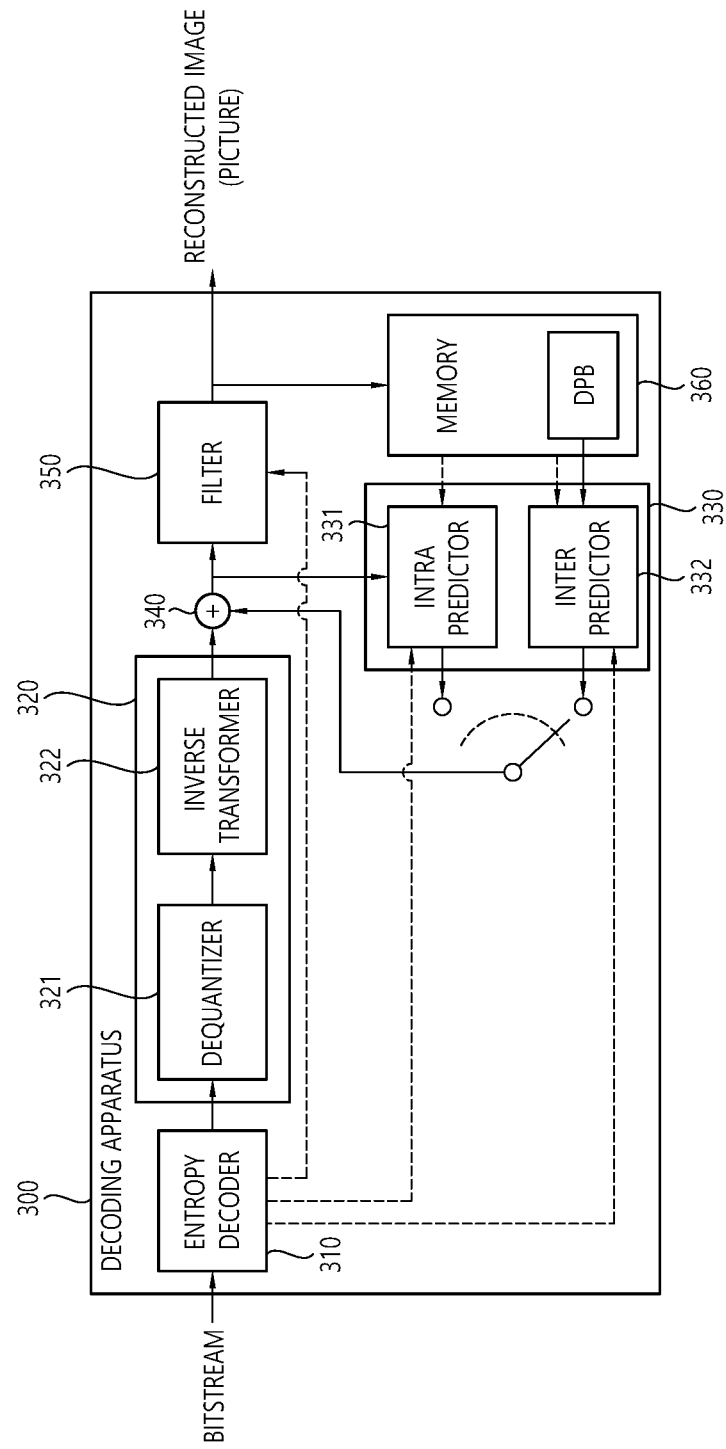
FIG. 3 is a diagram schematically illustrating a configuration of a video/image decoding apparatus to which the embodiments of the present document may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression.

In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called non-directional mode or non-angular mode and the case of (ii) may be called directional mode or angular mode.

Furthermore, the prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra sub-partitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step. In addition, a post-filtering step may be performed on the predicted sample derived as needed.

When intra prediction is applied, the intra prediction mode applied to the current block may be determined using the intra prediction mode of the neighboring block. For example, the decoding apparatus may select one of most probable mode (mpm) candidates of an mpm list derived based on the intra prediction mode of the neighboring block (ex. left and/or upper neighboring blocks) of the current block based on the received mpm index and select one of the other remaining intro prediction modes not included in the mpm candidates (and planar mode) based on the remaining intra prediction mode information. The mpm list may be configured to include or not include a planar mode as a candidate. For example, if the mpm list includes the planar mode as a candidate, the mpm list may have six candidates. If the mpm list does not include the planar mode as a candidate, the mpm list may have three candidates. When the mpm list does not include the planar mode as a candidate, a not planar flag (ex. intra_luma_not_planar_flag) indicating whether an intra prediction mode of the current block is not the planar mode may be signaled. For example, the mpm flag may be signaled first, and the mpm index and not planar flag may be signaled when the value of the mpm flag is 1. In addition, the mpm index may be signaled when the value of the not planar flag is 1. Here, the mpm list is configured not to include the planar mode as a candidate does not is to signal the not planar flag first to check whether it is the planar mode first because the planar mode is always considered as mpm.

For example, whether the intra prediction mode applied to the current block is in mpm candidates (and planar mode) or in remaining mode may be indicated based on the mpm flag (ex. Intra_luma_mpm_flag). A value 1 of the mpm flag may indicate that the intra prediction mode for the current block is within mpm candidates (and planar mode), and a value 0 of the mpm flag may indicate that the intra prediction mode for the current block is not in the mpm candidates (and planar mode). The value 0 of the not planar flag (ex. Intra_luma_not_planar_flag) may indicate that the intra prediction mode for the current block is planar mode, and the value 1 of the not planar flag value may indicate that the intra prediction mode for the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may index remaining intra prediction modes not included in the mpm candidates (and planar mode) among all intra prediction modes in order of prediction mode number to indicate one of them. The intra prediction mode may be an intra prediction mode for a luma component (sample). Hereinafter, intra prediction mode information may include at least one of the mpm flag (ex. Intra_luma_mpm_flag), the not planar flag (ex. Intra_luma_not_planar_flag), the mpm index (ex. mpm_idx or intra_luma_mpm_idx), and the remaining intra prediction mode information (rem_intra_luma_pred_mode or intra_luma_mpm_remainder). In the present document, the MPM list may be referred to in various terms such as MPM candidate list and candModeList. When MIP is applied to the current block, a separate mpm flag (ex. intra_mip_mpm_flag), an mpm index (ex. intra_mip_mpm_idx), and remaining intra prediction mode information (ex. intra_mip_mpm_remainder) for MIP may be signaled and the not planar flag is not signaled.

In other words, in general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block.

For example, the encoder/decoder may configure a list of most probable modes (MPM) for the current block. The MPM list may also be referred to as an MPM candidate list. Herein, the MPM may refer to a mode used to improve coding efficiency in consideration of similarity between the current block and neighboring block in intra prediction mode coding. As described above, the MPM list may be configured to include the planar mode or may be configured to exclude the planar mode. For example, when the MPM list includes the planar mode, the number of candidates in the MPM list may be 6. And, if the MPM list does not include the planar mode, the number of candidates in the MPM list may be 5.

The encoder/decoder may configure an MPM list including 5 or 6 MPMs.

In order to configure the MPM list, three types of modes can be considered: default intra modes, neighbor intra modes, and the derived intra modes.

For the neighboring intra modes, two neighboring blocks, i.e., a left neighboring block and an upper neighboring block, may be considered.

As described above, if the MPM list is configured not to include the planar mode, the planar mode is excluded from the list, and the number of MPM list candidates may be set to 5.

In addition, the non-directional mode (or non-angular mode) among the intra prediction modes may include a DC mode based on the average of neighboring reference samples of the current block or a planar mode based on interpolation.

When inter prediction is applied, the predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 4:
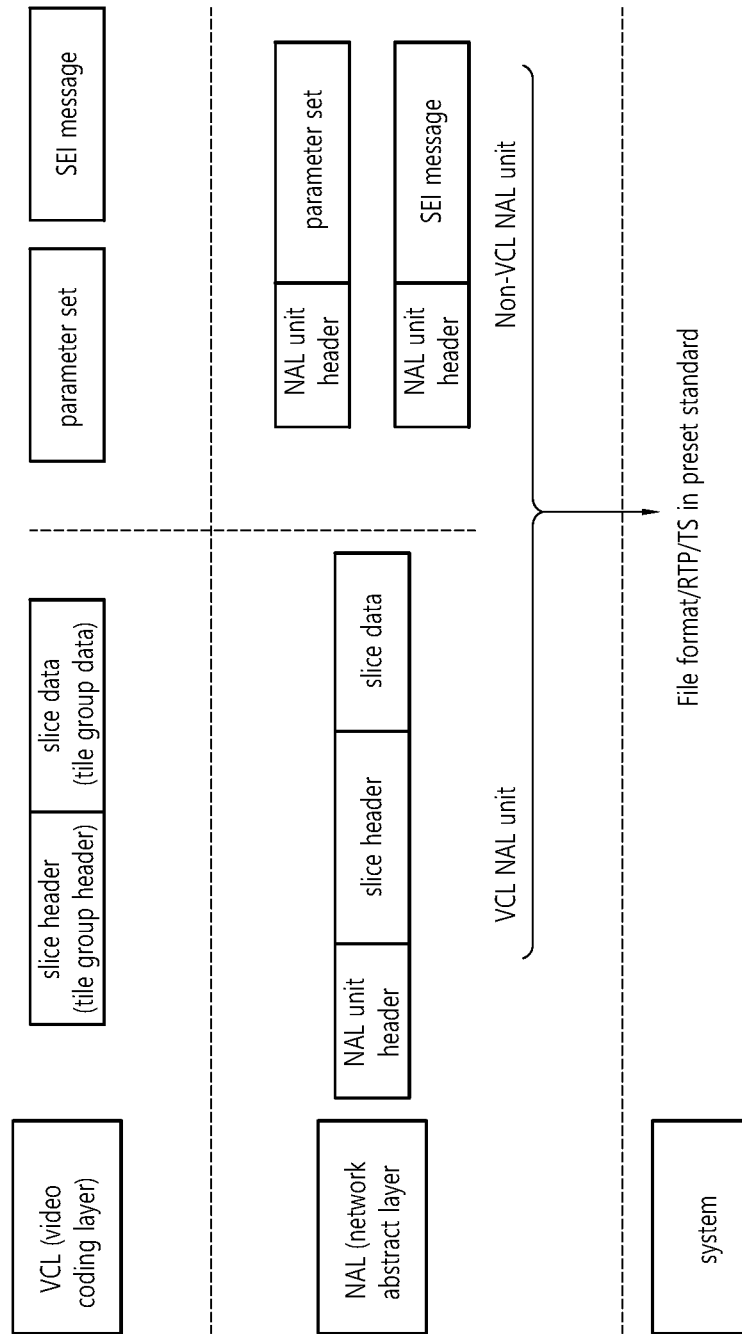
FIG. 4 exemplarily shows a hierarchical structure for a coded image/video.

FIG. 4 exemplarily shows a hierarchical structure for a coded image/video.

Referring to FIG. 4, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS(Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present document, a slice may be mixed or replaced with a tile group. Also, in the present document, a slice header may be mixed or replaced with a tile group header.

The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS) in the present document may include at least one of the APS syntax, the PPS syntax, the SPS syntax, the VPS syntax, the DPS syntax, and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, and the like, but also information included in a slice header, information included in the APS, information included in the PPS, information included in an SPS, and/or information included in the VPS.

Meanwhile, in order to compensate for a difference between an original image and a reconstructed image due to an error occurring in a compression coding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Meanwhile, in order to increase coding efficiency, luma mapping with chroma scaling (LMCS) may be applied as described above. LMCS may be referred to as a loop reshaper (reshaping). In order to increase coding efficiency, LMCS control and/or signaling of LMCS related information may be performed hierarchically.

Figure 5:
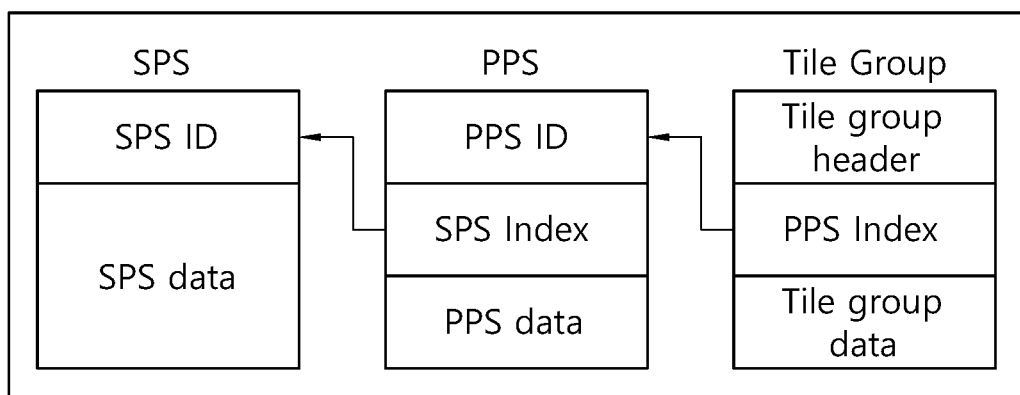
FIG. 5 exemplarily illustrates a hierarchical structure of a CVS according to an embodiment of the present document.

FIG. 5 exemplarily illustrates a hierarchical structure of CVS according to an embodiment of the present document.

Referring to FIG. 5, a coded video sequence (CVS) may include a sequence parameter set (SPS), one or more picture parameter sets (PPSs), and one or more following coded pictures. Each coded picture may be divided into rectangular regions. The rectangular regions may be called tiles. One or more tiles may be gathered to form a tile group or a slice. In this case, a tile group header may be linked to the picture parameter set (PPS), and the PPS may be linked to the SPS.

Figure 6:
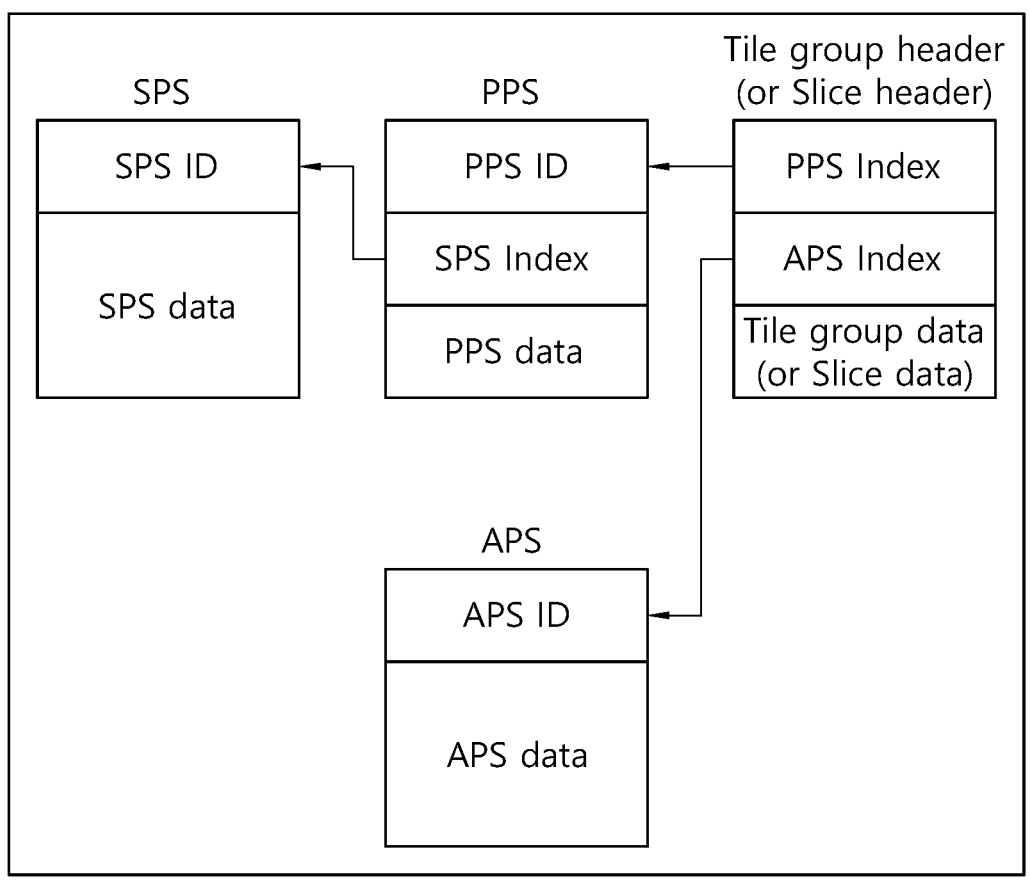
FIG. 6 exemplarily illustrates a hierarchical structure of a CVS according to an embodiment of the present document.

FIG. 6 exemplarily illustrates a hierarchical structure of a CVS according to an embodiment of the present document. A coded video sequence (CVS) may include an SPS, a PPS, a tile group header, tile data, and/or CTU(s). Here, the tile group header and the tile data may be referred to as a slice header and slice data, respectively.

The SPS may include flags natively to enable tools to be used in CVS. In addition, the SPS may be referred to by the PPS including information on parameters that change for each picture. Each of the coded pictures may include one or more coded rectangular domain tiles. The tiles may be grouped into raster scans forming tile groups. Each tile group is encapsulated with header information called a tile group header. Each tile consists of a CTU comprising coded data. Here the data may include original sample values, prediction sample values, and its luma and chroma components (luma prediction sample values and chroma prediction sample values).

According to the existing method, ALF data (ALF parameter) or LMCS data (LMCS parameter) is included in a tile group header. Considering that one video is composed of a plurality of pictures, and one picture includes a plurality of tiles, frequent signaling of the ALF data (ALF parameter) or the LMCS data (LMCS parameter) in the unit of a tile group has caused a problem of degrading the coding efficiency.

According to an embodiment proposed in the present document, the ALF parameter or the LMCS data (LMCS parameter) may be included in an APS to be signaled as follows.

Figure 7:
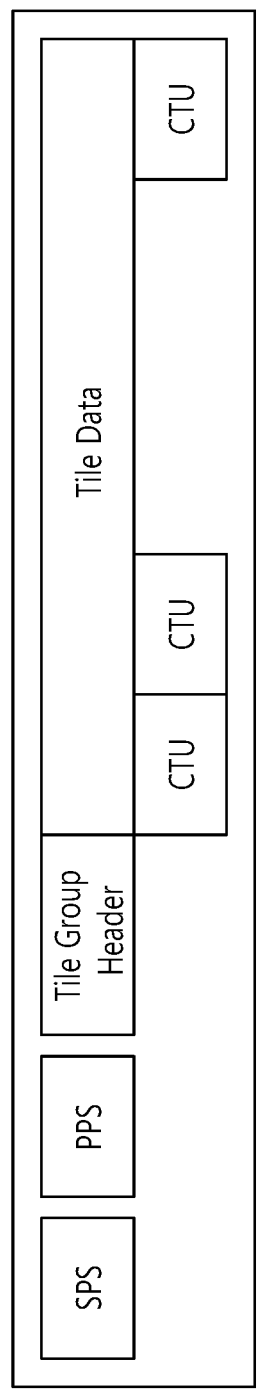
FIG. 7 exemplarily illustrates a hierarchical structure of a CVS according to another embodiment of the present document.

FIG. 7 exemplarily illustrates a hierarchical structure of a CVS according to another embodiment of the present document Referring to FIG. 7, an APS may be defined, and the APS may carry necessary ALF data (ALF parameter). In addition, the APS may have a self-identification parameter, ALF data, and/or LMCS data. The self-identification parameter of the APS may include an APS ID. That is, the APS may include information representing the APS ID. A tile group header or a slice header may refer to the APS by using APS index information. In other words, the tile group header or the slice header may include the APS index information, and may perform an ALF procedure for a target block based on the LMCS data (LMCS parameter) included in the APS having the APS ID indicated by the APS index information, or may perform an LMCS procedure for the target block based on the ALF data (ALF parameter) included in the APS having the APS ID indicated by the APS index information. Here, the APS index information may be called APS ID information.

In an example, the SPS may include a flag allowing the usage of the ALF. For example, when the CVS beings, the SPS may be checked, and the flag in the SPS may be checked. For example, the SPS may include a syntax of Table 1 below. The syntax of Table 1 may be a part of the SPS.

TABLE 1

|  | Descriptor |
|---|---|
| seq_parameter_set_rbsp( ) { | |
| ... | |
| sps_alf_enabled_flag | u(1) |
| } | |

The semantics of the syntax element included in the syntax of Table 1 above may be represented, for example, as in the following table.

TABLE 2 sps_alf_enabled_flag equal to 0 specifies that the adaptive loop filter is disabled.
sps_alf_enabled_flag equal to 1 specifies that the adaptive loop filter is enabled.

That is, the sps_alf_enabled_flag syntax element may represent whether the ALF is available based on whether the value thereof is 0 or 1. The sps_alf_enabled_flag syntax element may be called an ALF available flag (first ALF available flag), and may be included in the SPS. That is, the ALF available flag may be signaled in the SPS (or SPS level). If the value of the ALF available flag being signaled in the SPS is 1, the ALF may be basically determined to be available with respect to pictures in the CVS referring to the SPS. Meanwhile, as described above, the ALF may be individually processed to be on/off by signaling an additional available flag at a lower level than the SPS.

For example, if an ALF tool is available to the CVS, an additional available flag (may be called a second ALF available flag) may be signaled in the tile group header or the slice header. The second ALF available flag may be parsed/signaled in case that, for example, the ALF is available at the SPS level. If the second ALF available flag value is 1, ALF data may be parsed through the tile group header or the slice header. For example, the second ALF available flag may specify an ALF available condition on luma and chroma components. The ALF data may be accessed through APS ID information.

TABLE 3

|  | Descriptor |
|---|---|
| tile_group_header( ) { | |
| tile_group_pic_parameter_set_id | ue(v) |
| if( sps_alf_enabled_flag ) { | |
| tile_group_alf_enabled_flag | u(1) |
| if( tile_group_alf_enabled_flag ) | |
| tile_group_aps_id | u(5) |
| } | |

TABLE 4

|  | Descriptor |
|---|---|
| slice_header( ) { | |
| slice_pic_parameter_set_id | ue(v) |
| if( sps_alf_enabled_flag ) { | |
| slice_alf_enabled_flag | u(1) |
| if( slice_alf_enabled_flag ) | |
| slice_aps_id | u(5) |
| } | |

The semantics of syntax elements of the syntax of Table 3 or Table 4 above may be represented, for example, as in the following tables.

TABLE 5 tile_group_alf_enabled_flag equal to 1 specifies that adaptive loop filter is enabled and
may be applied to Y, Cb, or Cr color component in a tile group.
tile_group_alf_enabled_flag equal to 0 specifies that adaptive loop filter is disabled for all
color components in a tile group.
tile_group_aps_id specifies the adaptation_parameter_set_id of the APS that the tile group
refers to. The TemporalId of the APS NAL unit having adaptation_parameter_set_id equal
to tile_group_aps_id shall be less than or equal to the TemporalId of the coded tile group
NAL unit.
When multiple APSs with the same value of adaptation_parameter_set_id are referred to
by two or more tile groups of the same picture, the multiple APSs with the same value of
adaptation_parameter_set_id shall have the same content.

TABLE 6 slice_alf_enabled_flag equal to 1 specifies that adaptive loop filter is enabled and may be
applied to Y, Cb, or Cr color component in a slice. slice_alf_enabled_flag equal to 0
specifies that adaptive loop filter is disabled for all color components in a slice.
slice_aps_id specifies the adaptation_parameter_set_id of the APS that the slice refers to.
The TemporalId of the APS NAL unit having adaptation_parameter_set_id equal to
tile_group_aps_id shall be less than or equal to the TemporalId of the coded slice NAL
unit.
When multiple APSs with the same value of adaptation_parameter_set_id are referred to
by two or more slices of the same picture, the multiple APSs with the same value of
adaptation_parameter_set_id shall have the same content.

The second ALF available flag may include a tile_group_alf_enabled_flag syntax element or a slice_alf_enabled_flag syntax element.

Based on the APS ID information (e.g., tile_group_aps_id syntax element or slice_aps_id syntax element), the APS being referred to by the corresponding tile group or the corresponding slice may be identified. The APS may include ALF data.

Meanwhile, the structure of the APS including the ALF data may be explained, for example, based on the following syntax and semantics. The syntax of Table 7 may be a part of the APS.

TABLE 7

| | Descriptor |
|---|---|
| adaptation_parameter_set_rbsp( ) { | |
|   adaptation_parameter_set_id | u(5) |
|   alf_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

TABLE 8 adaptation_parameter_set_id provides an identifier for the APS for reference by other
syntax elements.
  NOTE-APSs can be shared across pictures and can be different in different tile groups
    within a picture.
aps_extension_flag equal to 0 specifies that no aps_extension_data_flag syntax elements
are present in the APS RBSP syntax structure. aps_extension_flag equal to 1 specifies that
there are aps_extension_data_flag syntax elements present in the APS RBSP syntax
structure.
aps_extension_data_flag may have any value. Its presence and value do not affect
decoder conformance to profiles specified in this version of this Specification. Decoders
conforming to this version of this Specification shall ignore all aps_extension_data_flag
syntax elements.

As described above, the adaptation_parameter_set_id syntax element may represent an identifier of the corresponding APS. That is, the APS may be identified based on the adaptation_parameter_set_id syntax element. The adaptation_parameter_set_id syntax element may be called APS ID information. Further, the APS may include an ALF data field. The ALF data field may be parsed/signaled after the adaptation_parameter_set_id syntax element.

Further, for example, an APS extension flag (e.g., aps_extension_flag syntax element) may be parsed/signaled in the APS. The APS extension flag may indicate whether APS extension data flag (aps_extension_data_flag) syntax elements are present. The APS extension flag may be used, for example, to provide extension points for a later version of the VVC standards.

Figure 8:
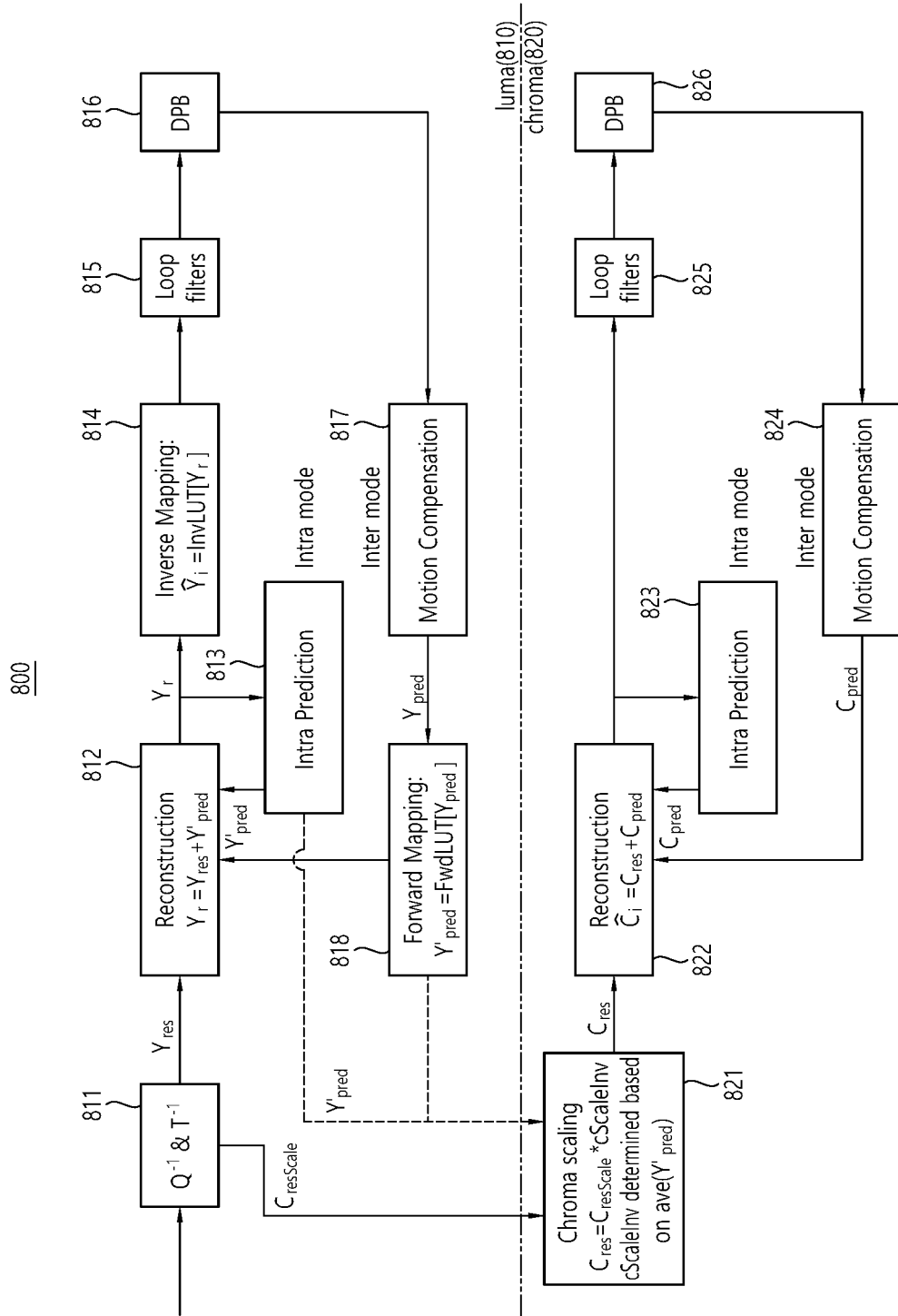
FIG. 8 illustrates an exemplary LMCS structure according to an embodiment of the present document.

FIG. 8 illustrates an exemplary LMCS structure according to an embodiment of the present document. The LMCS structure 800 of FIG. 8 includes an in-loop mapping part 810 of luma components based on adaptive piecewise linear (adaptive PWL) models and a luma-dependent chroma residual scaling part 820 for chroma components. The dequantization and inverse transform 811, reconstruction 812, and intra prediction 813 blocks of the in-loop mapping part 810 represent processes applied in the mapped (reshaped) domain. Loop filters 815, motion compensation or inter prediction 817 blocks of the in-loop mapping part 810, and reconstruction 822, intra prediction 823, motion compensation or inter prediction 824, loop filters 825 block of the chroma residual scaling part 820 represent processes applied in the original (non-mapped, non-reshaped) domain.

As illustrated in FIG. 8, when LMCS is enabled, at least one of the inverse mapping (reshaping) process 814, a forward mapping (reshaping) process 818, and a chroma scaling process 821 may be applied. For example, the inverse mapping process may be applied to a (reconstructed) luma sample (or luma samples or luma sample array) in a reconstructed picture. The inverse mapping process may be performed based on a piecewise function (inverse) index of a luma sample. The piecewise function (inverse) index may identify the piece to which the luma sample belongs. Output of the inverse mapping process is a modified (reconstructed) luma sample (or modified luma samples or modified luma sample array). The LMCS may be enabled or disabled at a level of a tile group (or slice), picture or higher.

The forward mapping process and/or the chroma scaling process may be applied to generate the reconstructed picture. A picture may comprise luma samples and chroma samples. A reconstructed picture with luma samples may be referred to as a reconstructed luma picture, and a reconstructed picture with chroma samples may be referred to as a reconstructed chroma picture. A combination of the reconstructed luma picture and the reconstructed chroma picture may be referred to as a reconstructed picture. The reconstructed luma picture may be generated based on the forward mapping process. For example, if an inter prediction is applied to a current block, a forward mapping is applied to a luma prediction sample derived based on a (reconstructed) luma sample in a reference picture. Because the (reconstructed) luma sample in the reference picture is generated based on the inverse mapping process, the forward mapping may be applied to the luma prediction sample thus a mapped (reshaped) luma prediction sample can be derived. The forward mapping process may be performed based on a piecewise function index of the luma prediction sample. The piecewise function index may be derived based on the value of the luma prediction sample or the value of the luma sample in the reference picture used for inter prediction. If an intra prediction (or an intra block copy (IBC)) is applied to the current block, the forward mapping is not necessary because the inverse mapping process has not applied to the reconstructed samples in the current picture yet. A (reconstructed) luma sample in the reconstructed luma picture is generated based on the mapped luma prediction sample and a corresponding luma residual sample.

The reconstructed chroma picture may be generated based on the chroma scaling process. For example, a (reconstructed) chroma sample in the reconstructed chroma picture may be derived based on a chroma prediction sample and a chroma residual sample ($c_{res}$) in a current block. The chroma residual sample ($c_{res}$) is derived based on a (scaled) chroma residual sample ($c_{resScale}$) and a chroma residual scaling factor (cScaleInv may be referred to as varScale) for the current block. The chroma residual scaling factor may be calculated based on reshaped luma prediction sample values for the current block. For example, the scaling factor may be calculated based on an average luma value ave($Y'_{pred}$) of the reshaped luma prediction sample values $Y'_{pred}$. For a reference, the (scaled) chroma residual sample derived based on the inverse transform/dequantization may be referred to as $c_{resScale}$, and the chroma residual sample derived by performing the (inverse) scaling process to the (scaled) chroma residual sample may be referred to as $c_{res}$.

Figure 9:
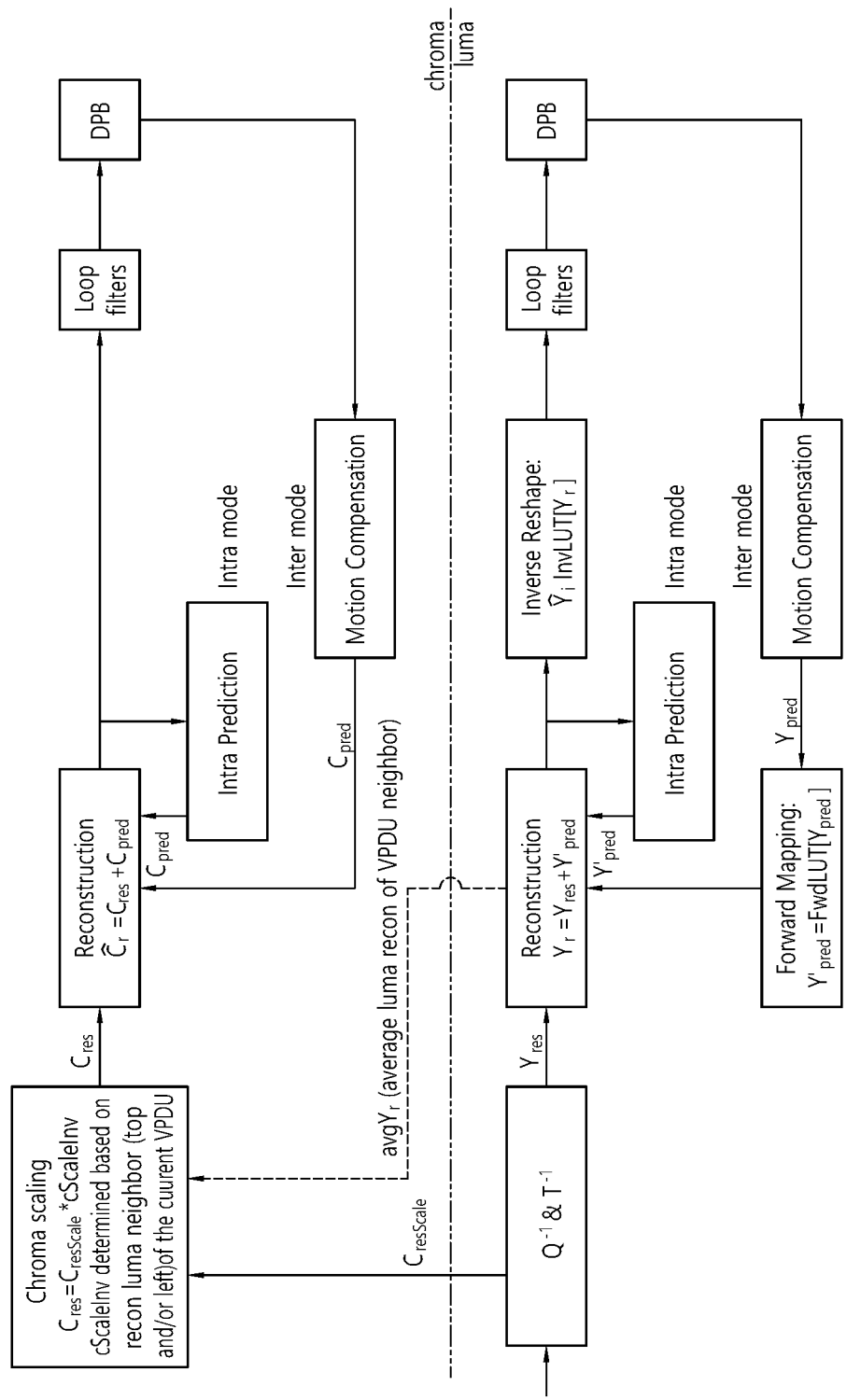
FIG. 9 illustrates an LMCS structure according to another embodiment of the present document.

FIG. 9 illustrates an LMCS structure according to another embodiment of the present document. FIG. 9 is described with reference to FIG. 8. Here, the difference between the LMCS structure of FIG. 9 and the LMCS structure 800 of FIG. 8 is mainly described. The in-loop mapping part and the luma-dependent chroma residual scaling part of FIG. 9 may operate the same as (similarly to) the in-loop mapping part 810 and the luma-dependent chroma residual scaling part 820 of FIG. 8.

Referring to FIG. 9, a chroma residual scaling factor may be derived based on luma reconstructed samples. In this case, an average luma value (avgYr) may be obtained (derived) based on the neighboring luma reconstructed samples outside the reconstructed block, not the inner luma reconstructed samples of the reconstructed block, and the chroma residual scaling factor is derived based on the average luma value (avgYr). Here, the neighboring luma reconstructed samples may be neighboring luma reconstructed samples of the current block, or may be neighboring luma reconstructed samples of virtual pipeline data units (VPDUs) including the current block. For example, when intra prediction is applied to the target block, reconstructed samples may be derived based on prediction samples which are derived based on the intra prediction. In the other example, when inter prediction is applied to the target block, the forward mapping is applied to prediction samples which are derived based on the inter prediction, and reconstructed samples are generated (derived) based on the reshaped (or forward mapped) luma prediction samples.

The video/image information signaled through the bitstream may include LMCS parameters (information on LMCS). LMCS parameters may be configured as high level syntax (HLS, including slice header syntax) or the like. Detailed description and configuration of the LMCS parameters will be described later. As described above, the syntax tables described in the present document (and the following embodiments) may be configured/encoded at the encoder end and signaled to the decoder end through a bitstream. The decoder may parse/decode information on the LMCS (in the form of syntax components) in the syntax tables. One or more embodiments to be described below may be combined. The encoder may encode the current picture based on the information about the LMCS and the decoder may decode the current picture based on the information about the LMCS.

The in-loop mapping of luma components may adjust the dynamic range of the input signal by redistributing the codewords across the dynamic range to improve compression efficiency. For luma mapping, a forward mapping (reshaping) function (FwdMap) and an inverse mapping (reshaping) function (InvMap) corresponding to the forward mapping function (FwdMap) may be used. The FwdMap function may be signaled using a piece-wise linear models, for example, the piece-wise linear model may have 16 pieces or bins. The pieces may have the equal length. In one example, the InvMap function does not need to be signaled and is instead derived from the FwdMap function. That is, the inverse mapping may be a function of the forward mapping. For example, the inverse mapping function may be mathematically built as the symmetric function of the forward mapping as reflected by the line y=x.

An in-loop (luma) reshaping may be used to map input luma values (samples) to altered values in the reshaped domain. The reshaped values may be coded and then mapped back into the original (un-mapped, un-reshaped) domain after reconstruction. To compensate for the interaction between the luma signal and the chroma signal, chroma residual scaling may be applied. In-loop reshaping is done by specifying high level syntax for the reshaper model. The reshaper model syntax may signal a piece-wise linear model (PWL model). For example, the reshaper model syntax may signal a PWL model with 16 bins or pieces of equal lengths. A forward lookup table (FwdLUT) and/or an inverse lookup table (InvLUT) may be derived based on the piece-wise linear model. For example, the PWL model pre-computes the 1024-entry forward (FwdLUT) and inverse (InvLUT) look up tables (LUT)s. As an example, when the forward lookup table FwdLUT is derived, the inverse lookup table InvLUT may be derived based on the forward lookup table FwdLUT. The forward lookup table FwdLUT may map the input luma values Yi to the altered values Yr, and the inverse lookup table InvLUT may map the altered values Yr to the reconstructed values Y'i. The reconstructed values Y'i may be derived based on the input luma values Yi.

In one example, the SPS may include the syntax of Table 9 below. The syntax of Table 9 may include sps_reshaper_enabled_flag as a tool enabling flag. Here, sps_reshaper_enabled_flag may be used to specify whether the reshaper is used in a coded video sequence (CVS). That is, sps_reshaper_enabled_flag may be a flag for enabling reshaping in the SPS. In one example, the syntax of Table 9 may be a part of the SPS.

TABLE 9

|  | Descriptor |
|---|---|
| seq_parameter_set_rbsp( ) { | |
|   sps_seq_parameter_set_id | ue(v) |
|   ... | |
|   sps_reshaper_enabled_flag | u(1) |
|   rbsp_trailing_bits( ) | |
| } | |

In one example, semantics on syntax elements sps_seq_parameter_set_id and sps_reshaper_enabled_flag may be as shown in Table 10 below.

TABLE 10 sps_seq_parameter_set_id provides an identifier for the SPS for reference by other syntax elements.
sps_reshaper_enabled_flag equal to 1 specifies that reshaper is used in the coded video sequence (CVS). sps_reshaper_enabled_flag equal to 0 specifies that reshaper is not used in the CVS.

In one example, the tile group header or the slice header may include the syntax of Table 11 or Table 12 below.

TABLE 11

|  | Descriptor |
|---|---|
| tile_group_header( ) { | |
|   tile_group_pic_parameter_set_id | ue(v) |
|   ... | |
|   if( num_tiles_in_tile_group_minus1 > 0 ) { | |
|     offset_len_minus1 | ue(v) |
|     for( i = 0; i < num_tiles_in_tile_group minus1; i++ ) | |
|       entry_point_offset_minus1[ i ] | u(v) |
|   } | |
|   if ( sps_reshaper_enabled_flag) { | |
|     tile_group_reshaper_model_present_flag | u(1) |
|     if ( tile_group_reshaper_model_present_flag ) | |
|       tile_group_reshape_model ( ) | |
|     tile_group_reshaper_enable_flag | u(1) |
|     if ( tile_group_reshaper_enable_flag && | |
|     (!( qtbtt_dual_tree_intra_flag | |
|     && tile_group_type == I ) ) ) | |
|       tile_group_reshaper_chroma_residual_scale_flag | u(1) |
|   } | |
|   byte_alignment( ) | |
| } | |

TABLE 12

|  | Descriptor |
|---|---|
| slice header( ) { | |
|   slice_pic_parameter_set_id | ue(v) |
|   ... | |
|   if( num_tiles_in_slice_minus1 > 0 ) { | |
|     offset_len_minus1 | ue(v) |
|     for( i = 0; 1 < num_tiles_in_slice_minus1; i++ ) | |
|       entry_point_offset_minus1[ i ] | u(v) |
|   } | |
|   if ( sps_reshaper_enabled_flag ) { | |
|     slice_reshaper_model_present_flag | u(1) |
|     if (slice_reshaper_model_present_flag ) | |
|       slice_reshaper_model ( ) | |
|     slice_reshaper_enable_flag | u(1) |
|     if (slice_reshaper_enable_flag && (! | |
|     ( qtbtt_dual_tree_intra _flag && | |
|     slice type == I ) ) ) | |
|       slice_reshaper_chroma_residual_scale_flag | u(1) |
|   } | |
|   byte_alignment( ) | |
| } | |

Semantics of syntax elements included in the syntax of Table 11 or Table 12 may include, for example, matters disclosed in the following tables.

TABLE 13 tile_group_reshaper_model_present_flag equal to 1 specifies tile_group_reshaper_model ( ) is present in tile group header tile_group_reshaper_model_present_flag equal TABLE 13-continued to 0 specifies tile_group_reshaper_model ( ) is not present in tile group header. When tile_group_reshaper_model_present_flag is not present, it is inferred to be equal to 0.
tile_group_reshaper_enabled_flag equal to 1 specifies that reshaper is enabled for the current tile group.
tile_group_reshaper_enabled_flag equal to 0 specifies that reshaper is not enabled for the current tile group.
When tile_group_reshaper_enable_flag is not present, it is inferred to be equal to 0.
tile_group_reshaper_chroma_residual_scale _flag equal to 1 specifies that chroma residual scaling is enabled for the current tile group.
tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

TABLE 14 slice_reshaper_model_present_flag equal to 1 specifies slice_reshaper_model ( ) is present in slice header
slice_reshaper_model_present_flag equal to 0 specifies slice_reshaper_model( ) is not present in slice header.
When slice_reshaper_model_present_flag is not present, it is inferred to be equal to 0.
slice_reshaper_enabled_flag equal to 1 specifies that reshaper is enabled for the current slice. slice_reshaper_enabled_flag TABLE 14-continued equal to 0 specifies that reshaper is not enabled for the
current slice. When slice_reshaper_enable_flag is not present,
it is inferred to be equal to 0.
slice_reshaper_chroma_residual_scale_flag equal to 1
specifies that chroma residual scaling is enabled for
the current slice. slice_reshaper_chroma_residual_scale_flag
equal to 0 specifies that chroma residual scaling is not
enabled for the current slice. When
slice_reshaper_chroma_residual_scale_flag is
not present, it is inferred to be equal to 0.

As one example, once the flag enabling the reshaping (i.e., sps_reshaper_enabled_flag) is parsed in the SPS, the tile group header may parse additional data (i.e., information included in Table 13 or 14 above) which is used to construct lookup tables (FwdLUT and/or InvLUT). In order to do this, the status of the SPS reshaper flag (sps_reshaper_enabled_flag) may be first checked in the slice header or the tile group header. When sps_reshaper_enabled_flag is true (or 1), an additional flag, i.e., tile_group_reshaper_model_present_flag (or slice_reshaper_model_present_flag) may be parsed. The purpose of the tile_group_reshaper_model_present_flag (or slice_reshaper_model_present_flag) may be to indicate the presence of the reshaping model. For example, when tile_group_reshaper_model_present_flag (or slice_reshaper_ model_present_flag) is true (or 1), it may be indicated that the reshaper is present for the current tile group (or current slice). When tile_group_reshaper_model_present_flag (or slice_reshaper_model_present_flag) is false (or 0), it may be indicated that the reshaper is not present for the current tile group (or current slice).

If the reshaper is present and the reshaper is enabled in the current tile group (or current slice), the reshaper model (i.e., tile_group_reshaper_model( ) or slice_reshaper_model( )) may be processed. Further to this, an additional flag, tile_group_reshaper_enable_flag (or slice_reshaper_enable_flag) may also be parsed. The tile_group_reshaper_enable_flag (or slice_reshaper_enable_flag) may indicate whether the reshaping model is used for the current tile group (or slice). For example, if tile_group_reshaper_enable_flag (or slice_reshaper_enable_flag) is 0 (or false), it may be indicated that the reshaping model is not used for the current tile group (or the current slice). If tile_group_reshaper_enable_flag (or slice_reshaper_enable_flag) is 1 (or true), it may be indicated that the reshaping model is used for the current tile group (or slice).

As one example, tile_group_reshaper_model_present_flag (or slice_reshaper_model_present_flag) may be true (or 1) and tile_group_reshaper_enable_flag (or slice_reshaper_ enable_flag) may be false (or 0). This means that the reshaping model is present but not used in the current tile group (or slice). In this case, the reshaping model can be used in the future tile groups (or slices). As another example, tile_group_reshaper_enable_flag may be true (or 1) and tile_group_reshaper_model_present_flag may be false (or 0). In such a case, the decoder uses the reshaper from the previous initialization.

When the reshaping model (i.e., tile_group_reshaper_model( ) or slice_reshaper_model( )) and tile_group_reshaper_enable_flag (or slice_reshaper_enable_flag) are parsed, it may be determined (evaluated) whether conditions necessary for chroma scaling are present. The above conditions includes a condition 1 (the current tile group/slice has not been intra-coded) and/or a condition 2 (the current tile group/slice has not been partitioned into two separate coding quad tree structures for luma and chroma, i.e. the block structure for The current tile group/slice is not a dual tree structure). If the condition 1 and/or the condition 2 are true and/or tile_group_reshaper_enable_flag (or slice_reshaper_ enable_flag) is true (or 1), then tile_group_reshaper_chroma_residual_scale_flag (or slice_reshaper_chroma_residual_scale_flag) may be parsed. When tile_group_reshaper_ chroma_residual_scale_flag (or slice_reshaper_chroma_residual_scale_flag) is enabled (if 1 or true), it may be indicated that chroma residual scaling is enabled for the current tile group (or slice). When tile_group_reshaper_ chroma_residual_scale_flag (or slice_reshaper_chroma_residual_scale_flag) is disabled (if 0 or false), it may be indicated that chroma residual scaling is disabled for the current tile group (or slice).

The purpose of the tile group reshaping model is to parse the data that would be necessary to construct the lookup tables (LUTs). These LUTs are constructed on the idea that the distribution of an allowable range of luma values can be divided into a plurality of bins (ex. 16 bins) which can be represented using a set of 16 PWL systems of equations. Therefore, any luma value that lies within a given bin can be mapped to an altered luma value.

Figure 10:
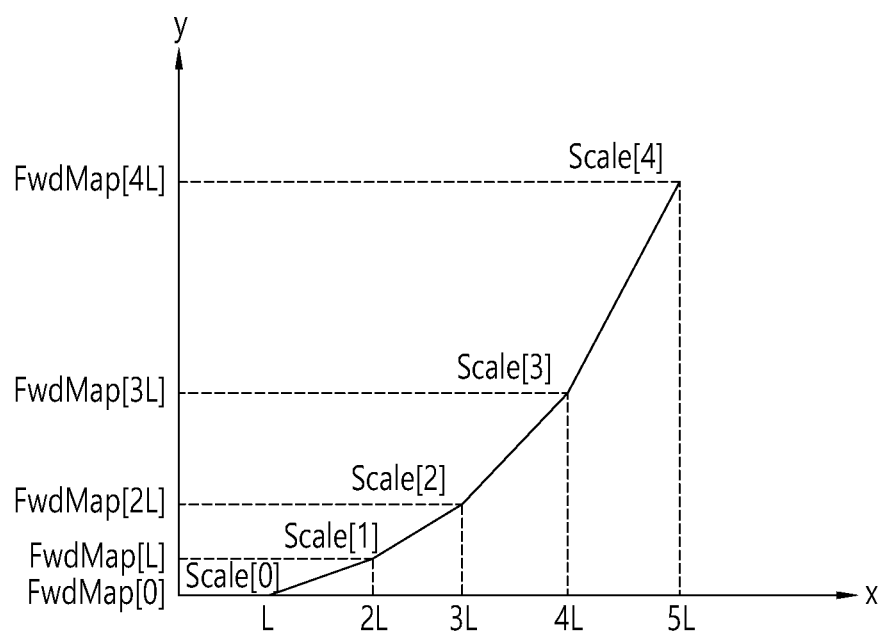
FIG. 10 shows a graph representing an exemplary forward mapping.

FIG. 10 shows a graph representing an exemplary forward mapping. In FIG. 10, five bins are illustrated exemplarily.

Referring to FIG. 10, the x-axis represents input luma values, and the y-axis represents altered output luma values. The x-axis is divided into 5 bins or slices, each bin of length L. That is, the five bins mapped to the altered luma values have the same length. The forward lookup table (FwdLUT) may be constructed using data (i.e., reshaper data) available from the tile group header, and thus mapping may be facilitated.

In one embodiment, output pivot points associated with the bin indices may be calculated. The output pivot points may set (mark) the minimum and maximum boundaries of the output range of the luma codeword reshaping. The calculation process of the output pivot points may be performed by computing a piecewise cumulative distribution function (CDF) of the number of codewords. The output pivot range may be sliced based on the maximum number of bins to be used and the size of the lookup table (FwdLUT or InvLUT). As one example, the output pivot range may be sliced based on a product between the maximum number of bins and the size of the lookup table (size of LUT*maximum number of bin indices). For example, if the product between the maximum number of bins and the size of the lookup table is 1024, the output pivot range may be sliced into 1024 entries. This serration of the output pivot range may be performed (applied or achieved) based on (using) a scaling factor. In one example, the scaling factor may be derived based on Equation 1 below.

$$SF=(y2-y1)*(1<<FP\_PREC)+c \quad \text{[Equation 1]}$$

In Equation 1, SF denotes a scaling factor, and y1 and y2 denote output pivot points corresponding to each bin. Also, FP_PREC and c may be predetermined constants. The scaling factor determined based on Equation 1 may be referred to as a scaling factor for forward reshaping.

In another embodiment, with respect to inverse reshaping (inverse mapping), for a defined range of the bins to be used (i.e., from reshaper_model_min_bin_idx to reshape_model_ max_bin_idx), the input reshaped pivot points which correspond to the mapped pivot points of the forward LUT and the mapped inverse output pivot points (given by bin index under consideration*number of initial codewords) are fetched. In another example, the scaling factor SF may be derived based on Equation 2 below.

$$SF=(y2-y1)*(1<<FP\_PREC)/(x2-x1) \quad \text{[Equation 2]}$$

In Equation 2, SF denotes a scaling factor, x1 and x2 denote input pivot points, and y1 and y2 denote output pivot points corresponding to each piece (bin) (output pivot points of the inverse mapping). Here, the input pivot points may be pivot points mapped based on a forward lookup table (FwdLUT), and the output pivot points may be pivot points inverse-mapped based on an inverse lookup table (InvLUT). Also, FP_PREC may be a predetermined constant value. FP_PREC of Equation 2 may be the same as or different from FP_PREC of Equation 1. The scaling factor determined based on Equation 2 may be referred to as a scaling factor for inverse reshaping. During inverse reshaping, partitioning of input pivot points may be performed based on the scaling factor of Equation 2. The scaling factor SF is used to slice the range of input pivot points. Based on the partitioned input pivot points, bin indices in the range from 0 to the minimum bin index (reshaper_model_min_bin_idx) and/or from the minimum bin index (reshaper_model_min_bin_idx) to the maximum bin index (reshape_model_max_bin_idx) are assigned the pivot values that correspond to the minimum and maximum bin values.

In one example, the LMCS data (lmcs_data) may be included in the APS. The semantics of APS may be, for example, 32 APSs signaled for coding.

The following tables Table 15 and Table 16 in FIG. 21, show syntax and semantics of an exemplary APS according to an embodiment of this document.

TABLE 15

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( adaptation_parameter_set_id ) | |
|   else if( aps_params_type = = LMCS_APS ) | |
|     lmcs_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

Referring to Table 15 above, type information of APS parameters (e.g., aps_params_type) may be parsed/signaled in the APS. The type information of the APS parameters may be parsed/signaled after the adaptation_parameter_set_id.

The aps_params_type, ALF_APS, and LMCS_APS included in Table 15 above may be explained in accordance with Table 3.2 included in Table 16. That is, the types of the APS parameters being applied to the APS in accordance with the aps_params_type included in Table 15 above may be configured as in Table 3.2 included in Table 16. The syntax elements included in Table 15 may be explained with reference to Table 8. The explanation related to the APS may be backed up by the explanation as described above together with Table 1 to Table 8.

Referring to Table 16, for example, the aps_params_type may be a syntax element for classifying types of the corresponding APS parameters. The types of the APS parameters may include ALF parameters and LMCS parameters. Referring to Table 16, if the value of the type information aps_params_type is 0, the name of the aps_params_type may be determined as ALF_APS (or ALF APS), and the types of the APS parameters may be determined as ALF parameters (APS parameters may represent ALF parameters). In this case, an ALF data field (i.e., alf_data( )) may be parsed/signaled to the APS. If the value of the type information aps_params_type is 1, the name of the aps_params_type may be determined as LMCS_APS (or LMCS APS), and the types of the APS parameters may be determined as LMCS parameters (APS parameters may represent LMCS parameters). In this case, an LMCS data field (i.e., lmcs_data( )) may be parsed/signaled to the APS.

Table 17 and/or Table 18 below represent syntax of a reshaper model according to an embodiment. The reshaper model may be called an LMCS model. Here, although the reshaper model has been exemplarily explained as a tile group reshaper, the present specification is not certainly limited by the present embodiment. For example, the reshaper model may be included in the APS, or the tile group reshaper model may be referred to as a slice reshaper model or LMCS data (LMCS data field). Further, a prefix reshaper_model or Rsp may be interchangeably used with lmcs. For example, in next tables and description hereinafter, reshaper_model_min_bin_idx, reshaper_model_delta_max_bin_idx, reshaper_model_max_bin_idx, RspCW, and RsepDeltaCW may be interchangeably used with lmcs_min_bin_idx, lmcs_delta_max_bin_idx, lmcs_max_bin_idx, lmcsCW, and lmcsDeltaCW, respectively.

The LMCS data (lmcs_data( )) or the reshaper model (tile group reshaper or slice reshaper) included in Table 15 above may be expressed as syntaxes included in the following tables.

TABLE 17

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx, i <= reshaper_model_max_bin_idx; i++ ) { | |
|     reshape_model_bin_delta_abs_CW [ i ] | u(v) |
|     if ( reshaper_model_bin_delta_abs_CW [ i ] ) > 0 ) | |
|       reshaper_model_bin_delta_sign_CW_flag[ i ] | u(1) |
|   } | |
| } | |

TABLE 18

| | Descriptor |
|---|---|
| lmcs_data( ) { | |
|   lmcs_min_bin_idx | ue(v) |
|   lmcs_delta_max_bin_idx | ue(v) |
|   lmcs_delta_cw_prec_minus1 | ue(v) |
|   for ( i = lmcs_min_bin_idx, i <= LmcsMaxBinIdx, i++ ) { | |
|     lmcs_delta_abs_cw [ i ] | u(v) |
|     if ( lmcs_delta_abs_cw[ i ] ) > 0 ) | |
|       lmcs_delta_sign_CW_flag[ i ] | u(1) |
|   } | |
|   ... | |
| } | |

The semantics of syntax elements included in the syntax of Table 17 and/or Table 18 may include, for example, matters disclosed in the following table.

TABLE 19 reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta_max_bin_idx specifies the maximum allowed bin (or piece) index MaxBinIdx minus the maximum bin index to be used in the reshaper construction process. The value of reshape_model_max_bin_idx is set equal to
MaxBinIdx − reshape_model_delta_max_bin_idx.
reshaper_model_bin_delta_abs_cw_prec_minus1 plus 1 specifies the number of bits used for the representation of the syntax reshape_model_bin_delta_abs_CW[ i ].
reshape_model_bin_delta_abs_CW[ i ] specifies the absolute delta codeword value for the ith bin.
reshaper_model_bin_delta_sign_CW_flag[ i ] specifies the sign of reshape_model_bin_delta_abs_CW[ i ] as follows:
If reshape_model_bin_delta_sign_CW_flag[ i ] is equal to 0, the corresponding variable RspDeltaCW[ i ] is a positive value.
Otherwise ( reshape_model_bin_delta_sign_CW_flag [ i ] is not equal to 0 ), the corresponding variable RspDeltaCW[ i ] is a negative value.
The variable OrgCW is derived as follows:
    OrgCW = (1 << BitDepthY ) / 16
When reshape_model_bin_delta_sign_CW_flag[ i ] is not present, it is inferred to be equal to 0.
The variable RspDeltaCW[ i ] = (1 − 2*reshape_model_bin_delta_sign_CW
[ i ]) * reshape_model_bin_delta_abs_CW [ i ];
The variable RspCW[ i ] is derived as following steps:
The variable OrgCW is set equal to (1 << BitDepthy ) / ( MaxBinIdx + 1).
If reshaper_model_min_bin_idx < = i < = i <= reshaper_model_max_bin_idx
RspCW[ i ] = OrgCW + RspDeltaCW[ i ].
The value of RspCW[ i ] shall be in the range of (OrgCW>>3) to (OrgCW<<3 − 1), inclusive. The variables InputPivot[ i ] with i in the range of 0 to MaxBinIdx + 1, inclusive are derived as follows:
    InputPivot[ i ] = i * OrgCW
The variable ReshapePivot[ i ] with i in the range of 0 to MaxBinIdx + 1, inclusive, the variable ScaleCoef[ i ] and InvScaleCoeff[ i ]with i in the range of 0 to MaxBinIdx, inclusive, are derived as follows:
    shiftY = 11
    ReshapePivot[ 0 ] = 0;
    for( i = 0; i < = MaxBinIdx ; i++) {
      ReshapePivot[ i + 1 ] = ReshapePivot[ i ] + RspCW[ i ]
      ScaleCoef[ i ] = ( RspCW[ i ] * (1 << shiftY) + (1 << (Log2(OrgCW) − 1))) >> (Log2(OrgCW))
      if ( RspCW[ i ] == 0 )
        InvScaleCoeff[ i ] = 0
      else
        InvScaleCoeff[ i ] OrgCW * (1 << shiftY) / RspCW[ i ]
    }
The variable ChromaScaleCoef[ i ] with i in the range of 0 to MaxBinIdx , inclusive, are derived as follows.
if ( lmcsCW[ i ] = = 0 )
    ChromaScaleCoeff[ i ] = (1 << 11)
else
    ChromaScaleCoeff[ i ] = InvScaleCoeff[ i ]

45

TABLE 20 lmcs_min_bin_idx specifies the minimum bin (or piece) index to be used in the luma mapping with chroma scaling construction process. The value of LmcsMaxBinIdx shall be in the range of 0 to MaxBinIdx, inclusive. The value of MaxBinIdx shall be equal to 15.
lmcs_delta_max_bin_idx specifies the maximum allowed bin (or piece) index MaxBinIdx minus the maximum bin index to be used in the luma mapping with chroma scaling construction process. The value of LmcsMaxBinIdx is set equal to
15− lmcs_delta_max_bin_idx.
lmcs_delta_cw_prec_minus1 plus 1 specifies the number of bits used for the representation of the syntax lmcs_delta_abs_cw[ i ].
lmcs_delta_abs_cw[ i ] specifies the absolute delta codeword value for the ith bin
lmcs_delta_sign_cw_flag[ i ] specifies the sign of lmcsDeltaCW[ i ] as follows:
   If lmcs_delta_sign_cw_flag[ i ] is equal to 0, the corresponding variable lmcsDeltaCW
     CW[ i ] is a positive value.
   Otherwise ( lmcs_delta_sign cw_flag[ i ] is not equal to 0, the corresponding variable
     lmcsDeltaCW[ i ] is a negative value.
When lmcs_delta_sign_CW_flag[ i ] is not present it is inferred to be equal to 0.
The variable OrgCW is derived as follows:
    OrgCW = (1 << BitDepthY ) / 16
The variable lmcsDeltaCW[ i ], with i = lmcs_min_bin idx..LmcsMaxBinIdx, is derived as follows:
    lmcsDeltaCW[ i ] = (1 − 2*lmcs_delta_sign_cw_flag [ i ]) * lmcs_delta_abs_cw [ i ];
The variable lmcsCW[ i ] is derived as following steps:

TABLE 20-continued

```
If lmcs_min_bin_idx < = i <= LmcsMaxBinIdx
   lmcsCW[ i ] = OrgCW + lmcsDeltaCW[ i ]
   Otherwise, lmcsCW[ i ] = 0.
The value of lmcsCW[ i ] shall be in the range of (OrgCW>>3) to (OrgCW<<3 − 1),
inclusive.The variables InputPivot[ i ] with i in the range of 0 to MaxBinIdx + 1, inclusive
are derived as follows:
   InputPivot[ i ] = i * OrgCW
The variable LmcsPivot[ i ] with i in the range of 0 to MaxBinIdx + 1, inclusive, the
variable ScaleCoeff[ i ] and InvScaleCoeff[ i ] with i in the range of 0 to MaxBinIdx ,
inclusive, are derived as follows:
   shiftY = 11
   ReshapePivot[ 0 ] = 0;
   for( i = 0; i <= MaxBinIdx ; i++) {
      ReshapePivot[ i + 1 ] = ReshapePivot[ i ] + RspCW[ i ]
      ScaleCoef[ i ] = ( RspCW[ i ] * (1 << shiftY) + (1 << (Log2(OrgCW) − 1))) >>
   (Log2(OrgCW))
      if ( RspCW[ i ] == 0 )
         InvScaleCoeff[ i ] = 0
      else
         InvScaleCoeff[ i ] = OrgCW * (1 << shiftY) / RspCW[ i ]
   }
The variable ChromaScaleCoeff[ i ] with i in the range of 0 to MaxBinIdx , inclusive, are
derived as follows:
if ( lmcsCW[ i ] = = 0 )
   ChromaScaleCoeff[ i ] = (1 << 11)
else                                                                     (7 91)
   ChromaScaleCoeff[ i ] = InvScaleCoeff[ i ]
```

The inverse mapping process for the luma sample according to the present document may be described in a form of the standard document as shown in the table below.

TABLE 21

Inverse mapping process for a luma sample

```
Input to this process is a luma sample lumaSample.
Output of this process is a modified luma sample invLumaSample.
The value of invLumaSample is derived as follows:
   If slice_lmcs_enabled_flag of the slice that contains the luma
   sample lumaSample is equal to 1, the following ordered steps apply:
   1. The variable idxYInv is derived by invoking the identification of
   piece-wise function index process for a luma sample as specified in
   clause 8.8.2.3 with lumaSample as the input and idxYInv
   as the output.
   2. The variable invSample is derived as follows:
   invSample = InputPivot[ idxYInv ] + ( InvScaleCoeff[ idxYInv ] *
   ( lumaSample − LmcsPivot[ idxYInv ] ) + ( 1 << 10 ) ) >> 11
   3. The inverse mapped luma sample invLumaSample is derived
   as follows: invLumaSample = Clip1Y( invSample )
   Otherwise, invLumaSample is set equal to lumaSample.
```

Identification of a piecewise function index process for a luma sample according to the present document may be described in a form of the standard document as shown in the table below. In Table 22, idxYInv may be referred to as an inverse mapping index, and the inverse mapping index may be derived based on reconstructed luma samples (lumaSample).

TABLE 22

Identification of piecewise function index process for a luma sample

```
Input to this process is a luma sample lumaSample.
Output of this process is an index idxYInv identifing the piece to
which the luma sample lumaSample belongs.
The variable idxYInv is derived as follows:
if ( lumaSample < LmcsPivot[ lmcs_min_bin_idx + 1 ] )
   idxYInv = lmcs_min_bin_idx
else if ( lumaSample >= LmcsPivot[ LmcsMaxBinIdx ] )
   idxYInv = LmcsMaxBinIdx
```

TABLE 22-continued

Identification of piecewise function index process for a luma sample

```
else {
   for( idxYInv = lmcs_min_bin_idx; idxYInv < LmcsMaxBinIdx;
   idxYInv++ ) {
      if( lumaSample < LmcsPivot [ idxYInv + 1 ] )
         break
   }
}
```

Luma mapping may be performed based on the above-described embodiments and examples, and the above-described syntax and components included therein may be merely exemplary representations, and embodiments in the present document are not limited by the above-mentioned tables or equations. Hereinafter, a method for performing chroma residual scaling (scaling for chroma components of residual samples) based on luma mapping is described.

The (luma-dependent) Chroma residual scaling is designed to compensate for the interaction between the luma signal and its corresponding chroma signals. For example, whether chroma residual scaling is enabled or not is also signaled at the tile group level. In one example, if luma mapping is enabled and if dual tree partition (also known as separate chroma tree) is not applied to the current tile group, an additional flag is signaled to indicate if the luma-dependent chroma residual scaling is enabled or not. In other example, when luma mapping is not used, or when dual tree partition is used in the current tile group, luma-dependent chroma residual scaling is disabled. In another example, the luma-dependent chroma residual scaling is always disabled for the chroma blocks whose area is less than or equal to 4.

The chroma residual scaling may be based on an average value of a corresponding luma prediction block (a luma component of a prediction block to which an intra prediction mode and/or an inter prediction mode is applied). Scaling operations at the encoder end and/or the decoder side may be implemented with fixed-point integer arithmetic based on Equation 3 below.

$$c'=\text{sign}(c)*((\text{abs}(c)s+2^{CSCALE\_FP\_PREC-1})\gg CSCALE\_FP\_PREC) \qquad [\text{Equation 3}]$$

In Equation 3, c' denotes a scaled chroma residual sample (scaled chroma component of a residual sample), c denotes a chroma residual sample (chroma residual sample, chroma component of residual sample), s denotes a chroma residual scaling factor, and CSCALE_FP_PREC denotes a (predefined) constant value to specify precision. For example, CSCALE_FP_PREC may be 11.

Figure 11:
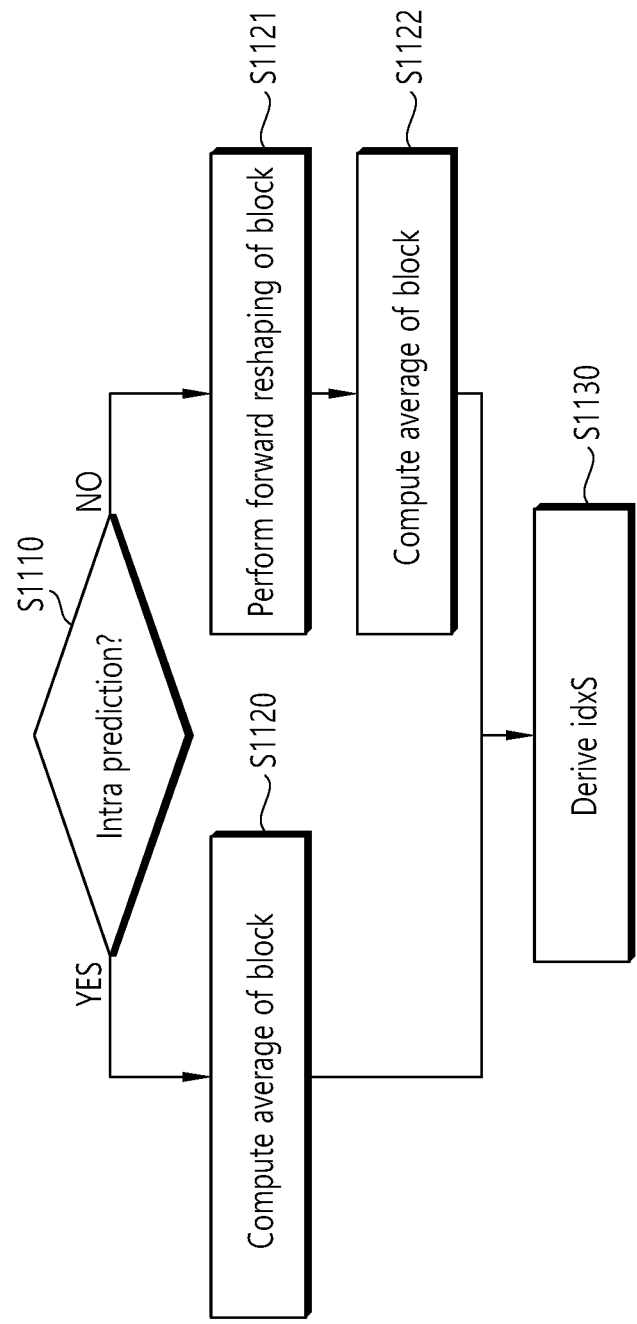
FIG. 11 is a flowchart illustrating a method for deriving a chroma residual scaling index according to an embodiment of the present document.

FIG. 11 is a flowchart illustrating a method for deriving a chroma residual scaling index according to an embodiment of the present document. The method in FIG. 11 may be performed based on FIG. 8, and tables, equations, variables, arrays, and functions included in the description related to FIG. 8.

In the step S1110, it may be determined whether the prediction mode for the current block is the intra prediction mode or the inter prediction mode based on the prediction mode information. If the prediction mode is the intra prediction mode, the current block or prediction samples of the current block are considered to be already in the reshaped (mapped) region. If the prediction mode is the inter prediction mode, the current block or the prediction samples of the current block are considered to be in the original (unmapped, non-reshaped) region.

In the step S1120, when the prediction mode is the intra prediction mode, an average of the current block (or luma prediction samples of the current block) may be calculated (derived). That is, the average of the current block in the already reshaped area is calculated directly. The average may also be referred to as an average value, a mean, or a mean value.

In the step S1121, when the prediction mode is the inter prediction mode, forward reshaping (forward mapping) may be performed (applied) on the luma prediction samples of the current block. Through forward reshaping, luma prediction samples based on the inter prediction mode may be mapped from the original region to the reshaped region. In one example, forward reshaping of the luma prediction samples may be performed based on the reshaping model described with Table 17 and/or Table 18 above.

In the step S1122, an average of the forward reshaped (forward mapped) luma prediction samples may be calculated (derived). That is, an averaging process for the forward reshaped result may be performed.

In the step S1130, a chroma residual scaling index may be calculated. When the prediction mode is the intra prediction mode, the chroma residual scaling index may be calculated based on the average of the luma prediction samples. When the prediction mode is the inter prediction mode, the chroma residual scaling index may be calculated based on an average of forward reshaped luma prediction samples.

In an embodiment, the chroma residual scaling index may be calculated based on a for loop syntax. The table below shows an exemplary for loop syntax for deriving (calculating) the chroma residual scaling index.

TABLE 23

```
for( idxS = 0, idxFound = 0; idxS <= MaxBinIdx; idxS++ )
{
  if( (S < ReshapePivot[ idxS + 1 ] )
  {
    idxFound = 1
    break;
  }
}
```

In Table 23, idxS represents the chroma residual scaling index, idxFound represents an index identifying whether the chroma residual scaling index satisfying the condition of the if statement is obtained, S represents a predetermined constant value, and MaxBinIdx represents the maximum allowable bin index. ReshapPivot[idxS+1] (in other words, LmcsPivot[idxS+1]) may be derived based on Tables 19 and/or 20 described above.

In an embodiment, the chroma residual scaling factor may be derived based on the chroma residual scaling index. Equation 4 is an example for deriving the chroma residual scaling factor.

$$s = ChromaScaleCoef[idxS] \qquad \text{[Equation 4]}$$

In Equation 4, s represents the chroma residual scaling factor, and ChromaScaleCoef may be a variable (or array) derived based on Tables 19 and/or 20 described above.

As described above, the average luma value of the reference samples may be obtained, and the chroma residual scaling factor may be derived based on the average luma value. As described above, the chroma component residual sample may be scaled based on the chroma residual scaling factor, and the chroma component reconstruction sample may be generated based on the scaled chroma component residual sample.

In one embodiment of the present document, a signaling structure for efficiently applying the above-described LMCS is proposed. According to this embodiment of the present document, for example, LMCS data may be included in HLS (i.e., an APS), and through the header information (i.e., picture header, slice header) that is a lower level of the APS, an LMCS model (reshaper model) may be adaptively derived by signaling the ID of the APS, which is referred to the header information. The LMCS model may be derived based on LMCS parameters. Also, for example, a plurality of APS IDs may be signaled through the header information, and through this, different LMCS models may be applied in units of blocks within the same picture/slice.

In one embodiment according to the present document, a method for efficiently performing an operation required for LMCS is proposed. According to the semantics described above in Table 19 and/or Table 20, a division operation by the piece length lmcsCW[i] (also noted as RspCW[i] in the present document) is required to derive InvScaleCoeff[i]. The piece length of the inverse mapping may not be power of 2, which means the division cannot be performed by bit shifting.

For example, calculating InvScaleCoeff may require up to 16 divisions per slice. According to Table 19 and/or Table 20 described above, for 10 bit coding, the range of lmcsCW[i] is from 8 to 511, so to implement the division operation by lmcsCW[i] using the LUT, the size of the LUT must be 504. Also, for 12 bit coding, the range of lmcsCW[i] is from 32 to 2047, so the LUT size needs be 2016 to implement the division operation by lmcsCW[i] using the LUT. That is, division is expensive in hardware implementation, therefore it is desirable to avoid division if possible.

In one aspect of this embodiment, lmcsCW[i] may be constrained to be multiple of a fixed number (or a predetermined number or a pre-determined number). Accordingly, a lookup table (LUT) (capacity or size of the LUT) for the division may be reduced. For example, if lmcsCW[i] becomes multiple of 2, the size of the LUT to replace division process may be reduced by half.

In another aspect of this embodiment, it is proposed that for coding with higher internal bit depth coding, on the top of existing constraints "The value of lmcsCW[i] shall be in the range of (OrgCW>>3) to (OrgCW<<3−1)", further constrain lmcsCW[i] to be multiple of 1<<(BitDepthY−10) if coding bit depth is higher than 10. Here, BitDepthY may be the luma bit depth. Accordingly, the possible number of lmcsCW[i] would not vary with the coding bitdepth, and the size of LUT needed to calculate the InvScaleCoeff do not increase for higher coding bitdepth. For example, for 12-bit internal coding bitdepth, limit the values of lmcsCW[i] being multiple of 4, then the LUT to replace division process will be the same as what is to be used for 10-bit coding. This aspect can be implemented alone, but it can also be implemented in combination with the above-mentioned aspect.

In another aspect of this embodiment, lmcsCW[i] may be constrained to a narrower range. For example, lmcsCW[i] may be constrained within the range from (OrgCW>>1) to (OrgCW<<1)−1. Then for 10 bit coding, the range of lmcsCW[i] may be [32, 127], and therefore it only needs a LUT having a size of 96 to calculate InvScaleCoeff.

In another aspect of the present embodiment, lmcsCW[i] may be approximated to closest numbers being power of 2, and used that in the reshaper design. Accordingly, the division in the inverse mapping can be performed (and replaced) by bit shifting.

In one embodiment according to the present document, constraint of the LMCS codeword range is proposed. According to Table 8 described above, the values of the LMCS codewords are in the range from (OrgCW>>3) to (OrgCW<<3)−1. This codeword range is too wide. It may result in visual artifact issue when there are large differences between RspCW [i] and OrgCW.

According to one embodiment according to the present document, it is proposed to constrain the codeword of the LMCS PWL mapping to a narrow range. For example, the range of lmcsCW[i] may be in the range (OrgCW>>1) to (OrgCW<<1)−1.

In one embodiment according to the present document, use of a single chroma residual scaling factor is proposed for chroma residual scaling in LMCS. The existing method for deriving the chroma residual scaling factor uses the average value of the corresponding luma block and derives the slope of each piece of the inverse luma mapping as the corresponding scaling factor. In addition, the process to identify the piecewise index requires the availability of the corresponding luma block, it results in latency problem. This is not desirable for hardware implementation. According to this embodiment of the present document, scaling in a chroma block may not depend on a luma block value, and it may not be necessary to identify a piecewise index. Therefore, the chroma residual scaling process in the LMCS can be performed without a latency issue.

In one embodiment according to the present document, the single chroma scaling factor may be derived from both the encoder and the decoder based on the luma LMCS information. When the LMCS luma model is received, the chroma residual scaling factor may be updated. For example, when the LMCS model is updated, the single chroma residual scaling factor may be updated.

The table below shows an example for obtaining the single chroma scaling factor according to the present embodiment.

TABLE 24

```
Sum = 0;
for( i = lmcs_min_bin_idx ; i <= lmcs_max_bin_idx ; i++) {
    sum += InvScaleCoeff[ i ]
}
ChromaScaleCoeff= sum /
( lmcs_max_bin_idx − lmcs_min_bin_idx +1);
```

Referring to Table 24, a single chroma scaling factor (ex. ChromaScaleCoeff or ChromaScaleCoeffSingle) may be obtained by averaging the inverse luma mapping slopes of all pieces within the lmcs_min_bin_idx and lmcs_max_bin_idx.

Figure 12:
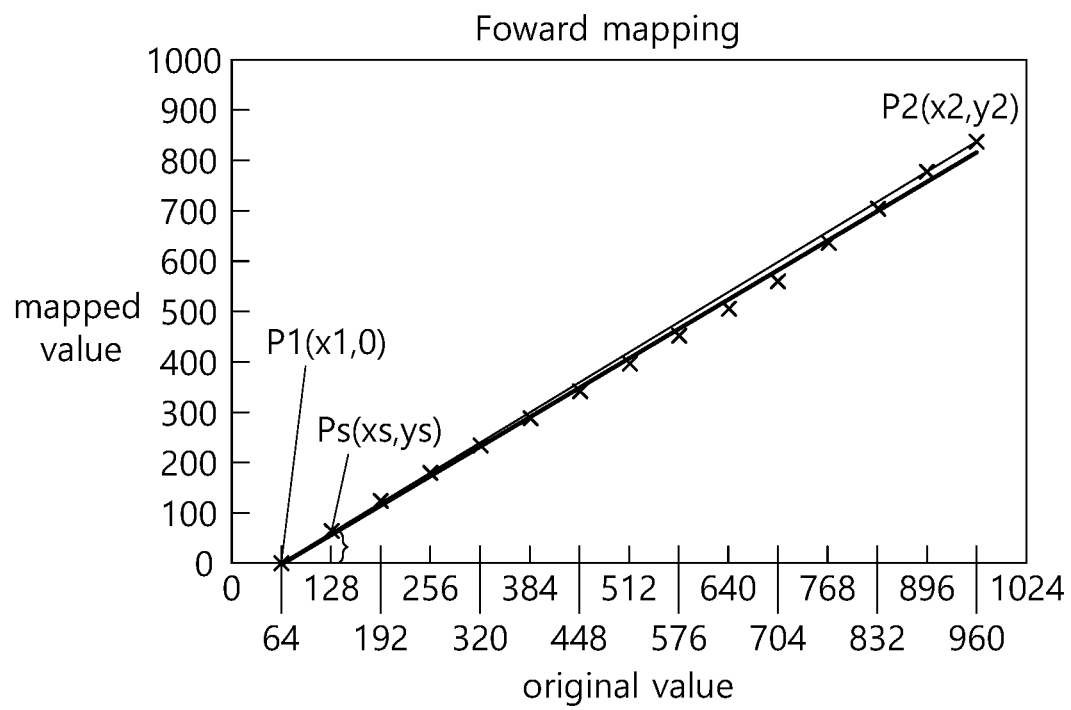
FIG. 12 illustrates a linear fitting of pivot points according to an embodiment of the present document.

FIG. 12 illustrates a linear fitting of pivot points according to an embodiment of the present document. In FIG. 12, pivot points P1, Ps, and P2 are shown. The following embodiments or examples thereof will be described with FIG. 12.

In an example of this embodiment, the single chroma scaling factor may be obtained based on a linear approximation of the luma PWL mapping between the pivot points lmcs_min_bin_idx and lmcs_max_bin_idx+1 (LmcsMaxBinIdx+1). That is, the inverse slope of the linear mapping may be used as the chroma residual scaling factor. For example, the linear line 1 of FIG. 12 may be a straight line connecting the pivot points P1 and P2. Referring to FIG. 12, in P1, the input value is x1 and the mapped value is 0, and in P2, the input value is x2 and the mapped value is y2. The inverse slope (inverse scale) of linear line 1 is (x2−x1)/y2, and the single chroma scaling factor ChromaScaleCoeffSingle may be calculated based on the input values and mapped values of pivot points P1, P2, and the following equation.

$$\text{ChromaScaleCoeffSingle}=(x2-x1)*(1<<\text{CSCALE\_FP\_PREC})/y2 \quad \text{[Equation 5]}$$

In Equation 5, CSCALE_FP_PREC represents a shift factor, for example, CSCALE_FP_PREC may be a predetermined constant value. In one example, CSCALE_FP_PREC may be 11.

In other example according to this embodiment, referring to FIG. 12, the input value at the pivot point Ps is min_bin_idx+1 and the mapped value at the pivot point Ps is ys. Accordingly, the inverse slope (inverse scale) of the linear line 1 can be calculated as (xs−x1)/ys, and the single chroma scaling factor ChromaScaleCoeffSingle may be calculated based on the input values and mapped values of the pivot points P1, Ps, and the following equation.

$$\text{ChromaScaleCoeffSingle}=(xs-x1)*(1<<\text{CSCALE\_FP\_PREC})/ys \quad \text{[Equation 6]}$$

In Equation 6, CSCALE_FP_PREC represents a shift factor (a factor for bit shifting), for example, CSCALE_FP_PREC may be a predetermined constant value. In one example, CSCALE_FP_PREC may be 11, and bit shifting for inverse scale may be performed based on CSCALE_FP_PREC.

In another example according to this embodiment, the single chroma residual scaling factor may be derived based on a linear approximation line. An example for deriving a linear approximation line may include a linear connection of pivot points (i.e., lmcs_min_bin_idx, lmcs_max_bin_idx+ 1). For example, the linear approximation result may be represented by codewords of PWL mapping. The mapped value y2 at P2 may be the sum of the codewords of all bins (fragments), and the difference between the input value at P2 and the input value at P1 (x2−x1) is OrgCW*(lmcs_max_bin_idx−lmcs_min_bin_idx+1) (for OrgCW, see Table 19 and/or Table 20 above). The table below shows an example of obtaining the single chroma scaling factor according to the above-described embodiment.

TABLE 25

```
Sum = 0;
for( i = lmcs_min_bin_idx ; i <= lmcs_max_bin_idx ; i++ ) {
    sum += lmcsCW[ i ]
}
ChromaSealeCoeffSingle = OrgCW *
( lmcs_max_bin_idx − lmcs_min_bin_idx +1 )
    * (1 << CSCALE _FP_PREC) / sum;
```

Referring to Table 25, the single chroma scaling factor (ex. ChromaScaleCoeffSingle) may be obtained from two pivot points (i.e., lmcs_min_bin_idx, lmcs_max_bin_idx). For example, the inverse slope of linear mapping may be used as the chroma scaling factor.

In another example of this embodiment, the single chroma scaling factor may be obtained by linear fitting of pivot points to minimize an error (or mean square error) between the linear fitting and the existing PWL mapping. This example may be more accurate than simply connecting the two pivot points at lmcs_min_bin_idx and lmcs_max_bin_idx. There are many ways to find the optimal linear mapping and such example is described below.

In one example, parameters b1 and b0 of a linear fitting equation y=b1*x+b0 for minimizing the sum of least square error may be calculated based on Equations 7 and/or 8 below.

$$b1 = \frac{\sum_{1}^{n}(x_i - \bar{x})(y_i - \bar{y})}{\sum_{1}^{n}(x_i - \bar{x})^2}$$ [Equation 7]

$$b0 = \bar{y} - b_1\bar{x}$$ [Equation 8]

In Equation 7 and 8, x is the original luma values, and y is the reshaped luma values, and y are the mean of x and y, and $x_i$ and $y_i$ represent values of the i-th pivot points.

Referring to FIG. 12, another simple approximation to identify the linear mapping is given as:
- Get the linear line1 by connecting pivot points of PWL mapping at lmcs_min_bin_idx and lmcs_max_bin_idx+1, calculated lmcs_pivots_linear[i] of this linear line at input values of multiples of OrgW
- Sum up the differences between the pivot points mapped values using the linear line1 and using PWL mapping.
- Get the average difference avgDiff.
- Adjust the last pivot point of the linear line according to the average difference, e.g., 2*avgDiff
- Use the inverse slope of the adjusted linear line as the chroma residual scale.

According to the above-described linear fitting, the chroma scaling factor (i.e., the inverse slope of forward mapping) may be derived (obtained) based on Equation 9 or 10 below.

$$\text{ChromaScaleCoeffSingle} = \text{OrgCW} * (1 << \text{CSCALE\_FP\_PREC})/\text{lmcs\_pivots\_linear}[\text{lmcs\_min\_bit\_idx}+1]$$ [Equation 9]

$$\text{ChromaScaleCoeffSingle} = \text{OrgCW}*(\text{lmcs\_max\_bin\_idx}-\text{lmcs\_max\_bin\_idx}+1)* (1<<\text{CSCALE\_FP\_PREC})/\text{lmcs\_pivots\_linear}[\text{lmcs\_max\_bin\_idx}+1]$$ [Equation 10]

In the above-described equations, lmcs_pivots_linear[i] may be mapped values of linear mapping. With linear mapping, all pieces of PWL mapping between minimum and maximum bin indices may have the same LMCS codeword (lmcsCW). That is, lmcs_pivots_linear[lmcs_min_bin_idx+1] may be the same as lmcsCW[lmcs_min_bin_idx].

Also, in Equations 9 and 10, CSCALE_FP_PREC represents a shift factor (a factor for bit shifting), for example, CSCALE_FP_PREC may be a predetermined constant value. In one example, CSCALE_FP_PREC may be 11.

With the single chroma residual scaling factor (ChromaScaleCoeffSingle), there is no need to calculate the average of the corresponding luma block, find the index in the PWL linear mapping to get the chroma residual scaling factor any more. Accordingly, the efficiency of coding using chroma residual scaling may be increased. This not only eliminates the dependency on corresponding luma block, solves the latency problem, but also reduces the complexity.

The LMCS data-related semantics and/or chroma samples-related luma-dependent chroma residual scaling procedure according to the present embodiment described above may be described in the form of a standard document as in the following tables.

TABLE 26

7.4.6.4 Luma mapping with chroma scaling data semantics lmcs_min_bin_idx specifies the minimum bin index used in the luma mapping with chroma sealing construction process. The value of lmcs_min_bin_idx shall be in the range of 0 to 15, inclusive.
lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15 − lmcs_delta_max_bin_idx.
The value of LmcsMaxBinIdx shall be greater than or equal to lmcs_min_bin_idx.
lmcs_delta_cw_prec_minus1 plus 1 specifies the number of bits used for the representation of the syntax lmcs_delta_abs_cw[ i ].
The value of lmcs_delta_cw_prec, minus1 shall be in the range of 0 to BitDepthY − 2, inclusive.
. . .
The variable diffMaxMinBinIdX, lmcsCWLinear and ChromaScaleCoeffSingle are derived as follows
   diffMaxMinBinIdX = LmcsMaxBinIdx − lmcs_min_bin idx+1,
   lmcsCWLinear = (LmcsPivot[LmcsMaxBinIdx+1]+
   ( diffMaxMinBinIdX>>1))/ diffMaxMinBinIdX,
   ChromaScaleCoeffSingle= OrgCW * (1 << 11) /
lmcsCWLinear   (7-94)

TABLE 27

8.7.5.3 Picture reconstruction with luma dependent chroma residual scaling process for chroma samples Inputs to this process are:
- a location ( xCurr, yCurr ) of the top-left sample of the current transform block relative to the top-left sample of the current picture,
- a variable nCurrSw specifying the transform block width,
- a variable nCurrSh specifying the transform block height,
- a variable tuCbfChroma specifying the coded block flag of the current chroma transform block,
- an (nCurrSw)×(nCurrSh) array predSamples specifying the chroma prediction samples of the current block,
- an (nCurrSw)×(nCurrSh) array resSamples specifying the chroma residual samples of the current block.
Output of this process is a reconstructed chroma picture sample array recSamples.

TABLE 27-continued 8.7.5.3 Picture reconstruction with luma dependent chroma residual scaling process for chroma samples The reconstructed chroma picture sample recSamples is derived as follows for i = 0..nCurrSw − 1, j = 0..nCurrSh − 1:
- If one of the following conditions is true, recSamples[ xCurr + i ][ yCurr + j ] is set equal to Clip1$_C$( predSamples[ i ][ j ] + resSamples[ i ][ j ] ):
- slice_chroma_residual_scale_flag is equal to 0
- nCurrSw * nCurrSh is less than or equal to 4
- tu_cbf_cb [ xCurr ][ yCurr ] is equal to 0 and tu_cbf_cr [ xCurr ][ yCurr ] is equal to 0
- Otherwise, the recSamples is derived as follows:
  - If tuCbfChroma is equal to 1, the following applies:
    resSamples[ i ][ j ] =
      Clip3( −( 1 <<BitDepth$_C$ ), (1 << BitDepth$_C$ ) − 1, resSamples[ i ][ j ] )                (8-998)
    recSamples[ xCurr + i ][ yCurr + j ] = Clip1$_C$( predSamples[ i ][ j ] +                       (8-999)
      Sign( resSamples[ i ][ j ] ) * ( ( Abs( resSamples[ i ][ j ] * ChromaScaleCoeffSingle + ( 1 <<10 ) )>>11 ) )
  - Otherwise (tu_cbf is equal to 0), the following applies:
    recSamples[ xCurr + i ][ yCurr + j ] = Clip1$_C$(predSamples[ i ][ j ] )                        (8-1000)

In another embodiment of the present document, the encoder may determine parameters related to the single chroma scaling factor and signal the parameters to the decoder. With signaling, the encoder may utilize other information available at encoder to derive the Chroma scaling factor. This embodiment aims to eliminate the chroma residual scaling latency problem.

For example, another example to identify the linear mapping to be used for determine chroma residual scaling factor is given as below:
- by connecting pivot points of PWL mapping at lmcs_min_ bin_idx and lmcs_max_bin_idx+1, calculated lmcs_pivots_linear[i] of this linear line at input values of multiples of OrgW
- Get weighted sum of the differences between the mapped values of pivot points using the linear line1 and those of luma PWL mapping. The weight may be based on the encoder statistics such as histogram of a bin.
- Get the weighted average difference avgDiff.
- Adjust the last pivot point of the linear line1 according to the weighted average difference, e.g., 2*avgDiff
- Use the inverse slope of the adjusted linear line to calculate the chroma residual scale.

The tables below show examples of syntaxes for signaling the y value for chroma scaling factor derivation.

TABLE 28

|  | Descriptor |
|---|---|
| lmcs_data ( ) { |  |
|   lmcs_min_bin_idx | ue(v) |
|   lmcs_delta_max_bin_idx | ue(v) |
|   lmcs_delta_cw_prec_minus1 | ue(v) |
|   for ( i = lmcs_min_bin_idx, i <= LmcsMaxBinIdx, i++ ) { |  |
|     lmcs_delta_abs_cw[ i ] | u(v) |
|     if ( lmcs_delta_abs_cw[ i ] ) > 0 ) |  |
|       lmcs_delta_sign_cw_flag[ i ] | u(1) |
|   } |  |
|   lmcs_chroma_scale | u(v) |
| } |  |

In Table 28, the syntax element lmcs_chroma_scale may specify a single chroma (residual) scaling factor used for LMCS chroma residual scaling (ChromaScaleCoeffSingle=lmcs_chroma_scale). That is, information on the chroma residual scaling factor may be directly signaled, and the signaled information may be derived as the chroma residual scaling factor. In other words, the value of the signaled information on the chroma residual scaling factor may be (directly) derived as the value of the single chroma residual scaling factor. Here, the syntax element lmcs_chroma_scale may be signaled together with other LMCS data (i.e., a syntax element related to an absolute value and a sign of the codeword, etc.).

Alternatively, the encoder may signal only necessary parameters to derive the chroma residual scaling factor at decoder. In order to derive the chroma residual scaling factor at the decoder, it needs an input value x and a mapped value y. Since the x value is the bin length, and is a known number, no need to be signaled. After all, only the y value needs to be signaled in order to derive the chroma residual scaling factor. Here, the y value may be a mapped value of any pivot point in the linear mapping (i.e., mapped values of P2 or Ps in FIG. 12).

The following tables show examples of signaling mapped values for deriving the chroma residual scaling factor.

TABLE 29

|  | Descriptor |
|---|---|
| lmcs_data ( ) { |  |
|   lmcs_min_bin_idx | ue(v) |
|   lmcs_delta_max_bin_idx | ue(v) |
|   lmcs_delta_cw_prec_minus1 | ue(v) |
|   for ( i = lmcs_min _bin_idx; i <= LmcsMaxBinIdx; i++ ) { |  |
|     lmcs_delta_abs_cw[ i ] | u(v) |
|     if ( lmcs_delta_abs_cw[ i ] ) > 0 ) |  |
|       lmcs_delta_sign_cw_flag[ i ] | u(1) |
|   } |  |
|   lmcs_cw_linear | u(v) |
| } |  |

TABLE 30

|  | Descriptor |
|---|---|
| lmcs_data ( ) { |  |
|   lmcs_min_bin_idx | ue(v) |
|   lmcs_delta_max_bin_idx | ue(v) |
|   lmcs_delta_cw_prec_minus1 | ue(v) |
|   for ( i = lmcs_min_bin_idx; i <= LmcsMaxBinIdx; i++ ) { |  |
|     lmcs_delta_abs_cw[ i ] | u(v) |
|     if ( lmcs_delta_abs_cw[ i ] ) > 0 ) |  |
|       lmcs_delta_sign_cw_flag[ i ] | u(1) |
|   } |  |
|   lmcs_dellta_abs_cw_linear | u(v) |
|   if ( lmcs_delta_abs_cw_linear ) > 0 ) |  |
|     lmcs_delta_sign_cw_linear_flag | u(1) |
| } |  |

One of the syntaxes of Tables 29 and 30 described above may be used to signal the y value at any linear pivot points specified by the encoder and decoder. That is, the encoder and the decoder may derive the y value using the same syntax.

First, an embodiment according to Table 29 is described. In Table 29, lmcs_cw_linear may denote a mapped value at Ps or P2. That is, in the embodiment according to Table 29, a fixed number may be signaled through lmcs_cw_linear.

In an example according to this embodiment, if lmcs_cw_linear denotes a mapped value of one bin (i.e., lmcs_pivots_linear[lmcs_min_bin_idx+1] in Ps of FIG. 12), the chroma scaling factor may be derived based on the following equation.

ChromaScaleCoeffSingle=OrgCW*
(1<<CSCALE_FP_PREC)/lmcs_cw_linear    [Table 24]

In another example according to this embodiment, if lmcs_cw_linear denotes lmcs_max_bin_idx+1 (i.e. lmcs_pivots_linear[lmcs_max_bin_idx+1] in P2 of FIG. 12), the chroma scaling factor may be derived based on the following equation.

ChromaScaleCoeffSingle=OrgCW*(lmcs_max_bin_idx−lmcs_max_bin_idx+1)*
(1<<CSCALE_FP_PREC)/lmcs_cw_linear    [Equation 12]

In the above-described equations, CSCALE_FP_PREC represents a shift factor (a factor for bit shifting), for example, CSCALE_FP_PREC may be a predetermined constant value. In one example, CSCALE_FP_PREC may be 11.

Next, an embodiment according to Table 30 is described. In this embodiment, lmcs_cw_linear may be signaled as a delta value relative to a fixed number (i.e. lmcs_delta_abs_cw_linear, lmcs_delta_sign_cw_linear_flag). In an example of this embodiment, when lmcs_cw_linear represents a mapped value in lmcs_pivots_linear[lmcs_min_bin_idx+1] (i.e. Ps of FIG. 12), lmcs_cw_linear_delta and lmcs_cw_linear may be derived based on the following equations.

lmcs_cw_linear_delta=(1−2*lmcs_delta_sign_cw_linear_flag)*lmcs_delta_abs_linear_cw    [Equation 13]

lmcs_cw_linear=lmcs_cw_linear_delta+OrgCW    [Equation 14]

In another example of this embodiment, when lmcs_cw_linear represents a mapped value in lmcs_pivots_linear[lmcs_max_bin_idx+1] (i.e. P2 of FIG. 12), lmcs_cw_linear_delta and lmcs_cw_linear may be derived based on the following equations.

lmcs_cw_linear_delta=(1−2*lmcs_delta_sign_cw_linear_flag)*lmcs_delta_abs_linear_cw    [Table 15]

lmcs_cw_linear=lmcs_cw_linear_delta+OrgCW*
(lmcs_max_bin_idx−lmcs_max_bin_idx+1)    [Equation 16]

In the above-described equations, OrgCW may be a value derived based on Table 19 and/or Table 20 described above.

The LMCS data-related semantics and/or chroma samples-related luma-dependent chroma residual scaling procedure according to the present embodiment described above may be described in the form of a standard document as in the following tables.

TABLE 31

| 7.4.6.4 Luma mapping with chroma scaling data semantics |
|---|
| lmcs_min_bin_idx specifies the minimum bin index used in the luma mapping with chroma scaling construction process. The value of lmcs_min_bin_idx shall be in the range of 0 to 15, inclusive.<br>lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15 − lmcs_delta_max_bin_idx. The value of LmcsMaxBinIdx shall be greater than or equal to lmcs_min_bin_idx .<br>lmcs_delta_cw_prec_minus1 plus 1 specifies the number of bits used for the representation of the syntax lmcs_delta_abs_cw[ i ] and lmcs_delta_abs_cw_linear. The value of lmcs_delta_cw_prec_minus1 shall be in the range of 0 to BitDepthY − 2, inclusive.<br>...<br>lmcs_delta_abs_cw_linear specifies the absolute delta codeword value for the ith bin.<br>lmcs_delta_sign_cw_linear_flag specifies the sign of the variable lmcsDeltaCWLinear as follows:<br>- If lmcs_delta_sign_cw_linear_flag is equal to 0, lmcsDeltaCWLinear is a positive value.<br>- Otherwise ( lmcs_delta_sign_cw_linear_flag is not equal to 0 ) lmcsDeltaCWLinear is a negative value.<br>When lmcs_delta_sign_cw_linear_flag is not present, it is inferred to be equal to 0.<br>The variable lmcsDeltaCWLinear, is derived as follows:<br>lmcsDeltaCWLinear = (1 − 2 * lmcs_delta_sign_cw_linear_flag) * lmcs_delta_abs_cw_linear<br>lmcsCWLinear = OrgCW + lmcsDeltaCWLinear<br>The variable ChromaScaleCoeffSingle is derived as follows<br>ChromaScaleCoeffSingle = OrgCW * (1 << 11) / lmcsCWLinear |

TABLE 32

| 8.7.5.3 Picture reconstruction with luma dependent chroma residual scaling process for chroma samples |
|---|
| Inputs to this process are:<br>- a location ( xCurr, yCurr ) of the top-left sample of the current transform block relative to the top-left sample of the current picture,<br>- a variable nCurrSw specifying the transform block width,<br>- a variable nCurrSh specifying the transform block height,<br>- a variable tuCbfChroma specifying the coded block flag of the current chroma transform block,<br>- an (nCurrSw)x(nCurrSh) array predSamples specifying the chroma prediction samples of the current block,<br>- an (nCurrSw)x(nCurrSh) array resSamples specifying the chroma residual samples of the current block.<br>Output of this process is a reconstructed chroma picture sample array recSamples. |

TABLE 32-continued 8.7.5.3 Picture reconstruction with luma dependent chroma residual scaling process for chroma samples The reconstructed chroma picture sample recSamples is derived as follows for i = 0..nCurrSw − 1,
j = 0..nCurrSh − 1:
- If one of the following conditions is true, recSamples[ xCurr + i ][ yCurr + j ] is set equal to
Clip1$_C$( predSamples[ i ][ j ] + resSamples[ i ][ j ] ):
- slice_chroma_residual_scale_flag is equal to 0
- nCurrSw * nCurrSh is less than or euqal to 4
- tu_cbf_cb [ xCurr ][ yCurr ] is equal to 0 and tu_cbf_cr [ xCurr ][ yCurr ] is equal to 0
- Otherwise, the recSamples is derived as follows.
   - If tuCbfChroma is equal to 1, the following applies:
     resSamples[ i ][ j ] =
      Clip3( −( 1 << BitDepth$_C$ ), ( 1 << BitDepth$_C$ ) − 1, resSamples[ i ][ j ] )     (8-998)
     recSarnples[ xCurr + i ][ yCurr + j ] = Clip1$_C$( predSamples[ i ][ j ] +     (8-999)
      Sign( resSamples[ i ][ j ] ) * ( ( Abs( resSamples[ i ][ j ] ) * ChromaScaleCoeffSingle + ( 1
      << 10 ) ) >> 11 ) )
   - Otherwise (tu_cbf is equal to 0), the following applies:
     recSamples[ xCurr + i ][ yCurr + j ] = Clip1$_C$(predSamples[ i ][ j ] )     (8-1000)

Figure 13:
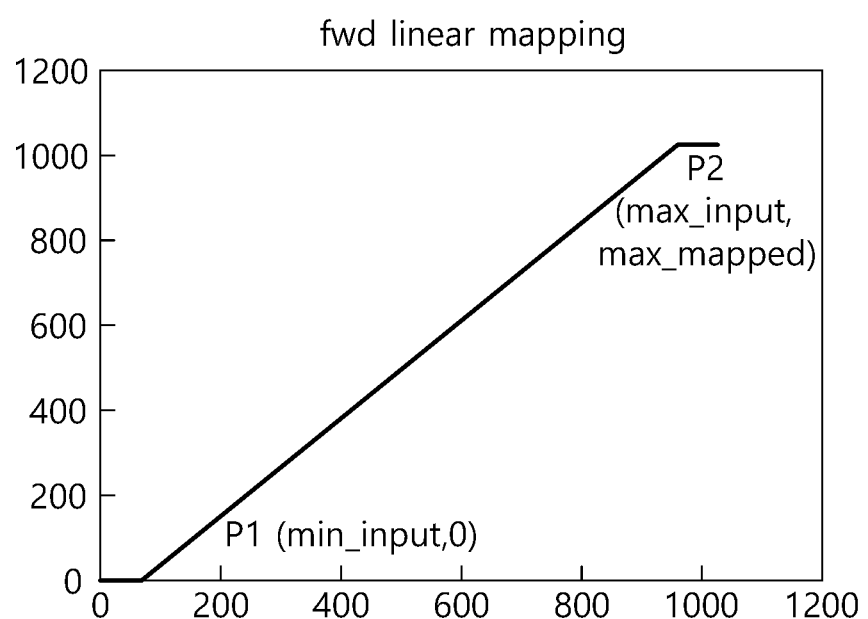
FIG. 13 illustrates one example of linear reshaping (or linear reshaping, linear mapping) according to an embodiment of the present document.

FIG. 13 illustrates one example of linear reshaping (or linear reshaping, linear mapping) according to an embodiment of the present document. That is, in this embodiment, the use of a linear reshaper in LMCS is proposed. For example, this example in FIG. 13 may relate to forward linear reshaping (mapping).

Referring to FIG. 13, the linear reshaper may include two pivot points i.e., P1 and P2. P1 and P2 may represent input and mapped values, for example P1 may be (min_input, 0) and P2 may be (max_input, max_mapped). Here, min_input represents the minimum input value, and max_input represents the maximum input value. Any input value less than or equal to min_input are mapped to 0, any input value larger than max_input are mapped to max_mapped. Any input luma values within the min_input and max_input are linearly mapped to other values. FIG. 13 shows an example of mapping. The pivot points P1, P2 may be determined at the encoder, and a linear fitting may be used to approximate the piecewise linear mapping.

In another embodiment according to the present document, another example of a method for signaling the linear reshaper may be proposed. The pivot points P1, P2 of the linear reshaper model may be explicitly signaled. The following tables show an example of syntax and semantics for explicitly signaling the linear reshaper model according to this example.

TABLE 33

| | Descriptor |
|---|---|
| lmcs_data ( ) { | |
|   lmcs_min_input | ue(v) |
|   lmcs_max_input | ue(v) |
|   lmcs_max_mapped | ue(v) |

TABLE 34 lmcs_min_input specifies the input value of the 1st pivot point. It has a mapped value of 0.
lmcs_max_input is the input value of the 2nd pivot point.
lmcs_max_mapped is the mapped value at the $2^{nd}$ pivot points. They may be signaled explicitly using explo golomb code or fixed length code with length depending on BitDepth$_Y$.
  lmcsCWLinearAll = lmcs_max_mapped
The variable ScaleCoeffSingle and InvScaleCoeffSingle are derived as follows:
  Rounding = (lmcs_max_input− lmcs_min_input)>>1
  ScaleCoeffSingle = ( lmcsCWLinearAll * (1 << FP_PREC) + Rounding))
    / (lmcs_max_input−lmcs_min_input);
  InvScaleCoeffSingle = (lmcs_max_input− lmcs_min_input)*(1<<FP_PREC) / lmcsCWLinearAll
The variable ChromaScaleCoeffSingle is derived as follows:
ChromaScaleCoeffSingle = InvScaleCoeffSingle >> (FP_PREC− CSCALE_FP_PREC)

Referring to Tables 33 and 34, the input value of the first pivot point may be derived based on the syntax element lmcs_min_input, and the input value of the second pivot point may be derived based on the syntax element lmcs_max_input. The mapped value of the first pivot point may be a predetermined value (a value known to both the encoder and decoder), for example, the mapped value of the first pivot point is 0. The mapped value of the second pivot point may be derived based on the syntax element lmcs_max_mapped. That is, the linear reshaper model may be explicitly (directly) signaled based on the information signaled in the syntax of Table 33.

Alternatively, lmcs_max_input and lmcs_max_mapped may be signaled as delta values. The following tables show an example of syntax and semantics for signaling a linear reshaper model as delta values.

TABLE 35

| | Descriptor |
|---|---|
| lmcs_data ( ) { | |
|   lmcs_min_input | ue(v) |
|   lmcs_max_input_delta | ue(v) |
|   lmcs_max_mapped_delta | ue(v) |

TABLE 36 lmcs_max_input_delta specifies the difference between the input value of the 2nd pivot point to the max luma value (1<<bitdepthY)−1, and
  lmcs_max_input = (1<<bitdepthY)−1 − lmcs_max_input delta;
lmcs_max_mapped_delta specifies the difference between the mapped value of the 2nd pivot point to the max luma value (1<<bitdepthY)−1.
  lmcsCWLinearAll = lmcs_max_mapped = (1<<bitdepthY)−1 − lmcs_max_mapped_delta
The variable ScaleCoeffSingle and InvScaleCoeffSingle are derived as follows:
  Rounding = (lmcs_max_input− lmcs_min_input)>>1
  ScaleCoeffSingle = ( lmcsCWLinearAll * (1 << FP_PREC) + Rounding))
    / (lmcs_max_input−lmcs_min_input);
  InvScaleCoeffSingle = (lmcs_max_input− lmcs_min_input)*(1<<FP_PREC) / lmcsCWLinearAll
The variable ChromaScaleCoeffSingle is derived as follows:
  ChromaScaleCoeffSingle = InvScaleCoeffSingle >> (FP_PREC− CSCALE_FP_PREC)

Referring to Table 36, the input value of the first pivot point may be derived based on the syntax element lmcs_min_input. For example, lmcs_min_input may have a mapped value of 0. lmcs_max_input_delta may specify the difference between the input value of the second pivot point and the maximum luma value (i.e., (1<<bitdepthY)−1). lmcs_max_mapped_delta may specify the difference between the mapped value of the second pivot point and the maximum luma value (i.e., (1<<bitdepthY)−1).

According to an embodiment of the present document, forward mapping for luma prediction samples, inverse mapping for luma reconstruction samples, and chroma residual scaling may be performed based on the above-described examples of the linear reshaper. In one example, only one inverse scaling factor may be needed for inverse scaling for luma (reconstructed) samples (pixels) in linear reshaper based inverse mapping. This is also true for forward mapping and chroma residual scaling. That is, the steps to determine ScaleCoeff[i], InvScaleCoeff[i] and ChromaScaleCoeff[i] with i being the bin index, may be replaced with just one single factor. Here, one single factor is a fixed point representation of the (forward) slope or the inverse slope of the linear mapping. In one example, the inverse luma mapping scaling factor (inverse scaling factor in inverse mapping for luma reconstruction samples) may be derived based on at least one of the following equations.

InvScaleCoeffSingle=OrgCW/lmcsCWLinear     [Equation 17]

InvScaleCoeffSingle OrgCW*(lmcs_max_bin_idx−lmcs_max_bin_idx+1)/lmcsCWLinearAll     [Equation 18]

InvScaleCoeffSingle=(lmcs_max_input−lmcs_min_input)/lmcsCWLinearAll     [Equation 19]

The lmcsCWLinear of Equation 17 may be derived from Table 31 described above. lmcsCWLinearALL of Equations 18 and 19 may be derived from at least one of Tables 33 to 36 described above. In Equation 17 or 18, OrgCW may be derived from Table 19 and/or 20.

The following tables describe equations and syntax (conditional statements) indicating a forward mapping process for luma samples (i.e. luma prediction samples) in picture reconstruction. In the following tables and equations, FP_PREC is a constant value for bit shifting, and may be a predetermined value. For example, FP_PREC may be 11 or 15.

TABLE 37 idxY = predSamples[ i ][ j ] >> Log2( OrgCW )
PredMapSamples[ i ][ j ] = LmcsPivot[ idxY ]

TABLE 37-continued

+ ( ScaleCoeff[ idxY ] * ( predSamples[ i ][ j ] − InputPivot[ idxY] ) +
( 1 << 10 ) ) >> 11 with i = 0..nCurrSw − 1, j = 0..nCurrSh − 1

TABLE 38 if (PredMapSamples[ i ][ j ] <= lmcs_min_input)
  PredMapSamples[ i ][ j ]=0
else if (PredMapSamples[ i ][ j ] >= lmcs_max_input)
  PredMapSamples[ i ][ j ]=lmcs_max_mapped
else
  PredMapSamples[ i ][ j ] = ( ScaleCoeffSingle * predSamples[ i ][ j ]
    + ( 1 <<( FP_PREC−1) ) ) >> FP_PREC Table 37 may be for deriving forward mapped luma samples in the luma mapping process based on Tables 17 to 20 described above. That is, Table 37 may be described together with Tables 19 and 20. In Table 37, the forward mapped luma (prediction) samples PredMapPSamples[i][j] as output can be derived from luma (prediction) samples predSamples[i][j] as input. idxY of Table 37 may be referred to as a (forward) mapping index, and the mapping index may be derived based on prediction luma samples.

Table 38 may be for deriving forward mapped luma samples in the linear reshaper based luma mapping. For example, lmcs_min_input, lmcs_max_input, lmcs_max_mapped, and ScaleCoeffSingle of Table 38 may be derived by at least one of Tables 33 to 36. In Table 38, in a case of 'lmcs_min_input<predSamples[i][j]<lmcs_max_input', forward mapped luma (prediction) samples PredMapSamples [i][j] may be derived as output from the input, luma (prediction) samples predSamples[i][j]. In comparison between Table 37 and Table 38, the change from the existing LMCS according to the application of the linear reshaper can be seen from the perspective of forward mapping.

The following equations and tables describe an inverse mapping process for luma samples (i.e. luma reconstruction samples). In the following equations and tables, 'lumaSample' as an input may be a luma reconstruction sample before inverse mapping (before modification). 'invSample' as output may be an inverse mapped (modified) luma reconstruction sample. In other cases, the clipped invSample may be referred to as a modified luma reconstruction sample.

$$\text{invSample} = \text{InputPivot}[\text{idxYInv}] + (\text{InvScaleCoeff}[\text{idxYInv}] * (\text{lumaSample} - \text{LmcsPivot}[\text{idxYInv}]) + (1 << (\text{FP\_PREC}-1))) >> \text{FP\_PREC}$$ [Equation 20]

$$\text{invSample} = \text{lmcs\_min\_input} + (\text{InvScaleCoeffSingle} * (\text{lumaSample} - \text{lmcs\_min\_input}) + (1 << (\text{FP\_PREC}-1))) >> \text{FP\_PREC}$$ [Equation 21]

TABLE 39

Use single inverse scale factor, derive the invserse luma sample as a whole linear piece.
  lumaSample = Clip3(0, LmcsPivot[LmcsMaxBinIdx+1], lumaSample) // Clip3(min, max, val)
  invSample = InputPivot[ lmcs_min_bin_idx ] + ( InvScaleCoeffSingle *
    ( lumaSample − LmcsPivot[ lmcs_min_bin_idx ] ) + ( 1 << ( FP PREC−1) ) ) >> FP_PREC
where Clip3(min, max, val) denotes to clip the input vlaue val within range min and max

TABLE 40

If the pivot point are represented by (lmcs_min_input,0) (lmcs_max_input, lmcs_max_mapped)
  lumaSample = Clip3(0, lmcs_max_mapped, lumaSample) // Clip3(min, max, val)
invSample = lmcs_min_input + (InvScaleCoeffSingle * lumaSample + ( 1 << (FP_PREC−1) ) ) >> FP_PREC Equation 21 may be for deriving inverse mapped luma samples in luma mapping according to this document. In Equation 20, the index idxInv may be derived based on Tables 50, 51, or 52 to be described later.

Equation 21 may be for deriving inverse mapped luma samples from luma mapping according to the application of the linear reshaper. For example, lmcs_min_input of Equation 21 may be derived from at least one of Tables 33 to 36. Through the comparison between Equation 20 and Equation 21, the change from the existing LMCS according to the application of the linear reshaper can be seen from the perspective of forward mapping.

Table 39 may include an example of equations for deriving inverse mapped luma samples in luma mapping. For example, the index idxInv may be derived based on Tables 50, 51, or 52 to be described later.

Table 40 may include other examples of equations for deriving inverse mapped luma samples in luma mapping. For example, lmcs_min_input and/or lmcs_max_mapped of Table 40 may be derived by at least one of Tables 33 to 36, and/or InvScaleCoeffSingle of Table 40 is at least of Tables 33 to 36, and/or Equations 17 to 19 can be derived by one.

Based on the above-described examples of the linear reshaper, the piecewise index identification process may be omitted. That is, in the present examples, since there is only one piece having valid reshaped luma pixels, the piecewise index identification process used for inverse luma mapping and chroma residual scaling can be removed. Accordingly, the complexity of inverse luma mapping may be reduced. In addition, latency problems caused by depending on luma piecewise index identification during chroma residual scaling can be eliminated.

According to the embodiment of the use of the linear reshaper described above, the following advantages may be provided for LMCS: i) It is possible to simplify the encoder reshaper design, preventing possible artifact by abrupt changes between the piecewise linear pieces ii) The decoder inverse mapping process, in which the piecewise index identification process can be removed, can be simplified by eliminating the piecewise index identification process iii) By removing the piecewise index identification process, it is possible to remove the latency problem in the chroma residual scaling caused by depending on the corresponding luma blocks iv) It is possible to reduce overhead of signaling, and make frequent update of reshaper more feasible v) For many places that used to require of a loop of 16 pieces, the loop can be eliminated. For example, to derive InvScaleCoeff[i], the number of division operations by lmcsCW[i] can be reduced to 1.

In another embodiment according to the present document, an LMCS based on flexible bins is proposed. Here, the flexible bins may refer to the number of bins not fixed to a predetermined (predefined, specific) number. In the existing embodiment, the number of bins in the LMCS is fixed to 16, and the 16 bins are equally distributed for input sample values. In this embodiment, the flexible number of bins is proposed and the pieces (bins) may not be equally distributed in terms of the original pixel values.

The following tables exemplarily show syntax for LMCS data (data field) according to this embodiment and semantics for syntax elements included therein.

TABLE 41

|  | Descriptor |
|---|---|
| lmcs_data ( ) { |  |
|   lmcs_num_bins_minus1 | ue(v) |
|   for ( i = 0; i <= lmcs_num_bins; i++ ) { | u(v) |
|     lmcs_delta_input_cw[i ] | u(v) |
|     lmcs_delta_mapped_cw[i ] | u(v) |
|   } |  |

TABLE 42 lmcs_num_bins_minus1 plus 1 specifies the number of bins. lmcs_num_bins shall be in the range of 1
and 1<<BitDepth$_Y$ −1. lmcs_num_bins or lmcs_num_bins_minus1 may be restricted to multiple of
power of 2, or log of 2 to reduce the number of bits used for signaling.
lmcs_num_bins = lmcs_num_bins_minus1 + 1
lmcs_delta_input_cw[ i ] specifies the delta input value of the ith pivot point relative the previous pivot
point. lmcs_delta_input_cw[ i ] >= 0.
lmcs_delta_mapped_cw[ i ] specifies the delta mapped value of the ith pivot point relative the previous
pivot point. lmcs_delta_mapped_cw[ i ] >= 0
The variable LmcsPivot_input[ i ] and LmcsPivot_mapped[ i ] with i = 0.. lmcs_num_bins+1
LmcsPivot_input[ 0 ] = 0;
LmcsPivot_mapped[ 0 ] = 0;
for( i = 0, i <= lmcs_num_bins; i++ ) {
    LmcsPivot_input[ i + 1 ] = LmcsPivot_input[ i ] + lmcs_delta_input_ cw[ i ];
    LmcsPivot_mapped[ i + 1 ] = LmcsPivot_mapped[ i ] + lmcs_delta_mapped_cw[ i ];
}
LmcsPivot_input[ lmcs_num_bins+1] shall equal to (1 << BitDepth$_Y$ ) − 1 . I.e. sum of all
lmcs_delta_input_ cw[ i ] shall equal to (1 << BitDepth$_Y$ ) − 1, therefore the last
lmcs_delta_mapped_cw[ i ] can be inferred without signaling.
LmcsPivot_mapped[ lmcs_num_bins+1], I.e. sum of all lmcs_delta_mapped_cw[ i ] shall be not
greater than (1 << BitDepth$_Y$ ) − 1.

Referring to Table 41, information on the number of bins lmcs_num_bins_minus1 may be signaled. Referring to Table 42, lmcs_num_bins_minus1+1 may be equal to the number of bins, from which the number of bins may be within a range from 1 to (1<<BitDepthY)−1. For example, lmcs_num_bins_minus1 or lmcs_num_bins_minus1+1 may be multiple of power of 2.

In the embodiment described together with tables 41 and 42, the number of pivot points can be derived based on lmcs_num_bins_minus1 (information on the number of bins), regardless of whether the reshaper is linear or not (signaling of lmcs_num_bins_minus1), and input values and mapped values of pivot points (LmcsPivot_input[i], LmcsPivot_mapped[i]) may be derived based on the summation of signaled codeword values (lmcs_delta_input_cw [i], lmcs_delta_mapped_cw[i]) (here, the initial The input value LmcsPivot_input[0] the initial output value LmcsPivot_mapped[0] are 0).

Figure 14:
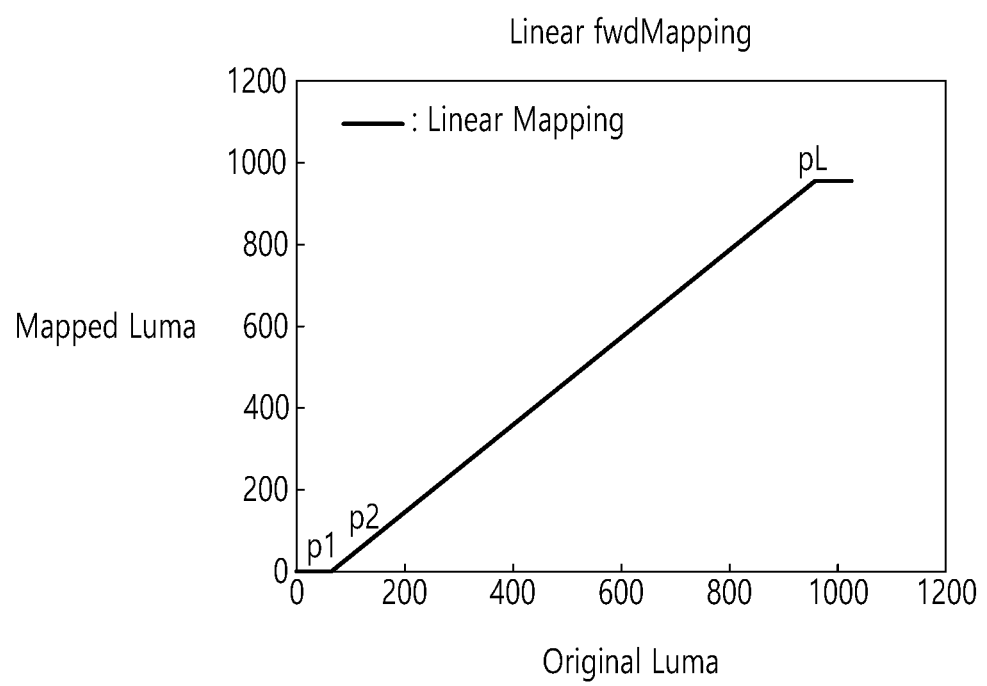
FIG. 14 shows an example of linear forward mapping in an embodiment of the present document.
Figure 15:
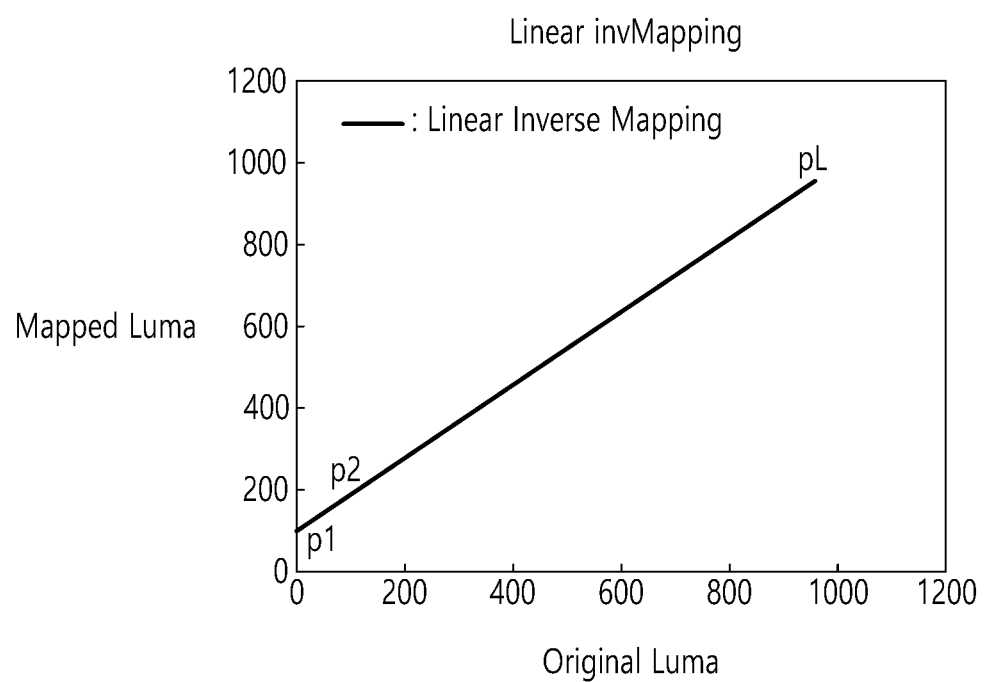
FIG. 15 shows an example of inverse forward mapping in an embodiment of the present document.

FIG. 14 shows an example of linear forward mapping in an embodiment of the present document. FIG. 15 shows an example of inverse forward mapping in an embodiment of the present document.

In the embodiment according to FIG. 14 and FIG. 15, a method for supporting both regular LMCS and linear LMCS is proposed. In an example according to this embodiment, a regular LMCS and/or a linear LMCS may be indicated based on the syntax element lmcs_is_linear. In the encoder, after the linear LMCS line is determined, the mapped value (i.e., the mapped value in pL of FIG. 14 and FIG. 15) can be divided into equal pieces (i.e., LmcsMaxBinIdx−lmcs_min_bin_idx+1). The codeword in the bin LmcsMaxBinIdx may be signaled using the syntaxes for the lmcs data or reshaper mode described above.

The following tables exemplarily show syntax for LMCS data (data field) and semantics for syntax elements included therein according to an example of this embodiment.

TABLE 43

|  | Descriptor |
|---|---|
| lmcs_data ( ) { |  |
|   lmcs_min_bin_idx | ue(v) |
|   lmcs_delta_max_bin_idx | ue(v) |
|   lmcs_is_linear_flag | u(1) |
|   lmcs_delta_cw_prec_minus1 | ue(v) |
|   If (lmcs_is_linear_flag){ |  |
|     lmcs_bin_delta_abs_CW_linear | u(v) |
|     if (lmcs_bin_delta_abs_CW_linear) > 0 ) |  |
|       lmcs_bin_delta_sign_CW_linear_flag | u(1) |
|   } |  |
|   else { |  |
|     for ( i = lmcs_min_bin_idx; i <= LmcsMaxBinIdx; i++ ) { |  |
|       lmcs_delta_abs_cw[ i ] | u(v) |
|       if ( lmcs_delta_abs_cw[ i ] ) = 0 ) |  |
|         lmcs_delta_sign_cw_flag[i ] | u(1) |
|     } |  |
|   } |  |
| } |  |

TABLE 44 lmcs_min_bin_idx specifies the minimum bin index used in the luma mapping with chroma
scaling construction process. The value of lmcs_min_bin_idx shall be in the range of 0 to 15,
inclusive.
lmcs_delta_max_bin_idx specifies the delta value between 15 and the maximum bin index
LmcsMaxBinIdx used in the luma mapping with chroma scaling construction process. The
value of lmcs_delta_max_bin_idx shall be in the range of 0 to 15, inclusive. The value of
LmcsMaxBinIdx is set equal to 15 − lmcs_delta_max_bin_idx. The value of LmcsMaxBinIdx
shall be greater than or equal to lmcs_min_bin_idx.
lmcs_is_linear-flag equal to 1 specifies that LMCS model is a linear model, otherwise, it is a
regular 16-piece PWL model.
lmcs_delta_cw_prec_minus1 plus 1 specifies the number of bits used for the representation
of the syntax lmcs_delta_abs_cw[ i ] if lmcs_is_linear_flag is false and specifies the number
of bits used for the representation of the lmcs_bin_delta_abs_CW_linear if lmcs_is_linear_flag
is true. The value of lmcs_delta_cw_prec_minus1 shall be in the range of 0 to BitDepthY − 2,
inclusive.

TABLE 44-continued lmcs_delta_abs_cw_linear specifies the absolute delta codeword value of one bin of linear mapping.
lmcs_dellta_sign_cw_linear _flag specifies the sign of the variable lmcsDeltaCWLinear as follows:
    If lmcs_delta_sign_cw_linear_flag is equal to 0, lmcsDeltaCWLinear is a positive value.
    Otherwise ( lmcs_delta_sign_cw_linear flag is not equal to 0 ), lmcsDeltaCWLinear is a negative value.
When lmcs_delta_sign_cw_linear_flag is not present it is inferred to be equal to 0.
lmcs_delta_abs_cw[ i ] specifies the absolute delta codeword value for the ith bin.
lmcs_delta_sign_cw_flag[ i ] specifies the sign of the variable lmcsDeltaCW[ i ]as follows:
If lmcs_delta_sign_cw_flag[ i ] is equal to 0, lmcsDeltaCW[ i ] is a positive value.
Otherwise ( lmcs_delta_sign_cw_flag[ i ] is not equal to 0), lmcsDeltaCW[ i ] is a negative value.
When lmcs_delta_sign_cw_flag[ i ] is not present it is inferred to be equal to 0.
The variable OrgCW is derived as follows:
    OrgCW = (1 << ( BitDepthY ) / 16    (7-88)
The variable lmcsDeltaCW[ i ], with i = lmcs_min_bin_idx..LmcsMaxBinIdx, is derived as follows:
    if lmcs_is_linear_flag is true,
        lmcsDeltaCW[ i ] =
            ( 1 - 2 * lmcs_delta_sign_cw_linear_flag ) * lmcs_delta_abs_cw_linear    (7-89)
    else
        lmcsDeltaCW[ i ] =
            ( 1 - 2 * lmcs_delta_sign_cw_flag[ i ] ) * lmcs_delta_abs_cw[ i ]    (7-90)
The variable lmcsCW[ i ] is derived as follows:
    For i = 0.. lmcs_min_bin_idx - 1, lmcsCW[ i ] is set equal 0.
    For i = lmcs_min_bin_idx..LmcsMaxBinIdx, the following applies:
        lmcsCW[ i ] = OrgCW + lmcsDeltaCW[ i ]
    The value of lmcsCW[ i ] shall be in the range of (OrgCW>>3) to (OrgCW<<3 - 1), inclusive.
    For i = LmcsMax_BinIdx + 1..15, lmcsCW[ i ] is set equal 0.
It is a requirement of bitstream conformance that the following condition is true:
    $\Sigma_{i=0}^{15}$ lmcsCW[ i ] <= (1 << BitDepthY ) - 1    (7-91)

The following tables exemplarily show syntax for LMCS data (data field) and semantics for syntax elements included therein according to another example of this embodiment.

TABLE 45

| | Descriptor |
|---|---|
| lmcs_data ( ) { | |
|   lmcs_min_bin_idx | ue(v) |
|   lmcs_delta_max_bin_idx | ue(v) |
|   lmcs_is_linear_flag | u(1) |

TABLE 45-continued

| | Descriptor |
|---|---|
|   lmcs_delta_cw_prec_minus1 | ue(v) |
|   for ( i =lmcs_min_bin_idx; i <= LmcsMaxBinEnd; i++ ) { | |
|     lmcs_delta_abs_cw[ i ] | u(v) |
|     if ( lmcs_delta_abs_cw[ 1 ] ) > 0 ) | |
|       lmcs_delta_sign_cw_flag[ i ] | u(1) |
|   } | |
| } | |

TABLE 46 lmcs_min_bin_idx specifies the minimum bin index used in the luma mapping with chroma scaling construction process. The value of lmcs_min_bin_idx shall be in the range of 0 to 15, inclusive.
lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15 - lmcs_delta_max_bin_idx. The value of LmcsMaxBinIdx shall be greater than or equal to lmcs_min_bin_idx.
lmcs_is_linear_flag equal to 1 specifies that LMCS model is linear model, otherwise, equal to 0 specifies that LMCS model is a regular 16-piece PWL model.
lmcs_delta_cw_prec_minus1 plus 1 specifies the number of bits used for the representation of the syntax lmcs_delta_abs_cw[ i ]. The value of lmcs_delta_cw_prec_minus1 shall be in the range of 0 to BitDepthY - 2, inclusive.
    Variables LmcsMaxBinEnd is derived as below:
        if (lmcs_is_linear_flag==1)
            LmcsMaxBinEnd = lmcs_min_bin_idx
        else
            LmcsMaxBinEnd = LmcsMaxBinIdx
lmcs_delta_abs_cw[ i ] specifies the absolute delta codeword value for the ith bin.
lmcs_delta_sign_cw_flag[ i ] specifies the sign of the variable lmcsDeltaCW[ i ] as follows:
    If lmcs_delta_sign_cw_flag[ i ] is equal to 0, lmcsDeltaCW[ i ] is a positive value.
    Otherwise ( lmcs_delta_sign_cw_flag[ i ] is not equal to 0), lmcsDeltaCW[ i ] is a negative value.
When lmcs_delta_sign_cw_flag[ i ] is not present, it is inferred to be equal to 0.
When lmcs_is_linear_flag is true, the start index and end index of the loop to receive lmcs_delta_abs_cw[ i ] are the same, therefore the loop is only entered once, only one set of TABLE 46-continued lmcs_delta_abs_cw[ i ] and lmcs_delta_sign_cw[ i ] is received, and is stored in
lmcs_delta_abs_cw[lmcs_min_bin_idx ] and lmcs_delta_sign_cw[lmcs_min_bin_idx].
The variable OrgCW is derived as follows:
    OrgCW = (1 << BitDepthY ) / 16    (7-88)
The variable lmcsDeltaCW[ i ] with i = lmcs_min_bin_idx..LmcsMaxBinIdx, is derived as
follows:
if lmcs_is_linear_flag is true,
    lmcsDeltaCW[ i ] =
 ( 1 − 2 * lmcs_delta_sign_cw flag[lmcs_min_bin_idx] ) * lmcs_delta_abs_cw[lmcs_min_bin_idx]
    else
lmcsDeltaCW[ i ] = ( 1 − 2 * lmcs_delta_sign_cw_flag[ i ] ) * lmcs_delta_abs_cw[ i ]    (7-89)

Referring to Tables 43 to 46, when lmcs_is_linear_flag is true, all the lmcsDeltaCW[i] between lmcs_min_bin_idx and LmcsMaxBinIdx may have the same values. That is, lmcsCW[i] of all pieces between lmcs_min_bin_idx and LmcsMaxBinIdx, may have the same values. The scale and inverse scale and chroma scale of all pieces between lmcs_min_bin_idx and lmcsMaxBinIdx may be the same. Then if the linear reshaper is true, then there is no need to derive the piece index, it can use scale, inverse scale from just one of the pieces.

The following table exemplarily shows the identification process of the piecewise index according to the present embodiment.

TABLE 47

Identification of piecewise function index process for a luma sample if lmcs_is_linear_flag is true,
    idxYInv = lmcs_min_bin_idx
else
{
  /* Use existing piecewise index identification process */
}_

According to another embodiment of the present document, the application of regular 16-piece PWL LMCS and linear LMCS may be dependent on higher level syntax (i.e., sequence level).

The following tables exemplarily show the syntax for the SPS according to the present embodiment and the semantics for the syntax elements included therein.

TABLE 48

| | Descriptor |
|---|---|
| seq_parameter_set_rbsp( ) { | |
| .... | |
|   sps_linear_lmcs_enabled_flag | u(1) |
| ... | |

TABLE 49 sps_linear_lmcs_enabled_flag equal to 0 specifies that the linear lmcs is disabled and only regular LMCS is enabled. sps_linear_lmcs_enabled_flag equal to 1 specifies that the linear lmcs is enabled and regular LMCS is disabled.

Referring to Tables 48 and 49, enabling of the regular LMCS and/or the linear LMCS may be determined (signaled) by a syntax element included in the SPS. Referring to Table 35, based on the syntax element sps_linear_lmcs_enabled_flag, one of a regular LMCS or a linear LMCS may be used in units of a sequence.

In addition, whether to only enable the linear LMCS, or the regular LMCS or both may also be dependent on profile level. In one example, for a specific profile (i.e., SDR profile), it may only allow the linear LMCS, and for another profile (i.e., HDR profile), it may only allow the regular LMCS, and for another profile, it may allow both regular LMCS and/or linear LMCS.

According to another embodiment of the present document, the LMCS piecewise index identification process may be used in inverse luma mapping and chroma residual scaling. In this embodiment, the identification process of the piecewise index may be used for blocks with chroma residual scaling enabled, and also invoked for all luma samples in reshaped (mapped) domain. The present embodiment aims to keep its complexity low.

The following table shows the identification process (derivation process) of the existing piecewise function index.

TABLE 50

Identification of piecewise function index process for a luma sample if ( lumaSample < LmcsPivot[ lmcs_min_bin_idx + 1 ] )
    idxYInv = lmcs_min_bin _idx
else if (lumaSample >= LmcsPivot[ LmcsMaxBinIdx ] )
    idxYInv = LmcsMaxBinIdx
else {    (8-1003)
    for( idxYInv = lmcs_min_bin_idx; idxYInv < LmcsMaxBinIdx; idxYInv++ ) {
        if( lumaSample < LmcsPivot [ idxYInv + 1 ] )
            break
    }
}

In an example, in the piecewise index identification process, input samples may be classified into at least two categories. For example, the input samples may be classified into three categories, first, second, and third categories. For example, the first category may represent samples (values thereof) less than LmcsPivot[lmcs_min_bin_idx+1], and the second category may represent samples (values thereof) greater than or equal to (values thereof) LmcsPivot[LmcsMaxBinIdx], The third category may indicate (values of) samples between LmcsPivot[lmcs_min_bin_idx+1] and LmcsPivot[LmcsMaxBinIdx].

In this embodiment, it is proposed to optimize the identification process by eliminating the categories classifications. This is because the input to the piecewise index identification process are luma values in reshaped (mapped) domain, there should be no values beyond the mapped values at the pivot points lmcs_min_bin_idx and LmcsMaxBinIdx+1. Accordingly, the conditional process to classify samples into categories in the existing piecewise index identification process is unnecessary. For more details, specific examples will be described below with tables.

In an example according to this embodiment, the identification process included in Table 50 may be replaced with one of Tables 51 or 52 below. Referring to Tables 51 and 52, the first two categories of Table 50 may be removed, and for the last category, the boundary value (the second boundary value or the ending point) in the iterative for loop is changed from LmcsMaxBinIdx to LmcsMaxBinIdx+1. That is, the identification process may be simplified and the complexity for the piecewise index derivation may be reduced. Accordingly, LMCS-related coding can be efficiently performed according to the present embodiment.

TABLE 51

```
for( idxYInv = lmcs_min_bin_idx; idxYInv <=
LmcsMaxBinIdx; idxYInv++ ) {
    if( lumaSample < LmcsPivot [ idxYInv + 1 ] )
        break
}
```

TABLE 52

```
for( idxYInv = lmcs_min_bin_idx; idxYInv <
LmcsMaxBinIdx+1; idxYInv++ ) {
    if( lumaSample < LmcsPivot [ idxYInv + 1 ] )
        break
}
```

Referring to Table 51, comparison process corresponding to the condition of the if statement (an equation corresponding to the condition of the if statement) may be iteratively performed on all of the bin indices from the minimum bin index to the maximum bin index. The bin index, in the case where the equation corresponding to the condition of the if statement is true, may be derived as the inverse mapping index for inverse luma mapping (or the inverse scaling index for chroma residual scaling). Based on the inverse mapping index, modified reconstructed luma samples (or scaled chroma residual samples) may be derived.

According to the embodiment of Table 51, problems that may occur in a procedure of identifying an (inverse) piecewise function index may be solved. Because of the embodiment of Table 51, an arithmetic bug may be removed, and/or duplicate operation processes occurring due to overlapping boundary conditions may be omitted. If the present document does not follow the embodiment of Table 51, a mapping value being used in LMCS for the current block in for syntax (loop syntax) for identifying the piecewise index (inverse mapping index) may exceed (escape) LmcsPivot[idxYInv+1]. According to the present embodiment, a mapping value in an appropriate range being used in the LMCS for the current block in the index identification procedure may be used.

Next tables represent effects of coding performance improved by the embodiment of Table 51.

TABLE 53

| | All Intra Main 10 Over VTM-5.0 | | | | |
|---|---|---|---|---|---|
| | Y | U | V | EncT | DecT |
| Class A1 | 0.00% | 0.00% | 0.00% | 97% | 98% |
| Class A2 | 0.00% | 0.00% | 0.00% | 102% | 98% |
| Class B | 0.00% | 0.00% | 0.00% | 104% | 103% |
| Class C | 0.00% | 0.00% | 0.00% | 95% | 98% |
| Glass E | 0.00% | 0.00% | 0.00% | 102% | 98% |
| Overall | 0.00% | 0.00% | 0.00% | 100% | 100% |
| Class D | 0.00% | 0.00% | 0.00% | 96% | 101% |
| Class F | 0.00% | 0.00% | 0.00% | 97% | 98% |

TABLE 54

| | Random access Main 10 Over VTM-5.0 | | | | |
|---|---|---|---|---|---|
| | Y | U | V | EncT | DecT |
| Class A1 | 0.00% | 0.00% | 0.00% | 101% | 101% |
| Class A2 | 0.00% | 0.00% | 0.00% | 100% | 97% |
| Class B | 0.00% | 0.00% | 0.00% | 99% | 99% |
| Class C | 0.00% | 0.00% | 0.00% | 97% | 101% |
| Class E | | | | | |
| Overall | 0.00% | 0.00% | 0.00% | 99% | 100% |
| Class D | 0.00% | 0.00% | 0.00% | 99% | 103% |
| Class F | 0.00% | 0.00% | 0.00% | 99% | 98% |

TABLE 55

| | Low delay B Main 10 Over VTM-5.0 | | | | |
|---|---|---|---|---|---|
| | Y | U | V | EncT | DecT |
| Class A1 | | | | | |
| Class A2 | | | | | |
| Class B | 0.00% | 0.01% | 0.01% | 103% | 102% |
| Class C | 0.00% | −0.03% | −0.01% | 103% | 99% |
| Class E | 0.00% | 0.00% | 0.00% | 94% | 98% |
| Overall | 0.00% | −0.01% | 0.00% | 100% | 100% |
| Class D | 0.00% | 0.00% | 0.00% | 100% | 101% |
| Class F | 0.00% | 0.01% | −0.05% | 96% | 99% |

Referring to Table 53 to Table 55, the coding performance may be improved according to the embodiment of Table 51. Further, the arithmetic bug may be removed while the coding performance is maintained according to the embodiment of Table 51, and/or the overlapping arithmetic process may be omitted.

In an embodiment according to the present document, latency due to chroma residual scaling dependence in the corresponding luma block is higher than that of the slices coded by a dual-tree with respect to the slices (e.g., intra slices) coded by an individual block tree in the existing embodiment. For this reason, in the existing embodiment, the LMCS chroma residual scaling is not applied to the slices coded by the individual block tree.

In the present embodiment, the chroma residual scaling may be applied even with respect to the slices coded by the individual tree. In case that the single chroma residual scaling factor as described above is used, there is not the dependence between chroma residual scaling in the corresponding luma block, and thus there may not be the latency in accordance with the application of the chroma residual scaling.

The following tables represent syntax and semantics of a slice header according to the present embodiment.

TABLE 56

|  | Descriptor |
| --- | --- |
| slice_header( ) { | |
| ... | |
| if( sps_lmcs_enabled_flag ) { | |
| slice_lmcs_enabled_flag | u(1) |
| if( slice_lmcs_enabled_flag ) { | |
| slice_lmcs_aps_id | u(5) |
| slice_chroma_residual_scale_flag | u(1) |
| } | |
| ... | |
| } | |

TABLE 57

| slice_chroma_residual_scale_flag equal to 1 specifies that chroma residual scaling is enabled for the current slice. slice_ chroma_residual_scale_flag equal to 0 specifies that chroma residual scaling is not enabled for the current slice. When slice_ chroma_residual_scale_flag is not present, it is inferred to be equal to 0. |
| --- |

Referring to Table 57, a chroma residual scaling flag may be signaled regardless of a conditional clause (or flag therefor) representing whether the current block is of a dual-tree structure or a single tree structure.

In an embodiment according to the present document, the ALF data and/or the LMCS data may be signaled in the APS. For example, 32 APSs may be used. In an example, in case that all APSs are used for the ALF and/or the LMCS, about 10 Kbytes on-chip memory may be necessary for buffers of the APSs. In order to limit (reduce) the memory required to store the ALF/LMCS parameters and computational complexity necessary for the LMCS, a scheme for limiting the number of ALFs and/or LMCS APSs is proposed in the present embodiment.

In an example according to the present embodiment, an LMCS model for one picture may be used (allowed) regardless of the number of slices or bricks included in the picture. The number of APSs for the LMCS may be smaller than 32. For example, the number of APSs for the LMCS may be 4.

Table 58 in FIG. 22 represents a semantics related to the APS according to the present embodiment.

Referring to Table 58, the maximum number of LMCS APSs may be predetermined. For example, the maximum number of LMCS APSs may be 4. Referring to Table 15 and Table 58, the plurality of APSs may include LMCS APSs. The (maximum) number of LMCS APSs may be 4. In an example, an LMCS data field included in one of the LMCS APSs may be used in the LMCS procedure for the current block in the current picture.

The following table represents semantics for syntax elements included in a slice header (or picture header).

TABLE 59

| slice_lmcs_aps_id specifies the adaptation_parameter_set_id of the LMCS APS that the slice refers to. The TemporalId of the LMCS APS NAL unit having adaptation_parameter_set_id equal to slice_lmcs_aps_id shall be less than or equal to the TemporalId of the coded slice NAL unit. At most one LMCS APS with the same value of adaptation_parameter_set_id may be referred to by two or more slices of the same picture. |
| --- |

The syntax element explained from Table 59 may be explained with reference to Table 56. In an example, the syntax element slice_lmcs_aps_id may be included in the slice header. In another example, the syntax element slice_lmcs_aps_id of Table 59 may be included in the picture header, and in this case, the slice_lmcs_aps_id may be modified to ph_lmcs_aps_id.

According to an embodiment of the present document, the total number of LMCS APSs may be equal to or smaller than 4. Further, in an example of the present embodiment, only one LMCS model may be used for one picture. In this case, only one LMCS model may be used for one picture regardless of the resolution of the image/video. According to the present embodiment, due to restrictions on the LMCS APSs, implementation may be facilitated, and the resource (memory) overspending problem may be solved.

The following table represents semantics for an example of syntax elements disclosed in the present document.

TABLE 60

| slice_lmcs_aps_id specifies the adaptation_parameter_set_id of the LMCS APS that the slice refers to. The value of slice_lmcs_aps_id shall be in the range of 0 to 3, inclusive. The TemporalId of the LMCS APS NAL unit having adaptation_parameter_set_id equal to slice_lmcs_aps_id shall be less than or equal to the TemporalId of the coded slice NAL unit. Only one LMCS APS with the same value of adaptation_parameter_set_id and the same content shall be referred to by one or more slices of the same picture |
| --- |

The syntax element explained from Table 60 may be explained with reference to Table 56. In an example, the syntax element slice_lmcs_aps_id may be included in the slice header. In another example, the syntax element slice_lmcs_aps_id of Table 60 may be included in the picture header, and in this case, the slice_lmcs_aps_id may be modified to the ph_lmcs_aps_id.

Referring to Table 60, the adaptation_parameter_set_id of the LMCS APS that is referred to by the current slice (or current picture) may be specified by the syntax element slice_lmcs_aps_id. That is, the slice_lmcs_aps_id may represent the adaptation_parameter_set_id of the LMCS APS being referred to by the current slice (or current picture). The value of the slice_lmcs_aps_id may be in the range of 0 to 3. That is, the value of the slice_lmcs_aps_id may be 0, 1, 2, or 3. For example, the $0^{th}$ LMCS APS (or first LMCS APS) indicated by the slice_lmcs_aps_id among the $0^{th}$ to third LMCS APSs (or first to fourth LMCS APSs) may be referred to by the current slice (or current picture), and the LMCS data (LMCS data field or reshaper model) included in the $0^{th}$ LMCS APS (or first LMCS APS) may be used for the LMCS procedure for the current slice (or current picture) (LMCS procedure for the current slide (or current picture)

may be performed based on the LMCS data (LMCS data field or reshaper model) included in the $0^{th}$ LMCS APS (or first LMCS APS)).

According to at least one embodiment disclosed in the present document, the LMCS related coding procedure may be cleaned up or may be simplified.

The following drawings are created to explain specific examples of the present specification. Since the names of specific devices described in the drawings or the names of specific signals/messages/fields are presented by way of example, the technical features of the present specification are not limited to the specific names used in the following drawings.

Figure 16:
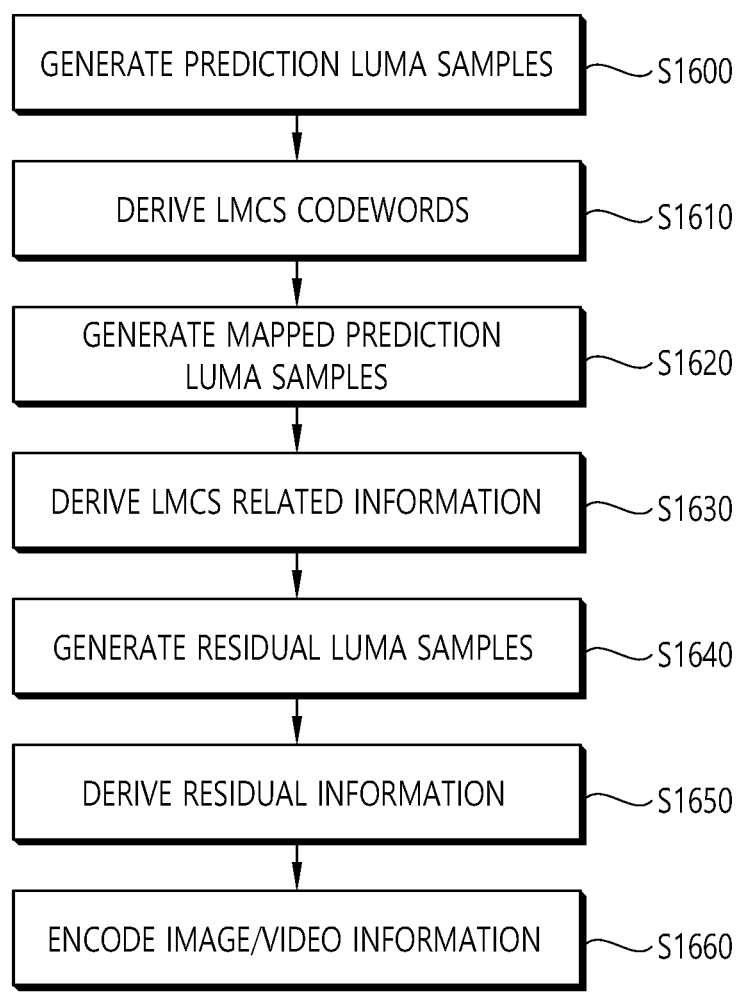
FIG. 16 and FIG. 17 schematically show an example of a video/image encoding method and related components according to embodiment(s) of the present document.
Figure 17:
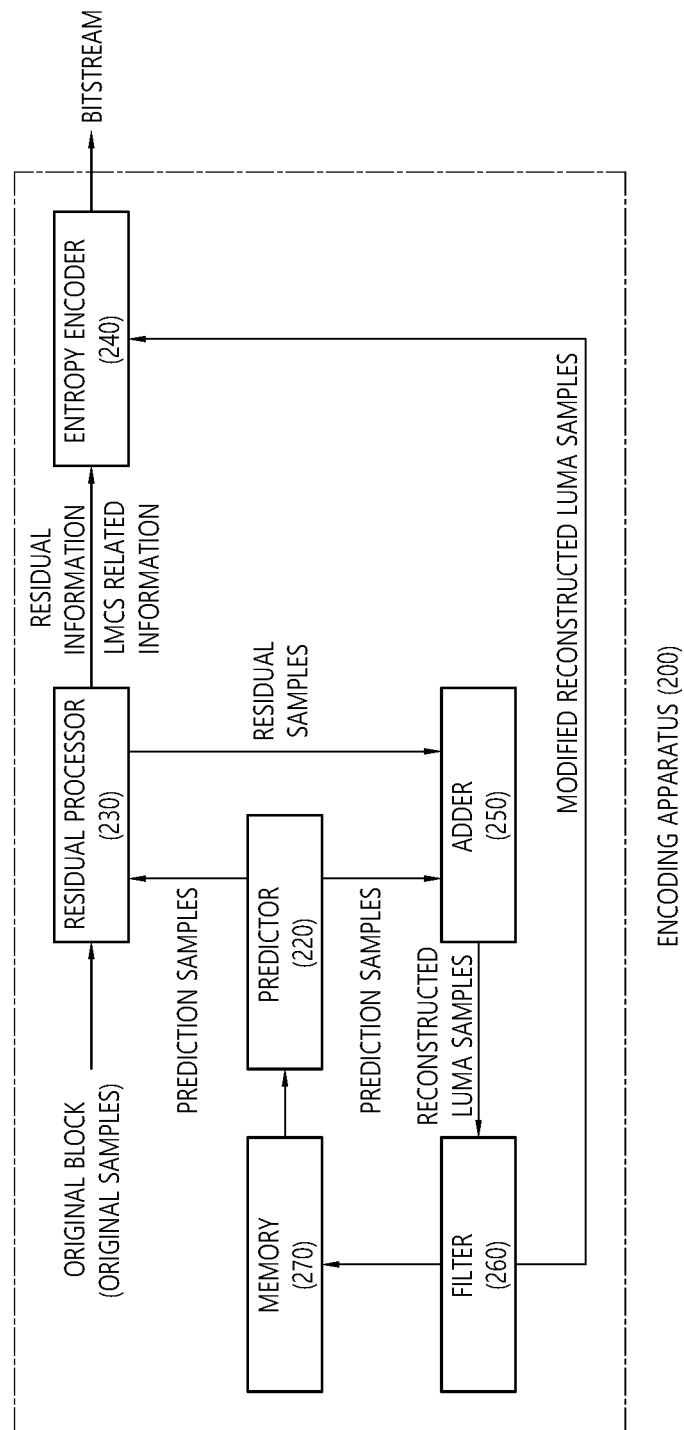

FIGS. 16 and 17 schematically show an example of a video/image encoding method and related components according to embodiment(s) of the present document. The method disclosed in FIG. 16 may be performed by the encoding apparatus disclosed in FIG. 2. Specifically, for example, S1600 of FIG. 16 may be performed by the predictor 220 of the encoding apparatus, S1610 may be performed by the residual processor 230, the predictor 220, and/or the adder 250 of the encoding apparatus, and S1620 may be performed by the residual processor 230 or the predictor 220 of the encoding apparatus. S1630, S1640, and/or S1650 may be performed by the residual processor 230 of the encoding apparatus, and S1660 may be performed by the entropy encoder 240 of the encoding apparatus. The method disclosed in FIG. 16 may include the above embodiments described in detail in the present document.

Referring to FIG. 16, the encoding apparatus may generate predicted luma samples (S1600). In relation to the predicted luma samples, the encoding apparatus may derive the predicted luma samples of the current block based on a prediction mode. In this case, various prediction methods disclosed in the present document, such as inter prediction or intra prediction, may be applied.

The encoding apparatus may derive prediction chroma samples. The encoding apparatus may derive the residual chroma samples based on the original chroma samples and the prediction chroma samples of the current block. For example, the encoding apparatus may derive residual chroma samples based on the difference between the prediction chroma samples and the original chroma samples.

The encoding apparatus may derive LMCS codewords (S1610). The encoding apparatus may derive respective LMCS codewords for a plurality of bins. For example, the above-described lmcsCW[i] may correspond to the LMCS codewords derived by the encoding apparatus.

The encoding apparatus may generate mapped predicted luma samples (S1620). The encoding apparatus may generate the mapped predicted luma samples based on the LMCS codewords. For example, the encoding apparatus may derive input values of pivot points for luma mapping and mapping values (output values), and may generate the mapped predicted luma samples based on the input values and the mapping values. Here, the input values and the mapping values may be derived based on the LMCS codewords. In an example, the encoding apparatus may derive a mapping index idxY based on a first predicted luma sample, and may generate a first mapped predicted luma sample based on the input values and the mapping values of the pivot points corresponding to the mapping index. In another example, a linear mapping (linear reshaping or linear LMCS) may be used, and the mapped predicted luma samples may be generated based on forward mapping scaling factors derived from two pivot points in the linear mapping. Accordingly, an index derivation procedure may be omitted due to the linear mapping.

The encoding apparatus may generate scaled residual chroma samples. Specifically, the encoding apparatus may derive a chroma residual scaling factor and generate scaled residual chroma samples based on the chroma residual scaling factor. Here, the chroma residual scaling of the encoding stage may be referred to as forward chroma residual scaling. Accordingly, the chroma residual scaling factor derived by the encoding apparatus may be referred to as a forward chroma residual scaling factor, and forward scaled residual chroma samples may be generated.

The encoding apparatus may derive LMCS related information based on the LMCS codewords (S1630). Further, the encoding apparatus may generate the LMCS related information based on the mapped predicted luma samples and/or the scaled residual chroma samples. The encoding apparatus may generate the LMCS related information for the reconstructed samples. The encoding apparatus may derive LMCS related parameters that are applicable for filtering of the reconstructed samples, and may generate the LMCS related information based on the LMCS related parameters. For example, the LMCS related information may include information on the above-described luma mapping (e.g., forward mapping, inverse mapping, and linear mapping), information on chroma residual scaling, and/or indexes (e.g., maximum bin index and minimum bin index) related to the LMCS (or reshaping or reshaper).

The encoding apparatus may generate residual luma samples based on the mapped predicted luma samples (S1640). For example, the encoding apparatus may derive the residual luma samples based on a difference between the mapped predicted luma samples and the original luma samples.

The encoding apparatus may derive residual information (S1650). The encoding apparatus may derive residual information based on the scaled residual chroma samples and/or the residual luma samples. The encoding apparatus may derive transform coefficients based on the transform procedure for the scaled residual chroma samples and the luma residual samples. For example, the transform process may include at least one of DCT, DST, GBT, or CNT. The encoding apparatus may derive quantized transform coefficients based on the quantization process for the transform coefficients. The quantized transform coefficients may have a one-dimensional vector form based on the coefficient scan order. The encoding apparatus may generate residual information specifying the quantized transform coefficients. The residual information may be generated through various encoding methods such as exponential Golomb, CAVLC, CABAC, and the like.

The encoding apparatus may encode the image/video information (S1660). The image information may include LMCS related information and/or residual information. For example, the LMCS related information may include information on the linear LMCS. In one example, at least one LMCS codeword may be derived based on information on the linear LMCS. The encoded video/image information may be output in the form of a bitstream. The bitstream may be transmitted to the decoding device through a network or a storage medium.

The image/video information may include various information according to an embodiment of the present document. For example, the image/video information may include information disclosed in at least one of Tables 1 to 60 described above.

In an embodiment, the image information may include APSs. Each of the APSs may include type information representing whether the APS is an LMCS APS (e.g., aps_params_type). The LMCS data field included in the APS (e.g., first LMCS APS) representing that the type information is the LMCS APS may include the LMCS related information. The LMCS data field may include information on the LMCS codewords. In an example, the ID value of the APS representing that the type information is the LMCS APS may be in a predetermined range. For example, the predetermined range may be a range of 0 to 3. That is, the ID value of the APS representing that the type information is the LMCS APS may be 0, 1, 2, or 3. In another example, the maximum number of LMCS APSs among the APSs may be a predetermined value. For example, the maximum number (the predetermined value) of LMCS APSs may be 4.

In an embodiment, based on that the value of the type information is 1, the APS may include the LMCS data field including LMCS parameters.

In an embodiment, the image information may include header information. The header information may include LMCS related APS ID information. The LMCS related APS ID information may represent the ID of the LMCS APS for the current picture or the current block. For example, the header information may be a picture header (or slice header). In an example, the value of the LMCS related APS ID information may be in the predetermined range related to the ID value of the APS representing that the type information is the LMCS APS. For example, the value of the LMCS related APS ID information may be in the range of 0 to 3. That is, the value of the LMCS related APS ID information may be 0, 1, 2, or 3.

In an embodiment, the image information may include an SPS. The SPS may include a first LMCS available flag representing whether the LMCS data field is available.

In an embodiment, based on that the value of the first LMCS available flag is 1, the header information may include a second LMCS available flag representing whether the LMCS data field is available in the picture.

In an embodiment, based on that the value of the second LMCS available flag is 1, the LMCS related APS ID information may be included in the header information.

In an embodiment, in case that the current block is of a single tree structure or a dual-tree structure (in case that the current block is of an individual tree structure, or in case that the current block is coded by an individual tree), a chroma residual scaling available flag representing whether chroma residual scaling is applied for the current block may be generated by the encoding apparatus. In case that the chroma residual scaling is applied with respect to the current picture, the current slice, and/or the current block, the value of the chroma residual scaling available flag may be 1.

In an embodiment, the minimum bin index (e.g., lmcs_min_bin_idx) and/or the maximum bin index (e.g., LmcsMaxBinIdx) may be derived based on the LMCS related information. Based on the minimum bin index, a first mapping value LmcsPivot[lmcs_min_bin_idx] may be derived. Based on the maximum bin index, a second mapping value LmcsPivot[LmcsMaxBinIdx] or LmcsPivot[LmcsMaxBinIdx+1] may be derived. The value of the reconstructed luma samples (e.g., lumaSample of Table 51 or 52) may be in the range of a first mapping value to a second mapping value. In an example, values of all reconstructed luma samples may be in the range of the first mapping value to the second mapping value. In another example, some sample values of the reconstructed luma samples may be in the range of the first mapping value to the second mapping value.

In an embodiment, the image information may include a sequence parameter set (SPS). The SPS may include a linear LMCS available flag representing whether the linear LMCS is available.

In an embodiment, the encoding apparatus may generate a piecewise index for chroma residual scaling. The encoding apparatus may derive a chroma residual scaling factor based on the piecewise index. The encoding apparatus may generate scaled residual chroma samples based on the residual chroma samples and the chroma residual scaling factor.

In an embodiment, the chroma residual scaling factor may be a single chroma residual scaling factor.

In an embodiment, the LMCS related information may include an LMCS data field and information on a linear LMCS. The information on the linear LMCS may be referred to as information on linear mapping. The LMCS data field may include a linear LMCS flag representing whether the linear LMCS is applied. If the value of the linear LMCS flag is 1, the mapped predicted luma samples may be generated based on the information on the linear LMCS.

In an embodiment, the information on the linear LMCS may include information on a first pivot point (e.g., P1 of FIG. 12) and information on a second pivot point (e.g., P2 of FIG. 12). For example, an input value and a mapping value of the first pivot point may be the minimum input value and the minimum mapping value, respectively. An input value and a mapping value of the second pivot point may be the maximum input value and the maximum mapping value, respectively. Input values between the minimum input value and the maximum input value may be linearly mapped.

In one embodiment, the image information includes information on the maximum input value and information on the maximum mapped value. The maximum input value is equal to a value of the information on the maximum input value (i.e., lmcs_max_input in Table 33). The maximum mapped value is equal to a value of the information on the maximum mapped value (i.e., lmcs_max_mapped in Table 33).

In one embodiment, the information on the linear mapping includes information on an input delta value of the second pivot point (i.e., lmcs_max_input_delta in Table 35) and information on a mapped delta value of the second pivot point (i.e., lmcs_max_mapped_delta in Table 35). The maximum input value may be derived based on the input delta value of the second pivot point, and the maximum mapped value may be derived based on the mapped delta value of the second pivot point.

In one embodiment, the maximum input value and the maximum mapped value may be derived based on at least one equation included in Table 36 described above.

In one embodiment, generating the mapped prediction luma samples comprises deriving a forward mapping scaling factor (i.e., ScaleCoeffSingle) for the prediction luma samples, and generating the mapped prediction luma samples based on the forward mapping scaling factor. The forward mapping scaling factor may be a single factor for the prediction luma samples.

In one embodiment, the forward mapping scaling factor may be derived based on at least one equation included in Tables 36 and/or 38 described above.

In one embodiment, the mapped prediction luma samples may be derived based on at least one equation included in Table 38 described above.

In one embodiment, the encoding apparatus may derive an inverse mapping scaling factor (i.e., InvScaleCoeffSingle) for the reconstructed luma samples (i.e., lumaSample). Also, the encoding apparatus may generate modified reconstructed luma samples (i.e., invSample) based on the reconstructed luma samples and the inverse mapping scaling factor. The inverse mapping scaling factor may be a single factor for the reconstructed luma samples.

In one embodiment, the inverse mapping scaling factor may be derived using a piecewise index derived based on the reconstructed luma samples.

In one embodiment, the piecewise index may be derived based on Table 51 described above. That is, the comparison process included in Table 51 (lumaSample<LmcsPivot[idxYInv+1]) may be iteratively performed from the piecewise index being the minimum bin index to the piecewise index being the maximum bin index.

In one embodiment, the inverse mapping scaling factor may be derived based on at least one of equations included in Tables 33, 34, 35, and 36, or Equation 11 or 12 described above.

In one embodiment, the modified reconstructed luma samples may be derived based on Equation 20, Equation 21, Table 39, and/or Table 40 described above.

In one embodiment, the LMCS related information may include information on the number of bins for deriving the mapped prediction luma samples (i.e., lmcs_num_bins_minus1 in Table 41). For example, the number of pivot points for luma mapping may be set equal to the number of bins. In one example, the encoding apparatus may generate the delta input values and delta mapped values of the pivot points by the number of bins, respectively. In one example, the input values and mapped values of the pivot points are derived based on the delta input values (i.e., lmcs_delta_input_cw[i] in Table 41) and the delta mapped values (i.e., lmcs_delta_mapped_cw[i] in Table 41), and the mapped prediction luma samples may be generated based on the input values (i.e., LmcsPivot_input[i] of Table 42) and the mapped values (i.e., LmcsPivot_mapped[i] of Table 42).

In one embodiment, the encoding apparatus may derive an LMCS delta codeword based on at least one LMCS codeword and an original codeword (OrgCW) included in the LMCS related information, and mapped luma prediction samples may be derived based on the at least one LMCS codeword and the original codeword. In one example, the information on the linear mapping may include information on the LMCS delta codeword.

In one embodiment, the at least one LMCS codeword may be derived based on the summation of the LMCS delta codeword and the OrgCW, for example, OrgCW is (1<<BitDepthY)/16, where BitDepthY represents a luma bit depth. This embodiment may be based on Equation 14.

In one embodiment, the at least one LMCS codeword may be derived based on the summation of the LMCS delta codeword and OrgCW*(lmcs_max_bin_idx-lmcs_min_bin_idx+1), for example, lmcs_max_bin_idx and lmcs_min_ bin_idx are a maximum bin index and a minimum bin index, respectively, and OrgCW may be (1<<BitDepthY)/16. This embodiment may be based on Equations 15 and 16.

In one embodiment, the at least one LMCS codeword may be a multiple of two.

In one embodiment, when the luma bit depth (BitDepthY) of the reconstructed luma samples is higher than 10, the at least one LMCS codeword may be a multiple of 1<<(BitDepthY−10).

In one embodiment, the at least one LMCS codeword may be in the range from (OrgCW>>1) to (OrgCW<<1)−1.

Figure 18:
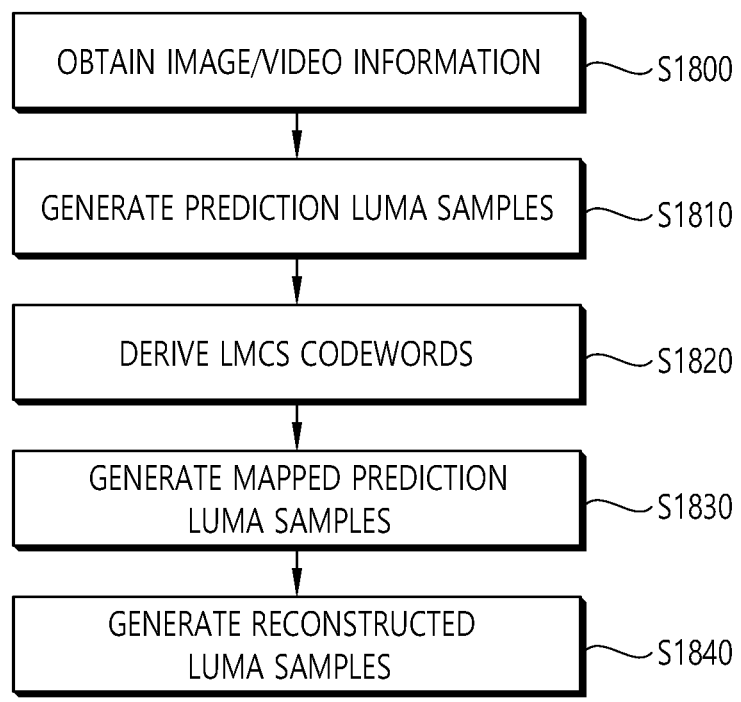
FIG. 18 and FIG. 19 schematically show an example of an image/video decoding method and related components according to an embodiment of the present document.
Figure 19:
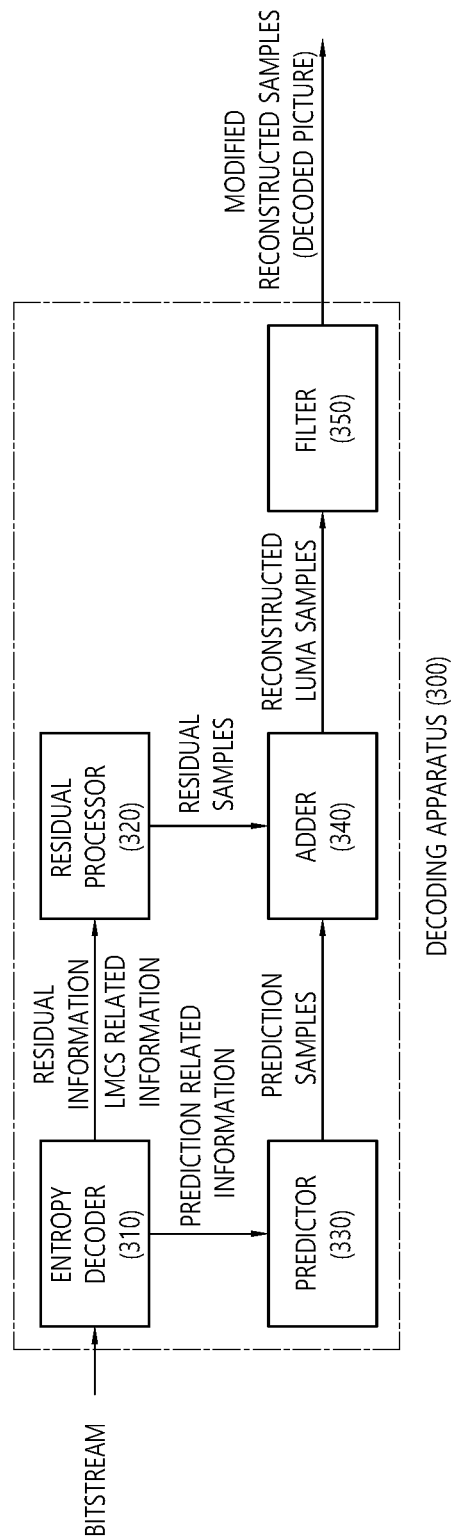

FIGS. 18 and 19 schematically illustrate an example of an image/video decoding method and related components according to an embodiment of the present document. The method disclosed in FIG. 18 may be performed by the decoding apparatus disclosed in FIG. 3. Specifically, for example, S1800 of FIG. 18 may be performed by the entropy decoder 310 of the decoding apparatus, S1810 may be performed by the predictor 330 of the decoding apparatus, S1820 may be performed by the residual processor 320, the predictor 330, and/or the adder 340 of the decoding apparatus, and S1830 may be performed by the adder 340 of the decoding apparatus. The method disclosed in FIG. 18 may include the above-described embodiments in the present document.

Referring to FIG. 18, the decoding apparatus may receive/obtain video/image information (S1800). The video/image information may include LMCS related information. For example, the LMCS related information may include information on the luma mapping (i.e., forward mapping, inverse mapping, linear mapping), information on chroma residual scaling, and/or indices (i.e., a maximum bin index, a minimum bin index, mapping index) related to LMCS (or reshaping, reshaper). The decoding apparatus may receive/obtain the image/video information through a bitstream.

The image/video information may include various information according to an embodiment of the present document. For example, the image/video information may include information disclosed in at least one of Tables 1 to 60 described above.

The decoding apparatus may generate predicted luma samples (S1810). The decoding apparatus may derive predicted luma samples of the current block in the current picture based on the prediction mode. In this case, various prediction methods disclosed in the present document, such as inter prediction or intra prediction, may be applied.

The image information may include residual information. The decoding apparatus may generate residual chroma samples based on the residual information. Specifically, the decoding apparatus may derive quantized transform coefficients based on the residual information. The quantized transform coefficients may have a one-dimensional vector form based on the coefficient scan order. The decoding apparatus may derive the transform coefficients based on a dequantization procedure for the quantized transform coefficients. The decoding apparatus may derive residual chroma samples and/or residual luma samples based on the transform coefficients.

The decoding apparatus may derive LMCS codewords (S1820). The decoding apparatus may derive the LMCS codewords based on LMCS related information. The decoding apparatus may derive information on a plurality of bins and information on the LMCS codewords based on the LMCS related information. The decoding apparatus may derive the respective LMCS codewords for the plurality of bins. For example, the above-described lmcsCW[i] may correspond to the derived codewords based on the LMCS related information.

The decoding apparatus may generate mapped prediction luma samples (S1830). The decoding apparatus may generate the mapped prediction luma samples based on the prediction luma samples and the LMCS codewords. For example, the decoding apparatus may derive input values and mapped values (output values) of pivot points for luma mapping, and may generate mapped prediction luma samples based on the input values and mapped values. In one example, the decoding apparatus may derive a (forward) mapping index (idxY) based on the first prediction luma sample, and the first mapped prediction luma sample may be generated based on the input value and the mapped value of the pivot point corresponding to the mapping index. In other example, linear mapping (linear reshaping, linear LMCS) may be used and mapped prediction luma samples may be generated based on a forward mapping scaling factor derived from two pivot points in the linear mapping, thus the index derivation process may be omitted due to linear mapping.

The decoding apparatus may generate reconstructed luma samples (S1840). The decoding apparatus may generate reconstructed luma samples for the current block based on the mapped prediction luma samples. Specifically, the decoding apparatus may sum the residual luma samples with the mapped prediction luma samples, and may generate reconstructed luma samples based on the result of the summation.

The decoding apparatus may generate scaled residual chroma samples. Specifically, the decoding apparatus may derive a chroma residual scaling factor and generate scaled residual chroma samples based on the chroma residual scaling factor. Here, the chroma residual scaling of the decoding side may be referred to as an inverse chroma residual scaling, as opposed to the encoding side. Accordingly, the chroma residual scaling factor derived by the decoding apparatus may be referred to as an inverse chroma residual scaling factor, and inverse scaled residual chroma samples may be generated.

The decoding apparatus may generate reconstructed chroma samples. The decoding apparatus may generate reconstructed chroma samples based on the scaled residual chroma samples. Specifically, the decoding apparatus may perform the prediction process for the chroma component and may generate prediction chroma samples. The decoding apparatus may generate reconstructed chroma samples based on the summation of the prediction chroma samples and the scaled residual chroma samples.

In an embodiment, the image information may include APSs. Each of the APSs may include type information representing whether the APS is the LMCS APS. The LMCS data field included in the APS representing that the type information is the LMCS APS may include the LMCS related information. The LMCS codewords may be derived based on the LMCS data field. In an example, the ID value of the APS representing that the type information is the LMCS APS may be in a predetermined range. For example, the predetermined range may be a range of 0 to 3. That is, the ID value of the APS representing that the type information is the LMCS APS may be 0, 1, 2, or 3. In another example, the maximum number of LMCS APSs among the APSs may be a predetermined value. For example, the maximum number (the predetermined value) of LMCS APSs may be 4.

In an embodiment, based on that the value of the type information is 1, the APS may include the LMCS data field including LMCS parameters.

In an embodiment, the image information may include header information. The header information may include LMCS related APS ID information. The LMCS related APS ID information may represent the ID of the LMCS APS for the current picture or the current block. For example, the header information may be a picture header (or slice header). In an example, the value of the LMCS related APS ID information may be in the predetermined range related to the ID value of the APS representing that the type information is the LMCS APS. For example, the value of the LMCS related APS ID information may be in the range of 0 to 3. That is, the value of the LMCS related APS ID information may be 0, 1, 2, or 3.

In an embodiment, the image information may include an SPS. The SPS may include a first LMCS available flag representing whether the LMCS data field is available.

In an embodiment, based on that the value of the first LMCS available flag is 1, the header information may include a second LMCS available flag representing whether the LMCS data field is available in the picture.

In an embodiment, based on that the value of the second LMCS available flag is 1, the LMCS related APS ID information may be included in the header information.

In an embodiment, in case that the current block is of a single tree structure or a dual-tree structure (in case that the current block is of an individual tree structure, or in case that the current block is coded by an individual tree), a chroma residual scaling available flag representing whether chroma residual scaling is applied for the current block may be signaled. In case that the chroma residual scaling is applied with respect to the current picture, the current slice, and/or the current block, the value of the chroma residual scaling available flag may be 1.

In an embodiment, the minimum bin index (e.g., lmcs_min_bin_idx) and/or the maximum bin index (e.g., LmcsMaxBinIdx) may be derived based on the LMCS related information. Based on the minimum bin index, a first mapping value LmcsPivot[Lmcs_min_bin_idx] may be derived. Based on the maximum bin index, a second mapping value LmcsPivot[LmcsMaxBinIdx] or LmcsPivot[LmcsMaxBinIdx+1] may be derived. The value of the reconstructed luma samples (e.g., lumaSample of Table 51 or 52) may be in the range of a first mapping value to a second mapping value. In an example, values of all reconstructed luma samples may be in the range of the first mapping value to the second mapping value. In another example, some sample values of the reconstructed luma samples may be in the range of the first mapping value to the second mapping value.

In an embodiment, the image information may include a sequence parameter set (SPS). The SPS may include a linear LMCS available flag representing whether the linear LMCS is available.

In an embodiment, a piecewise index (e.g., idxYInv of Table 35, 36, or 37) may be identified based on the LMCS related information. The decoding apparatus may derive a chroma residual scaling factor based on the piecewise index. The decoding apparatus may generate scaled residual chroma samples based on the residual chroma samples and the chroma residual scaling factor.

In an embodiment, the chroma residual scaling factor may be a single chroma residual scaling factor.

In an embodiment, the LMCS related information may include an LMCS data field and information on a linear LMCS. The information on the linear LMCS may be referred to as information on linear mapping. The LMCS data field may include a linear LMCS flag representing whether the linear LMCS is applied. If the value of the linear LMCS flag is 1, the mapped predicted luma samples may be generated based on the information on the linear LMCS.

In an embodiment, the information on the linear LMCS may include information on a first pivot point (e.g., P1 of FIG. 12) and information on a second pivot point (e.g., P2 of FIG. 12). For example, an input value and a mapping value of the first pivot point may be the minimum input value and the minimum mapping value, respectively. An input value and a mapping value of the second pivot point may be the maximum input value and the maximum mapping value, respectively. Input values between the minimum input value and the maximum input value may be linearly mapped.

In an embodiment, the image information may include information on the maximum input value and information on the maximum mapping value. The maximum input value may be equal to the value of the information (e.g., lmcs_max_input of Table 33) on the maximum input value. The maximum mapping value may be equal to the value of the information (e.g., lmcs_max_mapped of Table 33) on the maximum mapping value.

In an embodiment, the information on the linear mapping may include information (e.g., lmcs_max_input_delta of Table 35) on the input delta value of the second pivot point, and information (e.g., lmcs_max_mapped_delta of Table 35) on the mapping delta value of the second pivot point. The maximum input value may be derived based on the input delta value of the second pivot point, and the maximum mapping value may be derived based on the mapping delta value of the second pivot point.

In an embodiment, the maximum input value and the maximum mapping value may be derived based on at least one equation included in Table 36 as described above.

In one embodiment, generating the mapped prediction luma samples comprises deriving a forward mapping scaling factor (i.e., ScaleCoeffSingle) for the prediction luma samples, and generating the mapped prediction luma samples based on the forward mapping scaling factor. The forward mapping scaling factor may be a single factor for the prediction luma samples.

In one embodiment, the inverse mapping scaling factor may be derived using a piecewise index derived based on the reconstructed luma samples.

In one embodiment, the piecewise index may be derived based on Table 51 described above. That is, the comparison process included in Table 51 (lumaSample<LmcsPivot[idxYInv+1]) may be iteratively performed from the piecewise index being the minimum bin index to the piecewise index being the maximum bin index.

In one embodiment, the forward mapping scaling factor may be derived based on at least one equation included in Tables 36 and/or 38 described above.

In one embodiment, the mapped prediction luma samples may be derived based on at least one equation included in Table 38 described above.

In one embodiment, the decoding apparatus may derive an inverse mapping scaling factor (i.e., InvScaleCoeffSingle) for the reconstructed luma samples (i.e., lumaSample). Also, the decoding apparatus may generate modified reconstructed luma samples (i.e., invSample) based on the reconstructed luma samples and the inverse mapping scaling factor. The inverse mapping scaling factor may be a single factor for the reconstructed luma samples.

In one embodiment, the inverse mapping scaling factor may be derived based on at least one of equations included in Tables 33, 34, 35, and 36, or Equation 11 or 12 described above.

In one embodiment, the modified reconstructed luma samples may be derived based on Equation 20, Equation 21, Table 39, and/or Table 40 described above.

In one embodiment, the LMCS related information may include information on the number of bins for deriving the mapped prediction luma samples (i.e., lmcs_num_bins_minus1 in Table 41). For example, the number of pivot points for luma mapping may be set equal to the number of bins.

In one example, the decoding apparatus may generate the delta input values and delta mapped values of the pivot points by the number of bins, respectively. In one example, the input values and mapped values of the pivot points are derived based on the delta input values (i.e., lmcs_delta_input_cw[i] in Table 41) and the delta mapped values (i.e., lmcs_delta_mapped_cw[i] in Table 41), and the mapped prediction luma samples may be generated based on the input values (i.e., LmcsPivot_input[i] of Table 42) and the mapped values (i.e., LmcsPivot_mapped[i] of Table 42).

In one embodiment, the decoding apparatus may derive an LMCS delta codeword based on at least one LMCS codeword and an original codeword (OrgCW) included in the LMCS related information, and mapped luma prediction samples may be derived based on the at least one LMCS codeword and the original codeword. In one example, the information on the linear mapping may include information on the LMCS delta codeword.

In one embodiment, the at least one LMCS codeword may be derived based on the summation of the LMCS delta codeword and the OrgCW, for example, OrgCW is (1<<BitDepthY)/16, where BitDepthY represents a luma bit depth. This embodiment may be based on Equation 14.

In one embodiment, the at least one LMCS codeword may be derived based on the summation of the LMCS delta codeword and OrgCW*(lmcs_max_bin_idx-lmcs_min_bin_idx+1), for example, lmcs_max_bin_idx and lmcs_min_bin_idx are a maximum bin index and a minimum bin index, respectively, and OrgCW may be (1<<BitDepthY)/16. This embodiment may be based on Equations 15 and 16.

In one embodiment, the at least one LMCS codeword may be a multiple of two.

In one embodiment, when the luma bit depth (BitDepthY) of the reconstructed luma samples is higher than 10, the at least one LMCS codeword may be a multiple of 1<<(BitDepthY−10).

In one embodiment, the at least one LMCS codeword may be in the range from (OrgCW>>1) to (OrgCW<<1)−1.

In the above-described embodiment, the methods are described based on the flowchart having a series of steps or blocks. The present document is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present document.

The method according to the above-described embodiments of the present document may be implemented in software form, and the encoding device and/or decoding device according to the present document is, for example, may be included in the device that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present document is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present document may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 20:
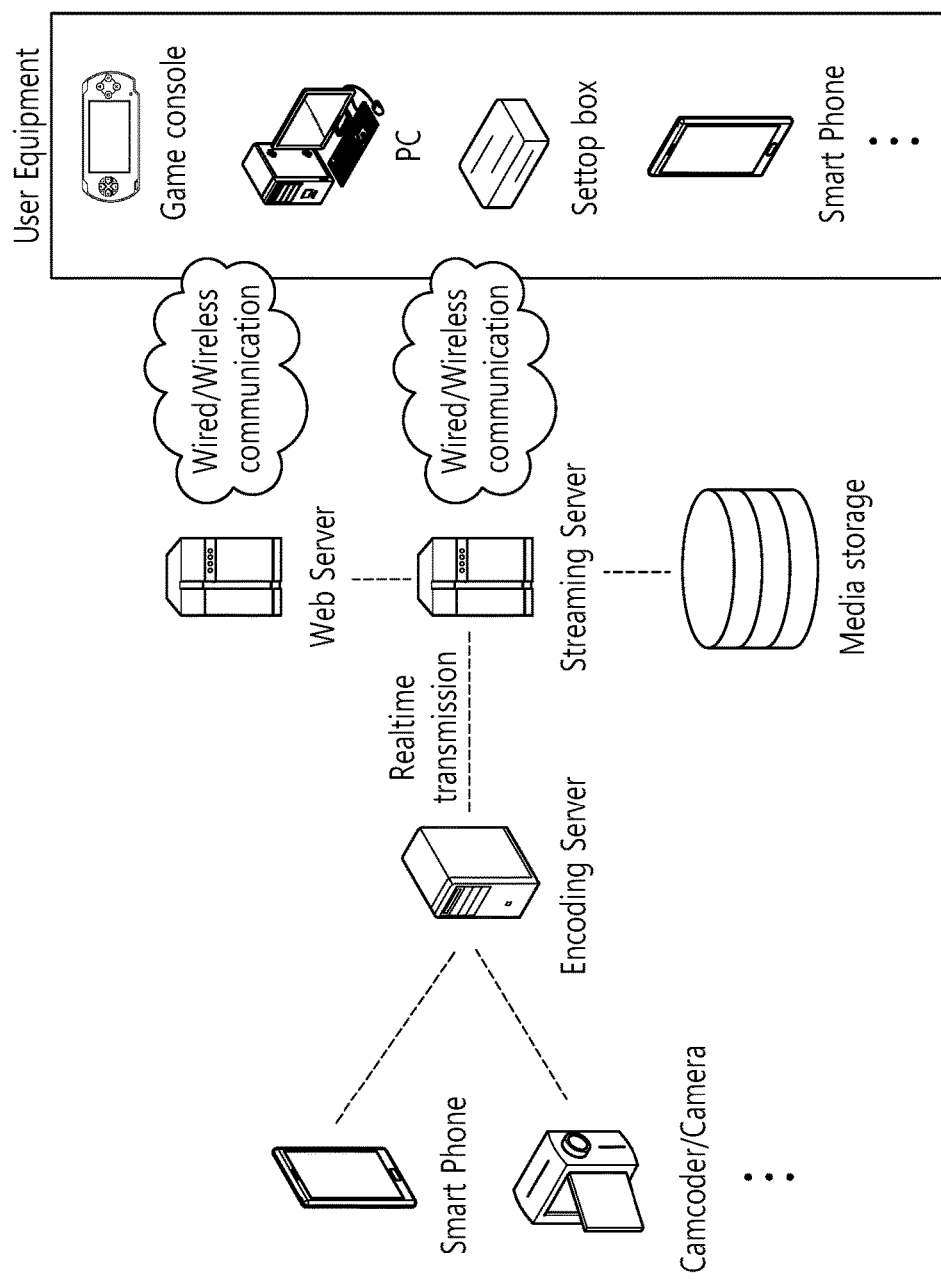
FIG. 20 shows an example of a content streaming system to which embodiments disclosed in the present document may be applied.

FIG. 20 shows an example of a content streaming system to which embodiments disclosed in the present document may be applied.

Referring to FIG. 20, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, and the like into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding apparatus, comprising:
an entropy decoder for obtaining image information including prediction related information and luma mapping with chroma scaling (LMCS) related information from a bitstream;
a predictor for generating prediction luma samples for a current block in a current picture based on the prediction related information, for deriving LMCS codewords based on the LMCS related information, and for generating mapped prediction luma samples based on the prediction luma samples and the LMCS codewords; and
an adder for generating reconstructed luma samples for the current block based on the mapped prediction luma samples,
wherein the image information includes adaptation parameter sets (APSs),
wherein each of the APS s includes type information specifying whether the APS is an LMCS APS, wherein an LMCS data field included in the APS of which the type information specifies the LMCS APS includes the LMCS related information, wherein the LMCS codewords are derived based on the LMCS data field, and wherein an ID value of the APS of which the type information specifies the LMCS APS is in a predetermined range.

2. The apparatus of claim 1, wherein the APS comprises the LMCS data field including LMCS parameters based on that a value of the type information is 1.

3. The apparatus of claim 1, wherein the image information comprises header information, wherein the header information includes LMCS related APS ID information, and wherein the LMCS related APS ID information represents an ID of the LMCS APS for the current picture or the current block.

4. The apparatus of claim 3, wherein a value of the LMCS related APS ID information is in a range of 0 to 3.

5. The apparatus of claim 3, wherein the image information comprises a sequence parameter set (SPS), and wherein the SPS includes a first LMCS available flag representing whether the LMCS data field is available.

6. The apparatus of claim 5, wherein the header information comprises a second LMCS available flag representing whether the LMCS data field in a picture is available based on that a value of the first LMCS available flag is 1.

7. The apparatus of claim 6, wherein the LMCS related APS ID information is included in the header information based on that a value of the second LMCS available flag is 1.

8. The apparatus of claim 1, wherein the predetermined range is 0 to 3.

9. The apparatus of claim 1, wherein the image information comprises residual information, wherein residual chroma samples are generated based on the residual information, wherein a piecewise index is identified based on the LMCS related information, wherein a chroma residual scaling factor is derived based on the piecewise index, and wherein scaled residual chroma samples are generated based on the residual chroma samples and the chroma residual scaling factor.

10. The apparatus of claim 9, wherein in case that the current block is a single-tree structure or a dual-tree structure, a chroma residual scaling available flag representing whether chroma residual scaling is applied for the current block is signaled.

11. The apparatus of claim 9, wherein the chroma residual scaling factor is a single chroma residual scaling factor.

12. The apparatus of claim 1, wherein the generating the mapped prediction luma samples comprises:

deriving a forward mapping scaling factor for the prediction luma samples; and generating the mapped prediction luma samples based on the forward mapping scaling factor, wherein the forward mapping scaling factor is a single factor for the prediction luma samples.

13. The apparatus of claim 1, further comprising:

deriving an inverse mapping scaling factor for the reconstructed luma samples; and generating a modified reconstructed luma samples based on the reconstructed luma samples and the inverse mapping scaling factor, wherein the inverse mapping scaling factor is a single factor for the reconstructed luma samples.

14. The apparatus of claim 13, wherein the inverse mapping scaling factor is derived using a derived piecewise index based on the reconstructed luma samples.

15. An image encoding apparatus, the method comprising:

a predictor for generating prediction luma samples for a current block in a current picture, for deriving luma mapping with chroma scaling (LMCS) codewords, and for generating mapped prediction luma samples based on the LMCS codewords;

a residual processor for deriving LMCS related information based on the LMCS codewords, for generating residual luma samples for the current block based on the mapped prediction luma samples, and for deriving residual information based on the residual luma samples; and an entropy encoder for encoding image information including the LMCS related information and the residual information, wherein the image information includes adaptation parameter sets (APSs), wherein each of the APS s includes type information specifying whether the APS is an LMCS APS, wherein an LMCS data field included in the APS of which type information specifies the LMCS APS includes the LMCS related information, wherein the LMCS data field includes information on the LMCS codewords, and wherein an ID value of the APS of which the type information specifies the LMCS APS is in a predetermined range.

16. The apparatus of claim 15, wherein the image information comprises header information, wherein the header information includes LMCS related APS ID information, wherein the LMCS related APS ID information represents an ID of the LMCS APS for the current picture or the current block, and wherein a value of the LMCS related APS ID information is in the predetermined range.

17. The apparatus of claim 16, wherein the predetermined range is 0 to 3.

18. The apparatus of claim 16, wherein the image information comprises a sequence parameter set (SPS), and wherein the SPS includes a first LMCS available flag representing whether the LMCS data field is available.

19. The apparatus of claim 18, wherein the header information comprises a second LMCS available flag representing whether the LMCS data field in a picture is available based on that a value of the first LMCS available flag is 1.

20. A transmitting apparatus of data for an image, comprising:

a processor configured to obtain a bitstream, wherein the bitstream is generated based on generating prediction luma samples for a current block in a current picture, deriving luma mapping with chroma scaling (LMCS) codewords, deriving LMCS related information based on the LMCS codewords, generating mapped prediction luma samples based on the LMCS codewords, generating residual luma samples for the current block based on the mapped prediction luma samples, deriving residual information based on the residual luma samples, and encoding image information including the LMCS related information and the residual information; and a transmitter configured to transmit the data comprising the bitstream, wherein the image information includes adaptation parameter sets (APSs), wherein each of the APSs includes type information specifying whether the APS is an LMCS APS, wherein an LMCS data field included in the APS of which type information specifies the LMCS APS includes the LMCS related information, wherein the LMCS data field includes information on the LMCS codewords, and wherein an ID value of the APS of which the type information specifies the LMCS APS is in a predetermined range.

* * * * *